(12) United States Patent
Watanabe et al.

(10) Patent No.: US 6,223,347 B1
(45) Date of Patent: Apr. 24, 2001

(54) DATA DISPLAY CONTROL APPARATUS

(75) Inventors: Shigeaki Watanabe, Kyoto; Kazutoshi Sumiya, Nishinomiya; Kiyokazu Yamanaka, Ashiya; Yuki Kusumi, Kashiba; Masahiro Oashi, Hirakata; Tatsuya Shimoji; Masayuki Kozuka, both of Neyagawa; Yoshihiro Mimura, Hirakata; Yoshiyuki Miyabe, Osaka; Kazuo Okamura, Hirakata; Takashi Kakiuchi, Toyonaka; Junichi Hirai, Suita; Naoya Takao, Kadoma; Toshiya Mori, Settsu; Ikuo Minakata, Souraku, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/928,010

(22) Filed: Sep. 11, 1997

(30) Foreign Application Priority Data

Sep. 11, 1996 (JP) .................................................. 8-240297

(51) Int. Cl.⁷ ................................ H04N 7/10; H04N 1/02
(52) U.S. Cl. ........................... 725/139; 725/140; 725/142
(58) Field of Search .................................... 348/552, 906, 348/12; 345/327; 709/219

(56) References Cited

U.S. PATENT DOCUMENTS

| | | |
|---|---|---|
| 5,195,134 | 3/1993 | Inoue . |
| 5,539,871 | 7/1996 | Gibson . |
| 5,566,293 | 10/1996 | Ko et al. . |

FOREIGN PATENT DOCUMENTS

| | | | |
|---|---|---|---|
| 827336 | 3/1998 | (EP) . | |
| 2728089 | 11/1995 | (FR) . | |
| 39393 | 1/1991 | (JP) . | |
| 789267 | 1/1991 | (JP) . | |
| 4274553 | 9/1992 | (JP) . | |
| 8241065 | 9/1996 | (JP) . | |
| 9525213 | 9/1995 | (WO) . | |
| 95/25313 | * 9/1995 | (WO) | ............................. G06F/17/30 |
| 9619077 | 6/1996 | (WO) . | |
| 9708837 | 3/1997 | (WO) . | |
| 9712342 | 4/1997 | (WO) . | |
| 9737736 | 10/1997 | (WO) . | |

* cited by examiner

Primary Examiner—John W. Miller
(74) Attorney, Agent, or Firm—Price and Gess

(57) ABSTRACT

A data display control apparatus receives a digital broadcast and compares the present time with a time indicated in a Time_Event_Part provided in navigation information used to control the display of the multimedia data composing a broadcast program. When the indicated time has been reached, the data display control apparatus executes instructions to control the display of the multimedia data.

21 Claims, 38 Drawing Sheets

FIG. 6

| NE_id | 0 | | 216 |

Bytecode_Part — 301

| BYTE CODE NO. | BYTE CODE |
|---|---|
| 0 | PushL0,GotoPage |
| 1 | PushL1,GotoPage |

Handler_Part — 302

| HANDLER NO. | BYTE CODE NO. |
|---|---|
| 0 | 0 |
| 1 | 1 |

Graphics_Property_Part — 303

| GRAPHICS NO. | TYPE | COORDINATES | HANDLER NO. | INITIAL STATE |
|---|---|---|---|---|
| 0 | BUTTON | (20,20) | 0 | Visible |
| 1 | BUTTON | (20,60) | 1 | Visible |

Bitmap_Information_Part — 304

| NUMBER | 0 | 1 |
|---|---|---|
| CONTENT | VIDEO | STEREO |

Hyperlink_Information_Part — 305

| LINK NO. | LINK DESTINATION MATERIAL ID |
|---|---|
| 0 | NE_id=1, VE_id=1 |
| 1 | NE_id=2, VE_id=2 |

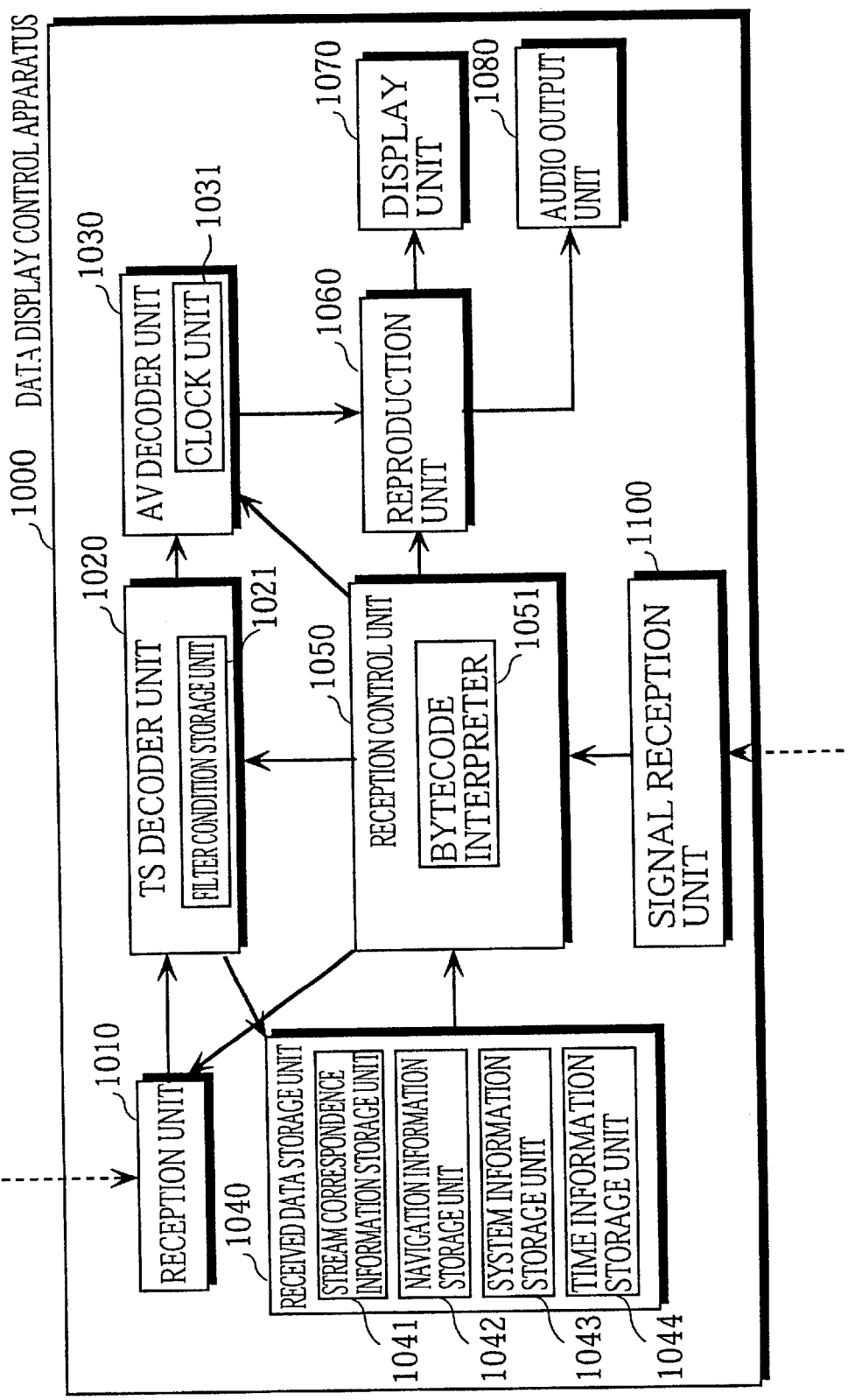

FIG. 11

| NE_id | 0 | | 2160 |

Time_Event_Part — 2161

| ACTIVATE TIME | HANDLER NO. |
|---|---|
| 1996.9.9,15 : 00 : 00 | 2 |

Bytecode_Part — 2162

| BYTECODE NO. | BYTECODE |
|---|---|
| 0 | PushL0,GotoPage |
| 1 | PushL1,GotoPage |
| 2 | PushL2,PushL1,SetGraphicVisibility, PushL0,PushL0,SetGraphicVisibility, PushL1,PushL0,SetGraphicVisibility |

Handler_Part — 2163

| HANDLER NO. | BYTECODE NO. |
|---|---|
| 0 | 0 |
| 1 | 1 |
| 2 | 2 |

Graphics_Property_Part — 2164

| GRAPHICS NO. | TYPE | COORDINATES | HANDLER NO. | INITIAL STATE |
|---|---|---|---|---|
| 0 | BUTTON | (20,20) | 0 | Visible |
| 1 | BUTTON | (20,60) | 1 | Visible |
| 2 | BUTTON | (0,20) | NONE | Invisible |

Bitmap_Information_Part — 2165

| NUMBER | 0 | 1 | 2 |
|---|---|---|---|
| CONTENT | VIDEO | STEREO | THIS OFFER IS NO LONGER VALID |

Hyperlink_Information_Part — 2166

| LINK NO. | LINK DESTINATION MATERIAL ID |
|---|---|
| 0 | NE_id=1, VE_id=1 |
| 1 | NE_id=2, VE_id=2 |

FIG. 15

| TIME | DISPLAY SCREEN |
|---|---|
| 3210 — 1996.9.9<br>14 : 57 : 00 | MAIL ORDER<br>VIDEO<br>STEREO |
| 3220 — 1996.9.9<br>14 : 58 : 00 | VIDEO<br>¥200000<br>MENU |
| 3230 — 1996.9.9<br>14 : 59 : 00 | MAIL ORDER<br>VIDEO<br>STEREO |
| 3240 — 1996.9.9<br>15 : 00 : 00 | THIS OFFER IS<br>NO LONGER VALID |

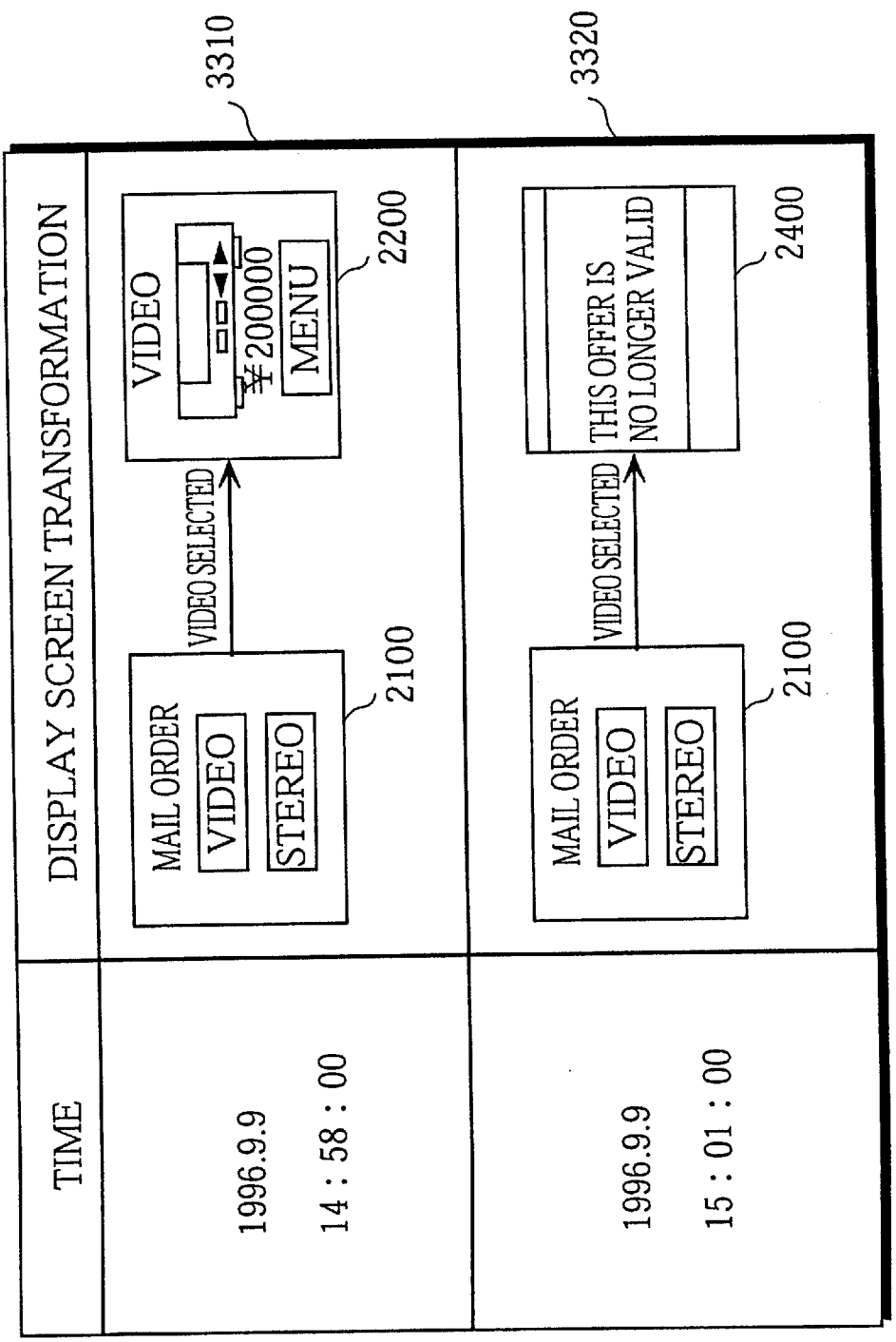

FIG. 22

| NE_id | 0 |
|---|---|

Time_Event_Part

| ACTIVATE TIME | HANDLER NO. | GRAPHICS NO. |
|---|---|---|
| 1996.9.9,15 : 00 : 00 | 2 | 0,1 |

Bytecode_Part

| BYTECODE NO. | BYTECODE |
|---|---|
| 0 | PushL0,GotoPage |
| 1 | PushL1,GotoPage |
| 2 | PushL2,PushL1,SetGraphicVisibility, PushL0,PushL0,SetGraphicVisibility, PushL1,PushL0,SetGraphicVisibility |

Handler_Part

| HANDLER NO. | BYTECODE NO. |
|---|---|
| 0 | 0 |
| 1 | 1 |
| 2 | 2 |

Graphics_Property_Part

| GRAPHICS NO. | TYPE | COORDINATES | HANDLER NO. | INITIAL STATE |
|---|---|---|---|---|
| 0 | BUTTON | (20,20) | 0 | Visible |
| 1 | BUTTON | (20,60) | 1 | Visible |
| 2 | BUTTON | ( 0,20) | NONE | Invisible |

Bitmap_Information_Part

| NUMBER | 0 | 1 | 2 |
|---|---|---|---|
| CONTENT | VIDEO | STEREO | THIS OFFER IS NO LONGER VALID |

Hyperlink_Information_Part

| LINK NO. | LINK DESTINATION MATERIAL ID |
|---|---|
| 0 | NE_id=1, VE_id=1 |
| 1 | NE_id=2, VE_id=2 |

FIG. 26

| TIME | DISPLAY SCREEN |
|---|---|
| 6810 — 1996.9.9<br>14 : 59 : 00 | MAIL ORDER<br>VIDEO<br>STEREO |
| 6820 — 1996.9.9<br>15 : 00 : 00 | THIS OFFER IS<br>NO LONGER VALID |

FIG. 27

| NE_id | 0 | NE START TIME | 1996.9.9.14:00:00 | | 7160

Time_Event_Part — 7161

| ACTIVATE TIME | HANDLER NO. |
|---|---|
| 1996.9.9,15 : 00 : 00 | 2 |

Bytecode_Part — 7162

| BYTECODE NO. | BYTECODE |
|---|---|
| 0 | PushL0,GotoPage |
| 1 | PushL1,GotoPage |
| 2 | PushL2,PushL1,SetGraphicVisibility, PushL0,PushL0,SetGraphicVisibility, PushL1,PushL0,SetGraphicVisibility |

Handler_Part — 7163

| HANDLER NO. | BYTECODE NO. |
|---|---|
| 0 | 0 |
| 1 | 1 |
| 2 | 2 |

Graphics_Property_Part — 7164

| GRAPHICS NO. | TYPE | COORDINATES | HANDLER NO. | INITIAL STATE |
|---|---|---|---|---|
| 0 | BUTTON | (20,20) | 0 | Visible |
| 1 | BUTTON | (20,60) | 1 | Visible |
| 2 | BUTTON | ( 0,20) | NONE | Invisible |

Bitmap_Information_Part — 7165

| NUMBER | 0 | 1 | 2 |
|---|---|---|---|
| CONTENT | VIDEO | STEREO | THIS OFFER IS NO LONGER VALID |

Hyperlink_Information_Part — 7166

| LINK NO. | LINK DESTINATION MATERIAL ID |
|---|---|
| 0 | NE_id=1, VE_id=1 |
| 1 | NE_id=2, VE_id=2 |

FIG. 31

| NE_id | 0 | | 8160

Time_Event_Part — 8161

| ELAPSED TIME BEFORE ACTIVATION | HANDLER NO. |
|---|---|
| 00 : 00 : 10 : 00 | 2 |

Bytecode_Part — 8162

| BYTECODE NO. | BYTECODE |
|---|---|
| 0 | PushL0,GotoPage |
| 1 | PushL1,GotoPage |
| 2 | PushL2,GotoPage |

Handler_Part — 8163

| HANDLER NO. | BYTECODE NO. |
|---|---|
| 0 | 0 |
| 1 | 1 |
| 2 | 2 |

Graphics_Property_Part — 8164

| GRAPHICS NO. | TYPE | COORDINATES | HANDLER NO. | INITIAL STATE |
|---|---|---|---|---|
| 0 | BUTTON | (20,20) | 0 | Visible |
| 1 | BUTTON | (20,60) | 1 | Visible |

Bitmap_Information_Part — 8165

| NUMBER | 0 | 1 |
|---|---|---|
| CONTENT | APPLE | TANGERINE |

Hyperlink_Information_Part — 8166

| LINK NO. | LINK DESTINATION MATERIAL ID |
|---|---|
| 0 | NE_id=1,VE_id=1 |
| 1 | NE_id=2,VE_id=2 |
| 2 | NE_id=3,VE_id=3 |

FIG. 33A

| ELAPSED TIME AND OPERATION | DISPLAY SCREEN |
|---|---|
| 8910 — 00 : 00 : 00 : 00 | QUESTION: WHICH IS A RED FRUIT? APPLE TANGERINE |
| 8920 — 00 : 00 : 05 : 00 "APPLE" SELECTED | CORRECT ⊚ |

FIG. 33B

| ELAPSED TIME AND OPERATION | DISPLAY SCREEN |
|---|---|
| 8930 — 00 : 00 : 00 : 00 | QUESTION: WHICH IS A RED FRUIT? APPLE TANGERINE |
| 8940 — 00 : 00 : 10 : 00 | TIME UP! THE CORRECT ANSWER IS APPLE |

FIG. 36
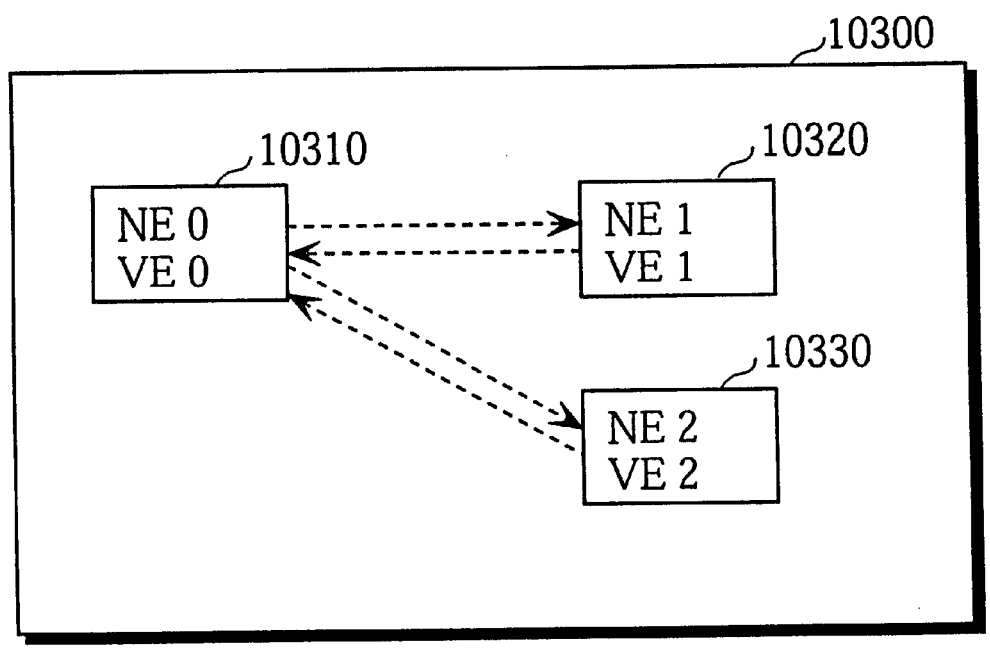
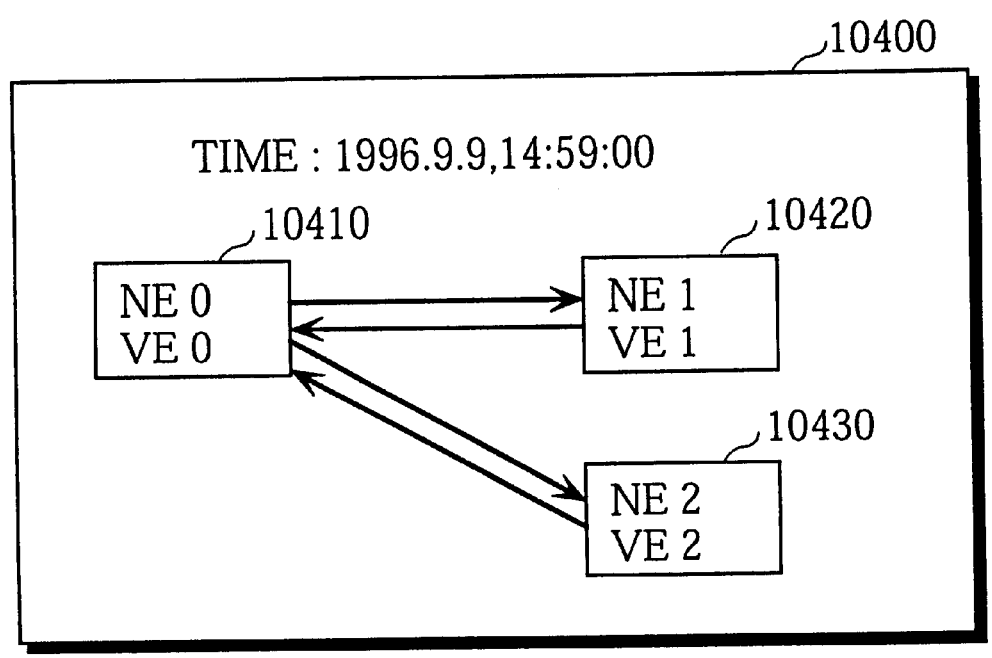

DATA DISPLAY CONTROL APPARATUS

BACKGROUND OF THE INVENTION

1. Field of the Invention

The present invention relates to a data display control apparatus, a data transmission apparatus, and a data display control information editing apparatus. In particular, the present invention relates to a data display control apparatus for controlling the display of a plurality of sets of multimedia data which are linked to one another, a data transmission apparatus for transmitting information controls the display of multimedia data, and to a data display control information editing apparatus for editing information used to control the display of multimedia data.

2. Description of the Related Art

Since the development of digital satellite broadcasting in recent years, there has been a great increase in the number of programs being provided on an ever greater number of channels. For digital satellite broadcasting, large numbers of channels are possible by multiplexing the channels together into a single frequency band. This multiplexing is performed using what is called a "transport stream" under MPEG2 (Moving Pictures Experts Group2) standard. This technique is described in detail in the documentation for ISO/IEC Standard 13818-1 (MPEG2) system standard).

Here, it is possible to conceive a digital broadcasting system where image information and the like are transmitted from a transmission station and received by a receiver terminals, with users of the receiver terminals making interactive operations for the image information in accordance with the content of the transmitted image information.

The above kind of digital broadcasting system is disclosed by a concurrent patent application with the title "Digital Broadcasting System, Digital Broadcasting Apparatus, and Receiver Apparatus for a Digital Broadcast" (Japanese Patent Application No. H9-62216). The characteristic feature of this digital broadcasting system is that it provides a variety of interactive services using only a one-way transfer of data. The system is described in more detail below.

The construction of the digital broadcasting system which is presupposed for the present invention is shown in FIG. 1. This digital broadcasting system is composed of a data transmission apparatus 101 and a plurality of data reception apparatuses 121.

Data Transmission Apparatus 101

The data transmission apparatus 101 is constructed to multiplex data for a plurality of contents, which feature hyperlinks to one another, into an MPEG2 transport stream and to repeatedly transmit the multiplexed data. This data transmission apparatus 101 is composed of a transmission data storage unit 102, and data multiplexing unit 103, a multiplexing information storage unit 104, a system information table generating unit 105, and a transmission unit 106. Here, the term "content" is used to express the unit of information for which interactive operations can be performed by the user.

The transmission data storage unit 102 is composed of a recording medium such as a magnetic disc, and stores data for a plurality of contents which compose one interactive program, and construction information. This transmission data storage unit 102 includes a presentation information storage unit 107, a navigation information storage unit 108, and a construction information storage unit 109. Here, an "interactive program" refers to an "event" or "program" which is included in the MPEG2 transport stream used as the transmission data.

The presentation information storage unit 107 stores presentation information, such as image data and audio data, which is included in each content. The navigation information storage unit 108 stores the navigation information which is composed of hyperlink information for links to other contents, operation control information such as scripts for switching the display, and supplementary display images for displaying menus and the like on a display screen. The construction information storage unit 109, meanwhile, stores a construction information table which shows the correspondence between sets of image data and navigation information.

The multiplexing information storage unit 104 stores a multiplexing information table including identifiers and assigning information for resources such as bandwidth for multiplexing the transmission data stored in the transmission data storage unit 102 into an MPEG2 transport stream.

This multiplexing information table includes packet identifiers (PID) which are assigned to the components that compose each event, when the data stored in the transmission data storage unit 102 is multiplexed into the MPEG2 transport stream as an event.

The components referred to here are streams which are each identified by a PID under IS/IEC 13010-1 (hereinafter, MPEG2 system) standard, with there being video components, audio components, components for multiplexing navigation information, and components for multiplexing stream correspondence information (described later in this specification).

The data multiplexing unit 103 is composed of a multiplexing control unit 110 made up of a CPU and memory, a stream correspondence information table generating unit 111, an identifier information appending unit 112, a navigation information table generating unit 113, and a multiplexing unit 114.

On being activated by the transmission unit 106, the multiplexing control unit 110 first reads the construction information table and the multiplexing information table stored in the construction information storage unit 109 and the multiplexing information storage unit 104, and assigns identifiers for uniquely identifying each content in the digital broadcast for each content number, in doing so generating a content identifier assigning table. After this, the multiplexing control unit 110 assigns values of a "PID", "component_tag", and "stream_id" to each set of image data and generates a display image information identifier assigning table. The multiplexing control unit 110 also instructs the stream correspondence information table generating unit 111 to generate a stream correspondence table, instructs the identifier information appending unit 112 to add the identifier $VE_{id}$ for image data (video element "VE") to the private area of the image data, and instructs the navigation information table generating unit 113 to generate the navigation information table for the navigation elements "NE".

On being instructed by the multiplexing control unit 110 to add the identifier information, the identifier information appending unit 112 reads the image data stored in the presentation information storage unit 107. The identifier information appending unit 112 then writes the image data identifier VE_id into the private area of the image data bit stream it has read. It should be noted here that the identifier information appending unit 112 obtains the VE_id by referring to the display image information identifier assigning table generated by the multiplexing control unit 110. The identifier information appending unit 112 then assigns a filename to the image data bitstream with the added VE_id information and stores it in a storage area (not illustrated).

After appending identifier information to all of the image data, the identifier information appending unit 112 informs the multiplexing control unit 110 of the completion or the appending operation.

On being instructed by the multiplexing control unit 110 to generate a navigation information table, the navigation information table generating unit 113 reads the navigation information stored in the navigation information storage unit 108. When the read navigation information includes hyperlink information, the navigation information table generating unit 113 refers to the content identifier assigning table for information regarding the link destination given as a content number and converts this content number into a variety of identifiers to generate a navigation information table. When no hyperlink information is included, the navigation information table generating unit 113 generates the navigation information table by using the read navigation information as it is, changing only the filename. The navigation information table generating unit 113 stores the generated navigation information table in a storage area (not illustrated). Hereinafter, the expression "navigation information" will mainly refer to the navigation information tables generated here.

On completing the generation of the navigation information tables, the navigation information table generating unit 113 informs the multiplexing control unit 110 of the completion of its processing.

On being instructed by the multiplexing control unit 110 to generate a stream corresponding table, the stream correspondence information table generating unit 111 refers to the display image information identifier assigning table and generates a stream correspondence table for each set of image data. These stream correspondence tables are used by data reception apparatuses to separate one set of image data from the stream transmitted from the data transmission apparatus 101 to the data reception apparatus 121. Hereinafter, the expression "stream correspondence information" will mainly refer to the stream correspondence tables generated here.

On completing the generation of the stream correspondence tables, the stream correspondence information table generating unit 111 informs the multiplexing control unit 110 of the completion of its processing.

On receiving indications for the completion of processing by the identifier information appending unit 112, the navigation information table generating unit 113, and the stream correspondence information table generating unit 111, the multiplexing control unit 110 decides the number of contents which are to be repeatedly transmitted.

The multiplexing unit 114 multiplexes the transmission data into an MPEG2 transport stream.

The system information table generating unit 105 refers to the multiplexing information storage unit 104 and generates the NIT (Network Information Table), the EIT (Event Information Table), the SDT (Service Description Table), the PAT (Program Association Table), and the PMT (Program Map Table). These tables compose the program specification information which is used by the data reception apparatus 121 in selecting a program. Hereinafter, the tables, such as the NIT and EIT, generated by the system information table generating unit 105 will be generally referred to as the "system information".

On being instructed by the multiplexing control unit 110, the system information table generating unit 105 refers to the multiplexing information storage unit 104 and generates the NIT, the EIT, the SDT, and the PAT in accordance with DVB-SI standard and MPEG2 system standard. These tables include information which is required by the data reception apparatus 121 to select the events which are composed of the data stored in the transmission data storage unit 102.

The NIT stores information which relates to the transfer path for each transport stream transmitted from a network identified as the specified network. The EIT stores information, such as event names, starting times, and ending times, for each of the events in a specified service. The SDT stores information, such as service names, for each service included in a specified transport stream.

The PAT includes information for the PIDs of the PMT (Program Map Table) for each program included in a specified transport stream.

The system information table generating unit 105 also refers to the multiplexing information table and generates the PMT. The PMT includes PIDs for identifying each component which composes a program, the types of data transmitted in each component, and information for the descriptors which corresponds to each component.

The transmission unit 106 includes a scheduler, and activates the multiplexing control unit 110 at a predetermined time before the transmission start time of an event, such as five minutes before transmission. When the transmission start time is reached, the transmission unit 106 repeatedly multiplexes information such as the NIT, PAT, PMT, SDT, and EIT generated by the system information table generating unit 105 into the transport stream outputted by the multiplexing unit 114 at a predetermined interval using predetermined PIDS in accordance with DVB-SI standard and MPEG2 system standard. The transmission unit 106 then performs modulation and other processes, before transmitting the data to a plurality of data reception apparatuses 121.

As described above, the data transmission apparatus 101 assigns identifiers to the image data and navigation information table which compose each content, multiplexes them into a transport stream, and repeatedly performs transmission.

The navigation information includes identifiers of a set of image data and a set of navigation information in the content linked by a hyperlink, as well as supplementary image information for displaying menus and the like, and scripts for switching the display. As a result, the data reception apparatus 121 can freely separate and reproduce a content from the transport stream by specifying the identifiers in accordance with the navigation information, which means that interactive operations can be performed for data transmitted using a one-way communication path.

Data Reception Apparatus

The data reception apparatus 121 is constructed to selectively obtain and reproduce a content from the MPEG2 transport stream transmitted by the data transmission apparatus 101, in accordance with an interactive operation made by the user. This data reception apparatus 121 is composed of a reception unit 122, a TS decoder unit 123, an AV decoder unit 124, a received data storage unit 125, a reception control unit 126, a signal reception unit 127, a reproduction unit 128, a display unit 129, and an audio output unit 130.

The reception unit 122 receives the MPEG2 transport stream which corresponds to the transport stream identifier indicated by the reception control unit 126, and outputs it to the TS decoder unit 123.

The TS decoder unit (transport decoder unit) 123 includes a filter condition storage unit 131 for storing the filter conditions set by the reception control unit 126, and operates in accordance with these filter conditions so as to only separate image data or audio data with a specified identifier from the transport stream outputted by the reception unit 122. The TS decoder unit 123 outputs the separated data to the AV decoder unit 124. The TS decoder unit 123 also separates stream correspondence tables, navigation information tables, and system information tables which have been multiplexed as table data under MPEG2 standard, and outputs the table data to areas maintained in the received data storage unit 125, in accordance with the identifiers.

The TS decoder unit 123 also separates the PCR (Program Clock Reference) with the specified identifier and outputs it to the AV decoder unit 124. It should be noted here that the filter condition storage unit 131 can simultaneously store a plurality of filter conditions and that the TS decoder unit 123 can simultaneously perform a plurality of separation operations in parallel.

The AV decoder unit 124 includes a clock unit which is not illustrated. This clock unit is synchronized to a standard time using the value of the PCR outputted by the TS decoder unit 123, and is used to measure time which is used as the standard for synchronized decoding of image data and audio data.

On receiving image data and/or audio data from the TS decoder unit 123, the AV decoder unit 124 reads the identifier of the image data and/or audio data written in the private are, in accordance with an indication from the reception control unit 126, and notifies the reception control unit 126 of the identifier(s). Next, the AV decoder unit 124 decodes the image data and/or audio data in predetermined units in accordance with an indication from the reception control unit 126 and outputs the decoded data to the reproduction unit 128 in synchronization with the clock unit, before informing the reception control unit 126 of the completion of the decoding.

The received data storage unit 125 can be composed of RAM (Random Access Memory), for example, and is provided with a stream corresponding information table storage unit 132, a navigation information table storage unit 133, and a system information table storage unit 134.

The stream correspondence information table storage unit 132 stores stream correspondence tables which have been separated by the TS decoder unit 123. The navigation information table storage unit 133 stores navigation information tables which have been separated by the TS decoder unit 123. The system information table storage unit 134 stores the system information tables, such as the NIT, the SDT, the EIT, the PAT, and the PMT, which have been separated by the TS decoder unit 123.

The signal reception unit 127 receives signals, such as remote controller operations made by a user, and informs the reception control unit 126 of the received signals.

The reproduction unit 128 superimposes graphics information included in the navigation information table outputted from the reception control unit 126 and image data decoded by the AV decoder unit 124 in accordance with indications from the reception control unit 126. The reproduction unit 128 outputs this combined image to the display unit 129. The reproduction unit 128 also outputs audio data decoded by the AV decoder unit 124 to the audio output unit 130.

The display unit 129 can be realized by a CRT (Cathode Ray Tube) or liquid crystal display, and is used to display the images outputted by the reproduction unit 128.

The audio output unit 130 can be realized by a speaker, and is used to output the audio signal outputted by the reproduction unit 128.

The reception control unit 126 is composed of a CPU and a program for controlling the CPU. The reception control unit 126 controls the reception unit 122 and has it receive a desired transport stream. On receiving a user operation signal via the signal reception unit 127, the reception control unit 126 refers to the navigation information table presently stored in the navigation information table storage unit 133 and sets the filter condition for the next navigation information table and the filter condition for the stream correspondence table for obtaining the image data in the filter condition storage unit 131 of the TS decoder unit 123. The reception control unit 126 then refers to the stream correspondence table which has been newly separated by the TS decoder unit 123 and stored in the stream correspondence information table storage unit 132, and sets the filter condition for the image data in the filter condition storage unit 131.

The reception control unit 126 judges whether the image data which has been separated by the reception control unit 126 is the appropriate image data by referring to the image data identifier written into the private area of the image data. When the image data is the appropriate image data, the reception control unit 126 has the image data decoded and outputted to the reproduction unit 128. When the image data is not the appropriate image data, the reception control unit 126 changes the filter condition in the filter condition storage unit 131 and gives another indication for the separation of a stream correspondence table.

The reception control unit 126 also reads graphics data for objects included in the supplementary image information in the navigation information table separated by the TS decoder unit 123. The reception control unit 126 also informs the reproduction unit 128 of this data and has the reproduction unit 128 combine the bitmap data with the image data.

As described above, the data reception apparatus 121 can separate the presentation information and navigation information for a specified content from the transport stream when necessary. By doing so, suitable link destination contents can be reproduced in accordance with user operations, so that interactive programs that can be changed in accordance with user operations can be achieved despite the communication being limited to a one-way broadcast from the data transmission apparatus.

Operation

The following is an explanation of the data composition of contents and of the operation for the display of contents by the data reception apparatus 121 in this digital broadcasting system, with reference to the drawings.

FIG. 2 shows an example display which is displayed by the data reception apparatus 121 in the digital broadcasting system described above. This figure shows an example of a mail order program, with there being a content 210 showing a mail order menu, a content 220 introducing video equipment, and a content 230 introducing stereo equipment. Here, switching between these contents can be performed according to user operations, as shown by the arrows 240, 241, 242, and 243.

When the content 210 showing the mail order menu is displayed on the display screen and the user selects and activates the "Video" button 211, the display switches, as shown by arrow 240, from content 210 to a display of content 220 that introduces video equipment. Following this, if the user selects and activates the "Menu" button 221, the display switches back to the content 210 showing the mail order menu, as shown by the arrow 241.

In the same way, when the content 210 showing the mail order menu is displayed on the display screen and the user selects and activates the "Stereo" button 212, the display switches, as shown by arrow 243, from content 210 to a display of content 230. Following this, if the user selects and activates the "Menu" button 231, the display switches back to the content 210 showing the mail order menu, as shown by the arrow 242. Here, buttons 211, 212, 221, and 231 are provided in contents 210, 220, and 230 to allow switches of display in accordance with the interactive operations made by the user.

To achieve the switches of display in response to interactive operations described above, the data which composes each of the contents transmitted by the data transmission apparatus 101 needs to have the construction described below.

FIG. 3 is a simplified representation of the data transmitted by the data transmission apparatus. Here, the transmitted data 201 is composed of data representing the various contents, and is repeatedly transmitted in its entirety, with each repeated transmission having a predetermined time period. This data is repeatedly transmitted to allow the data corresponding to a content selected by an indication of a link destination given by the user to be obtained at any given time. Since the data for the contents is repeatedly transmitted, the user will soon be able to obtain the data for the required content even when the user has commenced viewing midway through the broadcast of the program.

The transmitted data 201 is composed of a plurality of sets of image data 215, 225, and 235, and a plurality of sets of navigation information 216, 226, and 236 which correspond to the sets of image data. These sets of image data 215, 225, and 235 correspond to the background images of contents 210, 220, and 230 which are displayed on the display screen of the data reception apparatus 121.

The sets of navigation information 216, 226, and 236 include bitmap data for on-screen display graphics, such as buttons, which are displayed superimposed onto the sets of image data 215, 225, and 235, scripts which describe operation processes corresponding to user operations, and hyperlinks showing contents that are link destinations for display switching of contents. This hyperlink information is composed of identifiers for the data, such as image data, and the navigation information which compose the link destination contents.

The content 210 shown in FIG. 2 is achieved by the image data 215 and the navigation information 216. In the same way, content 220 shown in FIG. 2 is achieved by the image data 225 and the navigation information 226, and content 230 shown in FIG. 2 is achieved by the image data 235 and the navigation information 236.

FIG. 4 is a model representation of the repeated transmission of data 201 with the given interval. This data 201 is repeatedly transmitted with the given interval by the data transmission apparatus 101.

It should be noted that while the image data and navigation information in FIG. 4 have been illustrated with a frame construction, the respective data is in fact digitized, with image data and corresponding navigation information being multiplexed together and the data 201 being transmitted as an MPEG2 transport stream.

The following is a detailed explanation of the data multiplexed and transmitted by the data transmission apparatus 101.

FIG. 5 shows how the data transmitted by the data transmission apparatus 101 is multiplexed together. As shown in the figure, image data VE (N), navigation information tables NE (N), stream correspondence tables VET (N), and system information such as the PCR, PAT, and PMT are multiplexed together. The arrow 202 in FIG. 5 shows the range of the data 201 in FIG. 4 which is repeatedly transmitted.

In the example shown in FIG. 5, sixty-three contents are multiplexed together, with the sets of image data VE (0) to VE (62) each being multiplexed with the value "0x0084" as their PID and a value which is cyclically incremented between "0xe0" and "0xe±" as their stream_id. Each set of stream correspondence information VET (N) is multiplexed with the value "0x0083" as their PID and a value equal to the image data identified VE_id as their table_id_extension. Here, one set of stream correspondence information VET (N) is multiplexed for each set of image data VE (N). The sixty-three sets of navigation information NE (0) to NE (62) are multiplexed having been given the value "0x0082" as their PID and a value equal to the navigation element identifier NE_id as their table_id13 extension. Here, the PCR, PAT, and PMT are also multiplexed with predetermined values of the PID.

Here, the table_id_extension and stream_id are identifiers which are used in conjunction with the PID to identify the various sets of data.

With the stated data construction, the data reception apparatus 121 can set these identifiers into the filter condition storage unit 131 as indicated by the received data, so that the TS decoder unit 123 can separate the desired data from the transmitted transport stream.

Since the $VE_{id}$ identifier of the image data and the NE_id identifier of the navigation information are given in the hyperlink information in the navigation information corresponding to the content presently being displayed to enable the execution of hyperlinks in accordance with user operations, it is possible to separate the data composing the next content to be displayed based on the hyperlink information and so display the next content. This procedure is described in more detail below.

First, the data reception apparatus 121 obtains the PAT of the transponder (satellite broadcasting unit) presently being received. Here, when the program selected by the user is on a different transponder, the data reception apparatus 121 obtains the NIT, refers to the NIT, and controls the reception unit 122 to change the received transponder, although such case will not be described here.

Since the PID of the PAT is set beforehand at "0", the data reception apparatus 121 sets "PID=0" into the filter condition storage unit 131 so as to separate the PAT. Since the PID of the PMT is given in the PAT, the data reception apparatus 121 can obtain the PID of the PMT corresponding to the program and, by setting this into the filter condition storage unit 131, separate the PMT.

The PIDs corresponding to the components are given in the PMT, so that the data reception apparatus 121 can obtain the PID of the stream correspondence table VET, and, by setting the VE_id obtained from the hyperlink information together with the table_id_extension into the filter condition storage unit 131, the stream correspondence table VET corresponding to the desired image data can by obtained.

The component_tag and stream_id are given in the stream correspondence table VET, so that the data reception apparatus 121 can refer to the PMT based on the component_tag and obtain the PID of the appropriate component. By setting this PID and the stream_id in the filter condition storage unit 131, the data reception apparatus 121 can obtain and display the desired image data.

The data reception apparatus 121 is also able to obtain the PID of the component used for multiplexing the navigation information by referring to the PMT, and by setting the NE_id obtained from the hyperlink information with the $table\_id_{13}$ extension in the filter condition storage unit 131, can separate the desired navigation information.

As a result of the described procedure, the data reception apparatus 121 can obtain the image data and navigation information which compose the new content.

The following is a more detailed explanation of the data construction of the navigation information, using the example of the navigation information 216 which is given in outline in FIG. 3. The data construction of this navigation information 216 is shown in FIG. 6.

The navigation information 216 includes a Bytecode Part 301, a Handler_Part 302, a Graphics_Property_Part 303, a Bitmap_Information_Part 304, and a Hyperlink Information_Part 305.

The Bytecode_Part 301 is equivalent to the part of FIG. 3 represented by the word "Script", and is used to record bytecodes which are one kind of script. These bytecodes include an instruction set, such as conditional branches, integer calculations, and access to constants/variables, which allows basic programming, and to a variety of instruction sets that are related to the control or image and audio data.

In the example in FIG. 6, the bytecode with bytecode number "0" is "Push L0, GotoPage". Here, "Push L0" is an instruction which represents the storing of the value "0" in the stack, while "GotoPage" is an instruction indicating a switch of display to the content shown by the link number whose value is stored in the stack. Here, the link number is given in the Hyperlink Information_Part 305, and is an identifier for identifying a content to be switched to. Accordingly, the bytecode with the bytecode number "0" describes an operation switching the display to the link destination content given by link number "0". In the same way, the bytecode with the bytecode number "1" describes an operation switching the display to the link destination content given by link number "1".

The Handler_Part 302 is used to record the correspondence between handler numbers and bytecode numbers. In the example in FIG. 6, the handler numbers 0 and 1 respectively correspond to the bytecode numbers 0 and 1. It should be noted here that not only bytecodes, but also information defining the processing environment of handlers, such as variable areas, is given corresponding to the handlers.

The Bitmap_Information_Part 304 is the part used to record the content of the bitmaps which display buttons corresponding to the graphics numbers. In the example in FIG. 6, the graphics with the number "0" represent the bitmap "Video", while the graphics with the number "1" represent the bitmap "Stereo".

The Graphics_Property_Part 303 is information for composing the on-screen display graphics to be displayed superimposed onto the video data on the display screen, and so includes graphics numbers for identifying sets of graphics, graphics types, display coordinates for sets of graphics, a handler number associated with the graphics, and an entry showing the initial state for when the content is displayed. For the example in FIG. 6, the type for each set of graphics is "button", with graphics numbers 0 and 1 corresponding to the graphics in the Bitmap_Information_Part 304 with the same values "0" and "1". Hereinafter, the button with the graphics number "n" will be referred to as "button n" or the "nth button". In the present example, button 0 and button 1 are displayed with the x and y coordinates given as (20, 20) and (20, 60), with the handler numbers of the handlers which are activated on selection of the buttons 0 and 1 being "0" and "1". Also, the initial state of button 0 and button 1 when the content is displayed is "visible".

The Hyperlink_Information_Part 305 is used to record the IDs of the materials which compose the link destination contents. This Hyperlink_Information_Part 305 records the IDs as the information showing all of the link destination contents of the content which includes this navigation information. Here, link numbers are given to identify the sets of identifiers for the link destinations of each content. For the example in FIG. 6, NE_id=1, VE_id-1 are recorded for the link destination with the link number "0", with this indicating a link destination content composed of the information in the NE with the ID number "1" and the VE with the ID number "1". The NE_id=2, VE_id=2 are recorded for the link destination with the link number "1", with this indicating a link destination content composed of the information in the NE with the ID number "2" and the VE with the ID number "2".

It should be noted here that NE_id given as "0" at the top of FIG. 6 shows that the navigation information being explained here is the navigation element which has the ID "0".

In the data reception apparatus 121, the reception control unit 126 refers to the navigation information composed of the data described above and displays the button "video" and the button "Stereo" shown in content 210 of FIG. 2. When these buttons are selected and activated by the user, control is performed to switch the display to another content.

When a content is displayed, the reception control unit 126 refers to the Graphics_Property_Part and displays the graphics in order starting from the graphics with the graphics number "0" in the indicated initial state at the indicated coordinates. When a button is selected and activated by the user, the reception control unit 126 executes the handler process corresponding to the handler number given in the Graphics_Property_Part. This handler processing is performed by the reception control unit 126 referring to the Handler_Part and executing the bytecode in the Bytecode_Part which has the bytecode number given corresponding to the handler number in the Handler_Part. It should be noted that this execution of bytecodes is achieved by a bytecode interpreter (not illustrated) in the reception control unit 126 separating and executing one instruction at a time.

In the digital broadcasting system described above, the data, such as the image data and navigation information, necessary for displaying such content is repeatedly multiplexed and transmitted by the data transmission apparatus. The data reception apparatus which receives this data is able to separate data form the transmitted data in accordance with selection and activation operations made by the user, so that a desired content can be displayed. By doing so, an interactive service can be achieved using a one-directional broadcast.

In current broadcasting, there are cases where a broadcast of a same program is repeated several days later, and to reduce production cost and effort, there are demands for the data used to compose a program to be used once again in exactly the same form.

When considering the above demands, a broadcast which includes image data with a content such as "Campaign valid until Sep. 10, 1996" may be broadcast as it is until Sep. 10, 1996. When Sep. 11, 1996 is reached, however, it becomes unsuitable to broadcast the data as it is. In this way, there can be cases where a program will contain data which is not suitable for a repeat broadcast, so that it is necessary to develop a system where control is perform in accordance with the time of broadcast to prevent links to data unsuitable for repeat broadcasting being activated.

It is also common in the world of broadcasting for a variety of different programs to be broadcast at different times, so that there are demands for the dynamic setting of links between programs with different broadcasting times to as to link the various programs. In order to satisfy these demands, it is necessary to have a construction which performs control in accordance with the ending times of programs which are link destinations.

In the above digital broadcasting system, it is necessary to have a control structure for programs which include a time element. By doing so, program producers can efficiently generate and broadcast a great variety of programs, with the viewers being able to enjoy a wider variety of interactive programs.

In order to satisfy the need for the above kind of program service, it is necessary to perform program control with a time element for the system described here as the related art.

SUMMARY OF THE INVENTION

To satisfy the need for the kind of service described above within the framework of the related art, it is a first object of the present invention to provide a data display control apparatus that has a control mechanism for programs that include a time element. This data display control apparatus is an apparatus that can receive data transmitted by a data transmission apparatus and can display data in accordance with user operations.

It is a second object of the present invention to provide a data transmission apparatus that can transmit data that enables the realization of a control mechanism for programs that include a time element.

It is a third object of the present invention to provide a data display control information editing apparatus that edits control information for realizing a control mechanism for programs that include a time element.

The first object of the present invention can be achieved by a data display control apparatus for receiving a plurality of sets of multimedia data and a set of time control information, and for controlling the display of the sets of multimedia data, the plurality of sets of multimedia data composing a plurality of contents which make up a broadcast program, and the set of time control information being used for controlling a display of the sets of multimedia data, the data display control apparatus including: a data storage unit; a receiving unit for extracting at least one set of multimedia data and the set of time control information from data transmitted from a broadcast program transmission apparatus and storing the received sets of multimedia data and the set of time control information into the data storage unit; a current time information obtaining unit for obtaining a set of current time information including an expression of a current time; a time information judging unit for judging whether control relating to a display of the sets of multimedia data is possible by comparing the set of current time information with the set of time control information; and a display control unit for controlling the display of the sets of multimedia data based on a judging result of the time information judging unit.

With the stated construction, it is possible to realize a data display control apparatus where the time information used for control is compared with the current time to see whether control should be performed for the display of multimedia data, so that display of data can be executed where time as a condition.

Here, the set of time control information may be repeatedly transmitted by the broadcast program transmission apparatus.

With the stated construction, it is possible to realize a data display control apparatus that is able to soon obtain the time information used for controlling a content, when, at an arbitrary time, the user tries to have a content displayed by making an operation indicating a link destination.

Here, the data display control apparatus may also include: a link instruction receiving unit for receiving an instruction input by a user which specifies a new content to be displayed; and a link instruction executing unit for displaying the new content according to the instruction received by the link instruction receiving unit.

With the stated construction, it is possible to realize a data display control apparatus that enables the user to perform interactive operations for the display of contents.

Here, the receiving unit may also extract the set of current time information from the data transmitted from the broadcast program transmission apparatus, and the current time information obtaining unit may obtain the current time information from the receiving unit.

With the stated construction, since the time information is obtained by extracting it from the transmitted data, the timing at which operations are made for the display of multimedia data will be the same as the timing intended by the producer of the program.

Here, the data storage unit may store a time difference value which indicates a time difference between the expression of the current time in the set of current time information and a standard control time in the set of time control information, and the control judging unit may refer to the time difference value and correct a content of the current time information using the time difference when comparing the set of current time information with the set of time control information.

With the stated construction, it is possible to realize a data display control apparatus that can execute operations for the display of multimedia data at almost the same timing as intended by the producer of the program, even when there is a time difference between the current time and the time in the time control information for controlling the display of multimedia data.

Here, the receiving unit may extract the time difference value and the set of current time information from the data transmitted from the broadcast program transmission apparatus and storing the extracted time difference value in the data storage unit, and the current time information obtaining unit may obtain the set of the current time information from the receiving unit.

With the stated construction, it is possible to realize a data display control apparatus that can execute operations for the display of multimedia data at exactly the same timing as intended by the producer of the program, even when there is the time difference described above.

Here, it is also possible to have a data display control apparatus for receiving a plurality of sets of multimedia data that compose a plurality of contents which make up a broadcast program, and for controlling a display of the sets of multimedia data, the data display control apparatus including: a data storage unit; a receiving unit for extracting, from data transmitted from a broadcast program transmission apparatus, the plurality of sets of multimedia data, at least one instruction for executing a certain operation, and at least one set of time control information for controlling execution of at least one related instruction, the receiving unit storing the separated sets of multimedia data, instructions, and sets of time control information into the data storage unit; a current time information obtaining unit for obtaining a set of current time information including an expression of a current time; a time information judging unit for judging whether execution of an arbitrary instruction is possible by comparing the set of current time information with a set of time control information related to the arbitrary instruction; a display control unit for executing the arbitrary instruction based on a judging result of the time information judging unit; a link instruction receiving unit for receiving an instruction input by a user which specifies a content to be displayed; and a link instruction executing unit for displaying the content according to the instruction received by the link instruction receiving unit.

With the stated construction, it is possible to realize a data display control apparatus that can control whether instructions denoting operations should be executed based on an indicated time.

Here, the instructions may be instructions that control a display of the sets of multimedia data.

With the stated construction, it is possible to realize a data display control apparatus that can control the execution for operations relating to the display of multimedia data based on time.

Here, it is also possible to have a data display control apparatus for receiving a plurality of sets of multimedia data and a plurality of sets of time control information, and for controlling the display of the sets of multimedia data, the plurality of sets of multimedia data composing a plurality of contents which are elements of a broadcast program, each of the plurality of sets of time control information being related to a set of multimedia data and being used for controlling a display of the related set or multimedia data, the data display control apparatus including: a data storage unit; a receiving unit for extracting at least one set of multimedia data and at least one set of time control information from data transmitted from a broadcast program transmission apparatus and for storing the sets of multimedia data and the sets of time control information into the data storage unit; a current time information obtaining unit for obtaining a set of current time information including an expression of a current time; a time information judging unit for judging whether control relating to a display of an arbitrary set of multimedia data is possible by comparing the set of current time information with a set of time control information related to the arbitrary set of multimedia data; a display control unit for controlling the display of the arbitrary set of multimedia data based on a judging result of the time information judging unit; a link instruction receiving unit for receiving an instruction input by a user which specifies a content to be displayed; and a link instruction executing unit for displaying the content according to the instruction received by the link instruction receiving unit.

With the stated construction, it is possible to realize a data display control apparatus that can control display of units of multimedia data based on time.

Here, it is also possible to have a data display control apparatus for receiving a plurality of sets of multimedia data and a plurality of sets of time control information and controlling display of the sets of multimedia data, wherein the plurality of sets of multimedia data compose a plurality of contents which make up a broadcast program, and each set of time control information corresponds one of the plurality of contents, the data display control apparatus including: a data storage unit; a receiving unit for extracting at least one set of multimedia data and at least one set of time control information from data transmitted from a broadcast program transmission apparatus and storing the sets of multimedia data and the sets of time control information into the data storage unit; a current time information obtaining unit for obtaining a set of current time information including an expression of a current time; a link instruction receiving unit for receiving an instruction input by a user which specifies a content to be displayed; a link instruction executing unit for displaying the content according to the instruction received by the link instruction receiving unit; a time information judging unit for judging, when the link instruction executing unit displays the content, whether control relating to a display of the content is possible by comparing the set of current time information with a set of time control information related to the displayed content; and a display control unit for controlling the display of the content based on a judging result of the time information judging unit.

With the stated construction, it is possible to realize a data display control apparatus that performs control of display for content units based on time.

Here, it is also possible to have a data display control apparatus for receiving a plurality of sets of multimedia data, at least one instruction, and one set of time control information related to each instruction, and for controlling display of the sets of multimedia data by executing the instructions, wherein the plurality of sets of multimedia data compose a plurality of contents which make up a broadcast program, and wherein each set of time control information is used for controlling execution of the related instruction, the data display control apparatus including: a data storage unit; a receiving unit for extracting at least one set of multimedia data, at least one instruction, and at least one set of time control information from data transmitted from a broadcast program transmission apparatus and storing the received sets of multimedia data, the received instructions, and received sets of time control information into the data storage unit; a current time information obtaining unit for obtaining a set of current time information including an expression of a current time; a time information judging unit for judging whether an execution of an arbitrary instruction is possible by comparing the set of current time information with a set of time control information related to the arbitrary instruction; a display control unit for executing the arbitrary instruction based on a judging result of the time information judging unit; a link instruction receiving unit for receiving an instruction input by a user which specifies a content to be displayed; and a link instruction executing unit for displaying the content according to the instruction received by the link instruction receiving unit.

With the stated construction, it is possible to realize a data display control apparatus that automatically performs display at a predetermined time.

Here, the sets of time control information may also be related to the contents, and the display control unit may execute the arbitrary instruction when a content related to the set of time control information compared by the time information judging unit is being displayed.

With the stated construction, it is possible to realize a data display control apparatus that executes a specified operation such as the display of multimedia data only when a specified content is presently being displayed.

Here, each set of time control information may indicate an absolute control time and the set of current time information includes an absolute current time as the expression of a current time, and the time information judging unit may judge that execution of the arbitrary instruction is possible when the control time is equal to or earlier than the absolute current time.

With the stated construction, it is possible to realize a data display control apparatus that can perform the display of multimedia data once a predetermined time period has elapsed, but will not display the data before this predetermined time period has elapsed.

Here, each set of time control information may indicate a control elapsed time and the set of current time information indicates an elapsed time from a start of a display of a current content as the expression of a current time, and the time information judging unit may judge that execution of the arbitrary instruction is possible when the elapsed time is equal to or greater than the control elapsed time in a set of time control information for the arbitrary instruction.

With the stated construction, it is possible to realize a data display control apparatus that can perform the display of multimedia data once a predetermined time period has elapsed from the start of display of a content.

Here, it is also possible to have a data display control apparatus for receiving a plurality of sets of multimedia data, at least one instruction, and at least one set of time control information, and for controlling display of the sets of multimedia data, wherein the plurality of sets of multimedia data compose a plurality of contents which make up a broadcast program, wherein the instructions are used to control a display of the sets of multimedia data, and wherein each set of time control information is used for controlling execution of a related instruction and is also related to a grouping of sets of multimedia data, the data display control apparatus including: a data storage unit; a receiving unit for extracting, from data transmitted from a broadcast program transmission apparatus, at least one set of multimedia data, at least one instruction, at least one set of time control information, and a set of identification information for a grouping of sets of multimedia data, and for storing the sets of multimedia data, the received instructions, the received set of time control information, and the received set of identification information into the data storage unit; a current time information obtaining unit for obtaining a set of current time information for a current time; a time information judging unit for judging whether execution of an arbitrary instruction is possible by comparing the set of current time information with a set of time control information related to the arbitrary instruction; a display control unit for referring to the received set of identification information, and, when a set of multimedia data belonging to the grouping of sets of multimedia data identified by the set of identification information is being displayed, executing the arbitrary instruction based on a judging result of the time information judging unit; a link instruction receiving unit for receiving an instruction input by a user which specifies a content to be displayed; and a link instruction executing unit for displaying the content according to the instruction received by the link instruction receiving unit.

With the stated construction, it is possible to realize a data display control apparatus that can execute a specified operation only when specified multimedia data is presently being displayed.

Here, it is also possible to have a data display control apparatus for receiving a plurality of sets of multimedia data, at least one instruction, and at least one set of time control information, and controlling a display of the sets of multimedia data according to an operation indication input by a user, wherein the plurality of sets of multimedia data compose a plurality of contents which make up a broadcast program, the instructions control a display of the sets of multimedia data, and each set of time control information relates to an execution of an instruction, the data display control apparatus including: a data storage unit; a receiving unit for extracting at least one set of multimedia data, at least one instruction, and at least one set of time control information from data transmitted from a broadcast program transmission apparatus and storing the received sets of multimedia data, the received instructions, and the received sets of time control information into the data storage unit; a current time information obtaining unit for obtaining a set of current time information for a current time; an operation indication receiving unit for receiving the operation indication input by the user; a time information judging unit for judging, when the operation indication receiving unit receives the operation indication, whether execution of an arbitrary instruction is possible by comparing the set of time control information related to the arbitrary instruction with the set of current time information; and a display control unit for executing the arbitrary instruction based on the judging result of the time information judging unit.

With the stated construction, it is possible to realized a data display control apparatus that can execute a specified operation in response to a user operation only after judging from a time element that execution should be performed.

The second object of the present invention can be achieved by a data transmission apparatus for transmitting a plurality of sets of multimedia data, wherein the plurality of sets of multimedia data compose a plurality of contents which make up a broadcast program, the data transmission apparatus including: a transmission data storage unit for storing the plurality of sets of multimedia data and a set of time control information used for controlling display of the plurality of sets of multimedia data; and a transmission unit for transmitting the plurality of sets of multimedia data and the set of time control information.

With the stated construction, it is possible to realize a data transmission apparatus that can transmit to a data display control apparatus sets of information indicating a display timing of multimedia data which composes a program, the program being a one-directionally transmitted program that allows interactive operations to be made.

Here, the transmission unit may repeatedly transmit the set of time control information.

With the stated construction, it is possible to realize a data transmission apparatus that transmits data so that a data display control apparatus can soon obtain time information used for control of a content, when a content which has been selected as a link destination at an arbitrary time by a user is to be displayed.

Here, the transmission data storage unit may further store a set of link information which shows interrelations between contents in the plurality of contents, and the transmission unit may also transmit the set of link information.

With the stated construction, it is possible to realize a data transmission apparatus which transmits data that enables interactive operations to be made by the user for the display of contents.

Here, the data transmission apparatus of claim 17 also include: a time measuring unit for measuring a current time, wherein the transmission unit further transmits a set of current time information showing the current time.

With the stated construction, it is possible to realize a data transmission apparatus which transmits data that enables control or the timing of display of multimedia data according to time information which is correct for the data display control apparatus.

Here, the transmission data storage unit may store a time difference value which indicates a time difference between the current time and a standard control time in the set of time control information, and the transmission unit may further transmit the time difference value.

With the stated construction, it is possible to realize a data transmission apparatus which transmits data that displays multimedia data at the correct timing, even when there is a time difference between the standard times of the control information for controlling the display of multimedia data and the present time.

Here, it is also possible to have a data transmission apparatus for transmitting a plurality of sets of multimedia data, wherein the plurality of sets of multimedia data compose a plurality of contents which make up a broadcast program, the data transmission apparatus including: a transmission data storage unit for storing the plurality of sets of multimedia data, at least one instruction for executing a certain operation, at least one set of time control information for controlling an execution of a related instruction, and a set of link information which shows interrelations between contents in the plurality of contents; and a transmission unit for transmitting the plurality of sets of multimedia data, the instructions, the sets of time control information, and the set of link information.

With the stated construction, it is possible to realize a data transmission apparatus which transmits data for executing specified operations at a given time.

Here, each of the instructions may control a display of a set of multimedia data.

With the stated construction, it is possible to realize a data transmission apparatus which transmits data for enabling control of operation executions relating to the display of multimedia data according to time.

Here, it is also possible to have a data transmission apparatus for transmitting a plurality of sets of multimedia data, wherein the plurality of sets of multimedia data compose a plurality of contents which make up a broadcast program, the data transmission apparatus including: a transmission data storage unit for storing the plurality of sets of multimedia data, a plurality of sets of time control information that each correspond to one set of multimedia data and are used to control a display of a corresponding set of multimedia data, and a set of link information which shows interrelations between contents in the plurality of contents; and a transmission unit for transmitting the plurality of sets of multimedia data, the plurality of sets of time control information, and the set of link information.

With the stated construction, it is possible to realize a data transmission apparatus that allows a data display control apparatus to control display of multimedia data units based on time.

Here, it is also possible to have a data transmission apparatus for transmitting a plurality of sets of multimedia data, wherein the plurality of sets of multimedia data compose a plurality of contents which make up a broadcast program, the data transmission apparatus including: a transmission data storage unit for storing the plurality of sets or multimedia data, a plurality of sets of time control information that each correspond to one content and are used to control a display of a corresponding content, and a set of link information which shows interrelations between contents in the plurality of contents; and a transmission unit for transmitting the plurality of sets of multimedia data, the plurality of sets of time control information, and the set of link information.

With the stated construction, it is possible to realize a data transmission apparatus that allows a data display control apparatus to control display of content units based on time.

Here, it is also possible to have a data transmission apparatus for transmitting a plurality of sets of multimedia data, wherein the plurality of sets of multimedia data compose a plurality of contents which make up a broadcast program, the data transmission apparatus including: a transmission data storage unit for storing, the plurality of sets of multimedia data, at least one instruction for controlling display of the sets of multimedia data, at least one set of time control information for automatically starting an execution of a related instruction; and a set of link information which shows interrelations between contents in the plurality of contents; and a transmission unit for transmitting the plurality of sets of multimedia data, the instructions, the sets of time control information, and the set of link information.

With the stated construction, it is possible to realize a data transmission apparatus that has a data display control apparatus automatically perform display control at a predetermined time.

Here, each set of time control information may indicate a control time which is an indicated time.

With the stated construction, it is possible to realized a data transmission apparatus that transmits programs for which instructions for operations such as the display of multimedia data are executed or not depending on time.

Here, each set of time control information may indicate a control elapsed time showing an elapsed time from a start of display of a predetermined content.

With the stated construction, it is possible to realize a data transmission apparatus that transmits data which enables a data display control apparatus to perform the display of multimedia data a predetermined time after displaying a predetermined content.

Here, it is also possible to have a data transmission apparatus for transmitting a plurality of sets of multimedia data, wherein the plurality of sets of multimedia data compose a plurality of contents which make up a broadcast program, the data transmission apparatus including: a transmission data storage unit for storing the plurality of sets of multimedia data, at least one instruction for controlling a display of the sets of multimedia data, at least one set of time control information, and a set of link information which shows interrelations between contents in the plurality of contents, wherein each set of time control information is composed of time information for an automatic start of execution of one of the instructions and is related to a grouping of sets of multimedia data; and a transmission unit for transmitting the plurality of sets of multimedia data, the instructions, the sets of time information, and the set of link information.

With the stated construction, it is possible to realize a data transmission apparatus that enables a data display control apparatus to perform specified operations only when a specified set of multimedia is currently being displayed.

Here, it is also possible to have a data transmission apparatus for transmitting a plurality of sets or multimedia data, wherein the plurality of sets of multimedia data compose a plurality of contents which make up a broadcast program, the data transmission apparatus including: a transmission data storage unit for storing the plurality of sets of multimedia data, at least one instruction for controlling a display of the sets of multimedia data, at least one set of time control information which is used as a criterion by a reception apparatus in judging whether to execute a related instruction; and a set of link information which shows interrelations between contents in the plurality of contents; and a transmission unit for transmitting the plurality of sets of multimedia data, the instructions, the sets of time control information, and the set of link information.

With the stated construction, it is possible to realize a data transmission apparatus that enables a data display control apparatus to perform specified operations in response to user operations based on the time at which the user operations are made.

The third object of the present invention can be achieved by a data display control information editing apparatus for displaying interrelations between a plurality of contents on a display screen and for editing, in accordance with a user operation, sets of time-related information that are used for controlling the interrelations, the data display control information editing apparatus including: a data storage unit for storing a plurality of pairings of a set of link information and a set of valid period information and storing a set of content control information, wherein each set of link information indicates a change in display from a first content to a second content, each set of valid period information indicates a valid period of a corresponding set of link information, and the set of content control information is used for controlling display and processing of contents; a time receiving unit for receiving an indicated time input by a user; and a content relation displaying unit for displaying interrelations between contents at the indicated time received by the time receiving unit, based on the pairings of a set of link information and a set of valid period information which has a valid period that includes the indicated time received by the time receiving unit.

With the stated construction, it is possible to realize a data display control information editing apparatus that allows the user to understand the links between contents at a glance, and allows the user to see what links are valid at a time indicated by the user.

Here, the data display control information editing apparatus may also include: a content specification receiving unit for receiving a specification of a content input by a user; and a link information updating unit for updating a set of valid period information of a set of link information which indicates a change in display to the content specified by the user so that the set of link information is made invalid at the indicated time received by the time receiving unit.

With the stated construction, it is possible to realize a data display control information editing apparatus which generates control information that prevents the display of an indicated content after a time indicated by the user by severing a link from a content to the indicated content.

Here, the sets of link information and the sets of valid period information are transmitted form a transmission apparatus used in a digital broadcast system to a data display control apparatus which displays contents.

With the stated construction, it is possible to realize a data display control information editing apparatus which generates control information that has a specified operation executed at a specified time by a data display control information editing apparatus that receives a digital broadcast.

BRIEF DESCRIPTION OF THE INVENTION

These and other objects, advantages and features of the invention will become apparent from the following description thereof taken in conjunction with the accompanying drawings which illustrate a specific embodiment of the invention. In the drawings:

FIG. 6 shows the data construction of the navigation information 216 in the related art;

FIG. 7 is a block diagram showing the construction of the data display control apparatus in the first embodiment of the present invention.

FIG. 11 shows the data construction of the navigation information 2160;

FIG. 15 shows the transformation in the display screen;

FIG. 21 shows the transformation in the display screen in the second embodiment;

FIG. 22 shows the data construction of the navigation information 2180;

FIG. 26 shows the changes in the display screen in the fourth embodiment;

FIG. 27 shows the data construction of the navigation information 7160;

FIG. 31 shows the data construction of the navigation information 8160;

FIG. 33A shows the transformation in the display screen when the user gives his/her answer within the time limit of a quiz;

FIG. 33B shows the transmission in the display screen when the user does not give his/her answer within the time limit of a quiz;

FIG. 36 shows an example display for the display screen of the data display control information editing apparatus 10000;

DESCRIPTION OF THE PREFERRED EMBODIMENTS

First Embodiment

Figure 1:
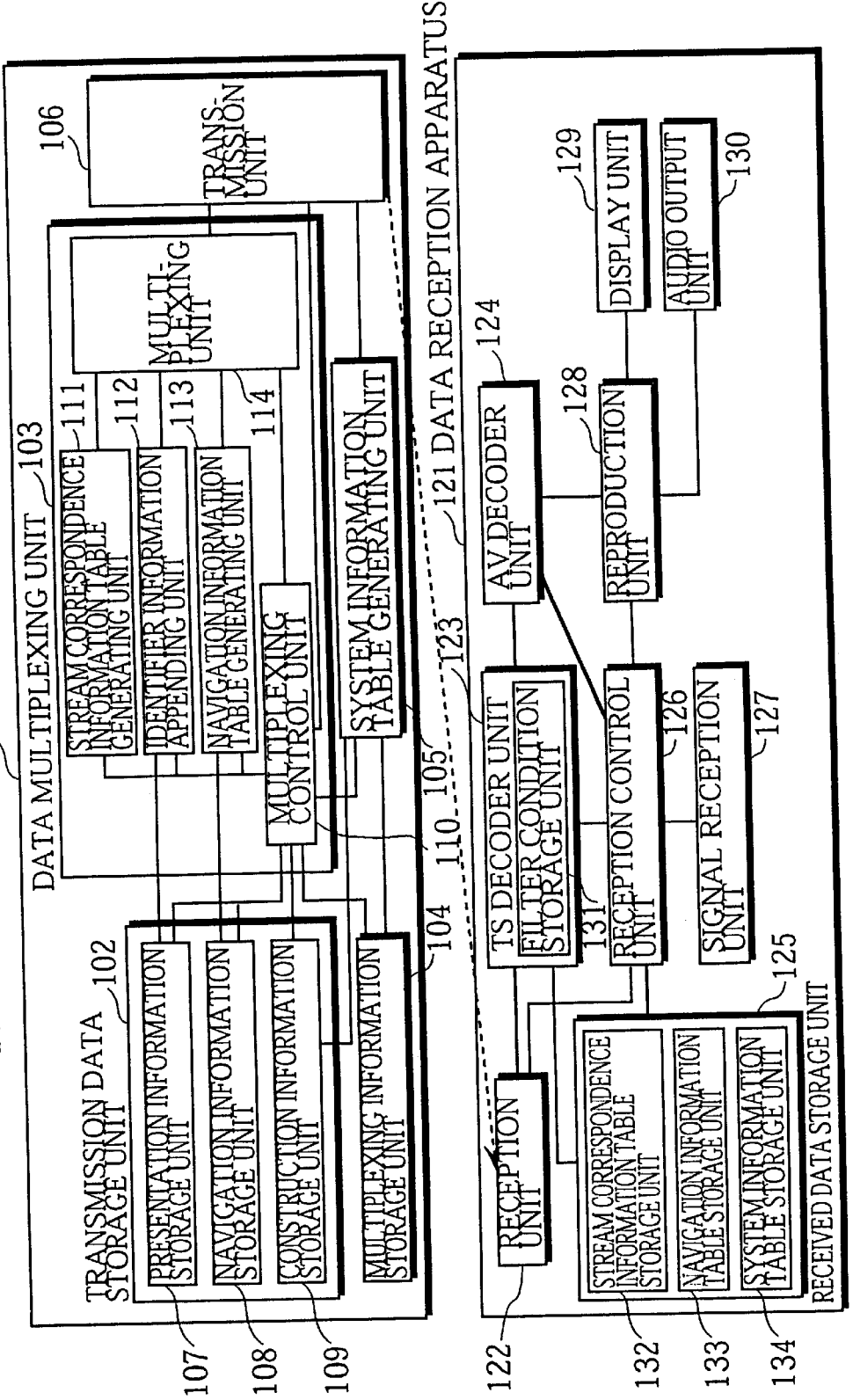
FIG. 1 shows the construction of a digital broadcasting system of the related art.

The first embodiment of the present invention relates to a data transmission apparatus that broadcasts programs for which specified operations can be performed at a specified time, and to a data display control apparatus which receives transmitted data and performs the specified operations at indicated times. This first embodiment of the present invention is described in detail below, with reference to the drawings.

The data display control apparatus to the first embodiment of the present invention is an apparatus which receives an MPEG2 transport stream transmitted by a transmission apparatus for a digital broadcast and interactively separates and reproduces contents from the MPEG2 transport stream in accordance with user operations.

The term "content" is used to express the unit of information for which interactive operations can be performed by the user. Here, each content is composed of presentation information and navigation information. The presentation information is composed of image data and audio data. The navigation information is composed of bitmap data for buttons that are used to compose on-screen display graphics that are displayed superimposed onto the various kinds of image data, scripts that represent the operation processing to be performed in response to user operations, and hyperlinks that express the contents for the link destinations to which the display can be switched in accordance with user operations. The transmission data is formed by multiplexing the presentation information and navigation informations, and is repeatedly transmitted by the data transmission apparatus in the first embodiment as a MPEG2 transport stream in accordance with MPEG2 (moving Pictures Experts Group Phase2) standards.

It should be noted here that the data transmission apparatus in the first embodiment performs transmission of at least one MPEG2 transport stream on a variety of bandwidths for a same satellite (network), in the same way as a conventional digital satellite broadcasting system. Here, all of the broadcast programs are multiplexed into the MPEG2 transport streams.

Construction of the Data Display Control Apparatus

The following is an explanation of the construction of the data display control apparatus in the first embodiment of the present invention.

The construction of the data display control apparatus of the first embodiment is shown by the block diagram in FIG. 7. As shown in the figure, the data display control apparatus 1000 is composed of a reception unit 1010, a TS decoder unit 1020, and AV decoder unit 1030, a received data storage unit 1040, a reception control unit 1050, a reproduction unit 1060, a display unit 1070, an audio output unit 1080, and a signal reception unit 1100.

The reception unit 1010 receives the MPEG2 transport stream and outputs it to the TS decoder unit 1020. It should be noted here that the indication of the MPEG2 transport stream is performed using identifiers according to control by the reception control unit 1050.

The TS decoder unit 1020 includes a filter condition storage unit 1021 for storing the filter conditions specified by the reception control unit 1050, and operates in accordance with these filter conditions so as to only separate image data or audio data with identifiers indicated by the reception control unit 1050 from the transport stream outputted by the reception unit 1010. The TS decoder unit 1020 outputs the separated data to the AV decoder unit 1030. The TS decoder unit 1020 also separates table data with identifiers specified by the reception control unit 1050 and outputs the table data to the received data storage unit 1040. The TS decoder unit 1030 also separates a PCR (Program Clock Reference) and outputs it to the AV decoder unit 1030.

The filter condition storage unit 1021 is capable of simultaneously storing a plurality of filter conditions and the TS decoder unit 1020 is capable of performing a plurality of separations based on the filter conditions in parallel. Here, the term "filter condition" refers to indication information, such as the stream IDs and table IDs for separating image data, audio data, navigation information, PCRs, and other control information, output destinations for the separated data, and control information which start or stops separation operations.

The AV decoder unit 1030 includes a clock unit 1031 and an internal buffer, and on receiving image data and/or audio data from the TS decoder unit 1020, stores the data in its internal buffer. The AV decoder unit 1030 then decodes the image data and/or audio data in the predetermined decoding units in accordance with instructions from the reception control unit 1050 and outputs the decoded data to the reproduction unit 1060 in synchronization using the clock unit 1031.

The clock unit 1031 is set at a standard time using the value of the PCR outputted by the TS decoder unit 1020 and is used to measure time that is used as the standard to ensure that image data and audio data are decoded in synchronization.

The received data storage unit 1040 can be composed of RAM, for example, and includes a stream correspondence storage unit 1041, a navigation information storage unit 1042, a system information table storage unit 1043, and a time information storage unit 1044. It should be noted here that the stream correspondence storage unit 1041 is the same as the stream correspondence table storage unit 132 in the related art, the navigation information storage unit 1042 is the same as the navigation information table storage unit 133, and the system information storage unit 1043 is the same as the system information table storage unit 134.

The stream correspondence storage unit 1041 has an area for storing information showing the multiplexing units in the stream for the images and audio which compose each content, with this area storing sets of stream correspondence information VET which are information showing the relationship between VE_ids, which are identifiers for video elements (VE) which are units or information for image data, and multiplexing units for VEs in the stream. Accordingly, the identifier VE_id is used to specify the image data to be displayed.

In the same way, the navigation information storage unit 1042 has an area for storing navigation information, the system information storage unit 1043 has an area for storing system information such as the PAT and PMT and the time information storage unit 1044 has an area for storing the TOT and the TDT.

The PAT (Program Association Table) referred to here is information for managing a plurality of broadcast programs in accordance with MPEG2 system standard. The PAT includes PIDs which are identifiers for separating a PMT for each program, with the PID of the PAT itself being predetermined as "0".

As a result, the date display control apparatus can separate the PAT from the transmitted data by setting the PID "0" in the filter condition storage unit 1021, with the separated PAT being stored in the system information storage unit 1043.

The PMT (Program Map Table) is information for managing the various kinds of information required by one broadcast program in accordance with MPEG2 system standard. The PMT includes the PIDs that are the identifiers used for separating the PCR, the image data, and navigation information, and identifiers for the image data and navigation information of the content which is to be displayed first when the present program is selected.

When a program is selected by the user of the data display control apparatus, the data display control apparatus refers to the PAT to obtain the PID of the PMT corresponding to the selected program and sets this PID in the filter condition storage unit 1021 to separate the PMT which it then stores in the system information storage unit 1043.

The TDT (Time and Data Table) is information showing a standard time for the present date and time, while the TOT (Time Offset Table) is information showing a time difference for different countries. This TDT and TOT are described in more detail later in this specification.

The signal reception unit 1100 receives a signal for a user operation sent from a remote controller or the like, and informs the reception control unit 1050 of the received signal.

The reproduction unit 1060 superimposes on-screen display graphics information outputted by the reception control unit 1050 onto the image data decoded by the AV decoder unit 1030 in accordance with indications from the reception control unit 1050, and outputs a combined image to the display unit 1070. The reproduction unit 1060 also outputs the audio data decoded by the AV decoder unit 1030 to the audio output unit 1080.

The display unit 1070 can be realized by a CRT or liquid crystal display, and is used to display the images outputted by the reproduction unit 1060.

The audio output unit 1080 can be realized by a speaker, and outputs the audio outputted by the reproduction unit 1060.

The reception control unit 1050 has a bytecode interpreter 1051, and control the reception unit 1010, the TS decoder unit 1020, the AV decoder unit 1030, and the reproduction unit 1060 to receive the desired transport stream, to reset the filter conditions in the filter condition storage unit 1021 for the data to be separated, and to reproduce the desired images and audio. The reception control unit 1050 also performs a variety of operations in response to user operations.

In accordance with a user operation, the reception control unit 1050 refers to the navigation information in the navigation information storage unit 1042, outputs the on-screen display graphics to be displayed superimposed on the image data to the reproduction unit 1060, and, when a button operation is made by the user, executes the corresponding handler processing. Here, buttons are displayed on the display screen using these on-screen display graphics and are displayed based on bitmap information (or the like) given in the navigation information. The handler processing referred to here is an operation which is executed corresponding to the occurrence of an event, and is performed based on the scripts given in the navigation information.

The bytecode interpreter 1051 interprets the scripts given in the navigation information one by one and executes them.

Data Composition of the Contents and the Display Screen

The following is an explanation of the display screen of the data display control apparatus 1000 which displays the contents and of the data which composes each content, with reference to FIGS, 8, 9, 10, and 11.

Figure 2:
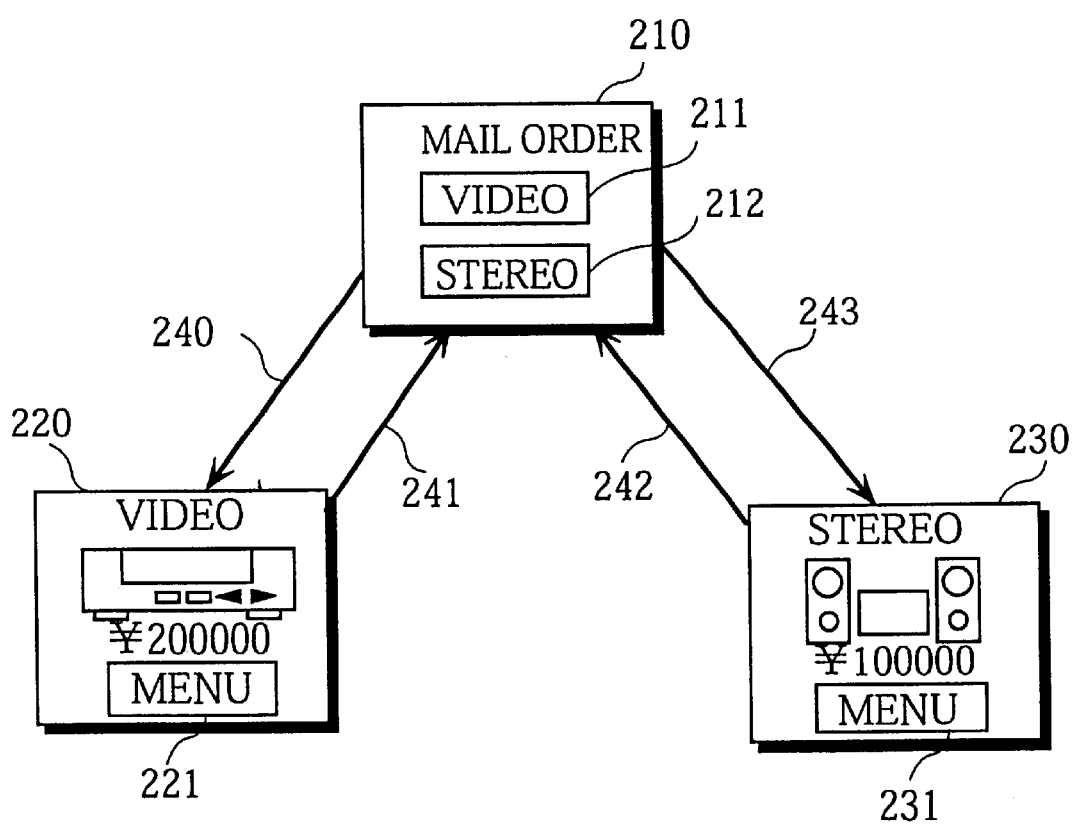
FIG. 2 shows an example of images displayed by the data reception apparatus in the digital broadcasting system of the related art.
Figure 8:
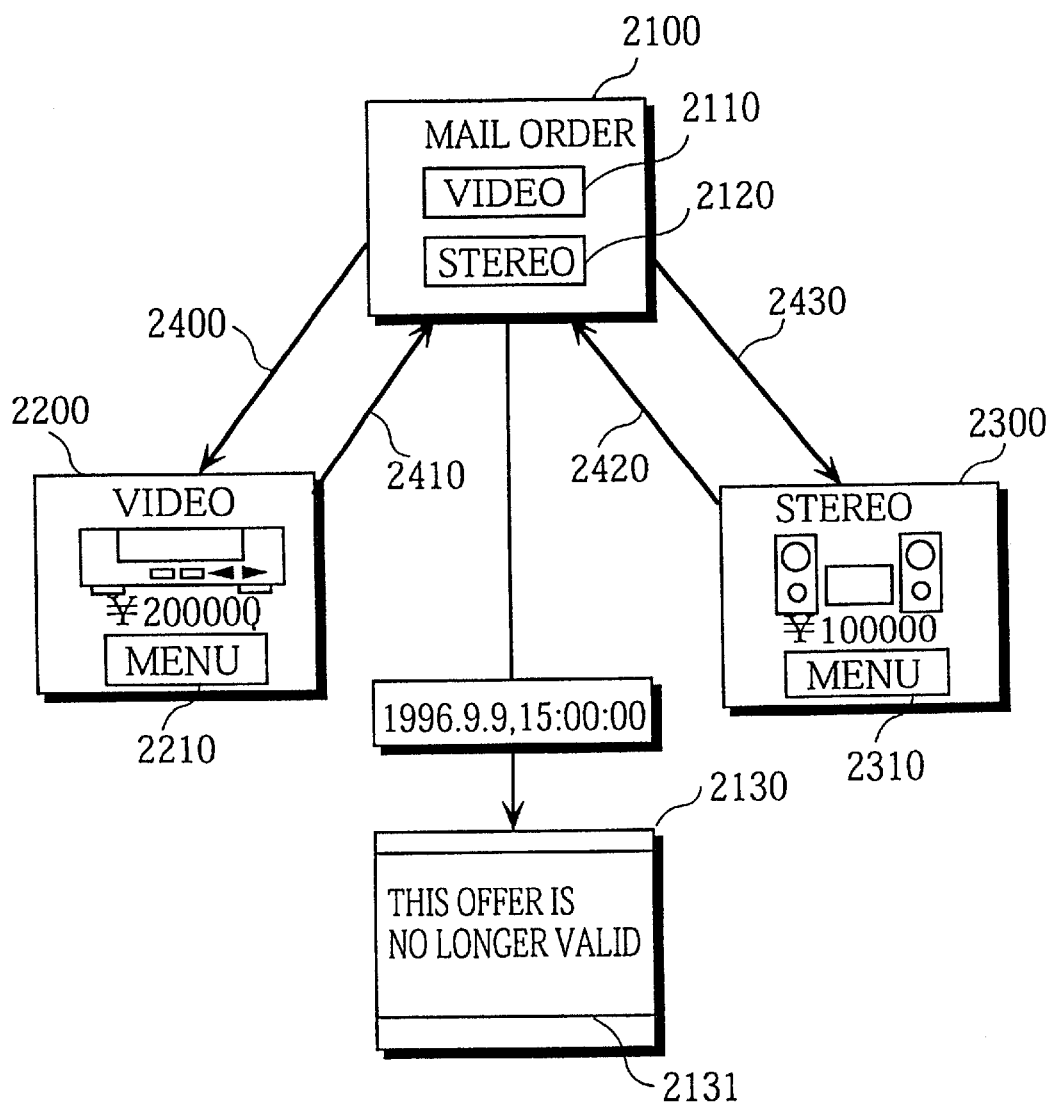
FIG. 8 shows examples of images displayed by the data display control apparatus 1000 in the first embodiment of the present invention.

FIG. 8 shows an example of the screen displayed by the data display control apparatus 1000 in the first embodiment of the present invention. This figure corresponds to FIG. 2 of the related art section and shows and example of a mail order program. FIG. 8 shows a content 2100 which displays a mail order menu, a content 2200 which displays information about video equipment, and a content 2300 which displays information about stereo equipment. Here, switching is possible between these contents 2100, 2200, and 2300 in accordance with user operations, as shown by the arrows 2400, 2410, 2420, and 2430. The difference with FIG. 2 is that content 2130 is provided as the same content as content 2100 after a given time period has passed.

When the content 2100 representing the mail order menu is displayed on the display screen and the user selects and activates the "Video" button 2110, the display switches as shown by the arrow 2400 from content 2100 to content 2200 which displays information about video equipment. If the user then selects and activates the "Menu" button 2210, the display switches as shown by the arrow 2410 back from the content 2200 to the content 2100.

In the same way, when the content 2100 representing the mail order menu is displayed on the display screen and the user selects and activates the "Stereo" button 2120, the display switches as shown by the arrow 2430 from content 2100 to content 2300 which displays information about stereo equipment. If the user then selects and activates the "Menu" button 2310, the display switches as shown by the arrow 2420 back from the content 2300 to the content 2100. Here, contents 2100, 2200, and 2300 are provided with buttons 2110, 2120, 2210, and 2310 to allow the user to make the interactive operations which switch the display as described.

When the time15:00:00 on Sep. 9, 1996 is reached, the display of the content 2100 is changed to become displayed as the content 2130 where the button "This offer is no longer valid" is displayed. This button 2131 is displayed according to data which is already included as part of content 2100.

Data Transmission Apparatus

The following is an explanation of the transmission of the data composing each content by the data transmission apparatus in the digital broadcasting system of the first embodiment of the present invention. It should be noted here that the data transmission apparatus of the first embodiment has the same construction as the data transmission apparatus 101 (see FIG. 1) described in the related art section. However, unlike the related art, information is included in the transmitted navigation information to enable control according to a Lime element, with the content of this navigation information being described later in this specification.

Figure 9:
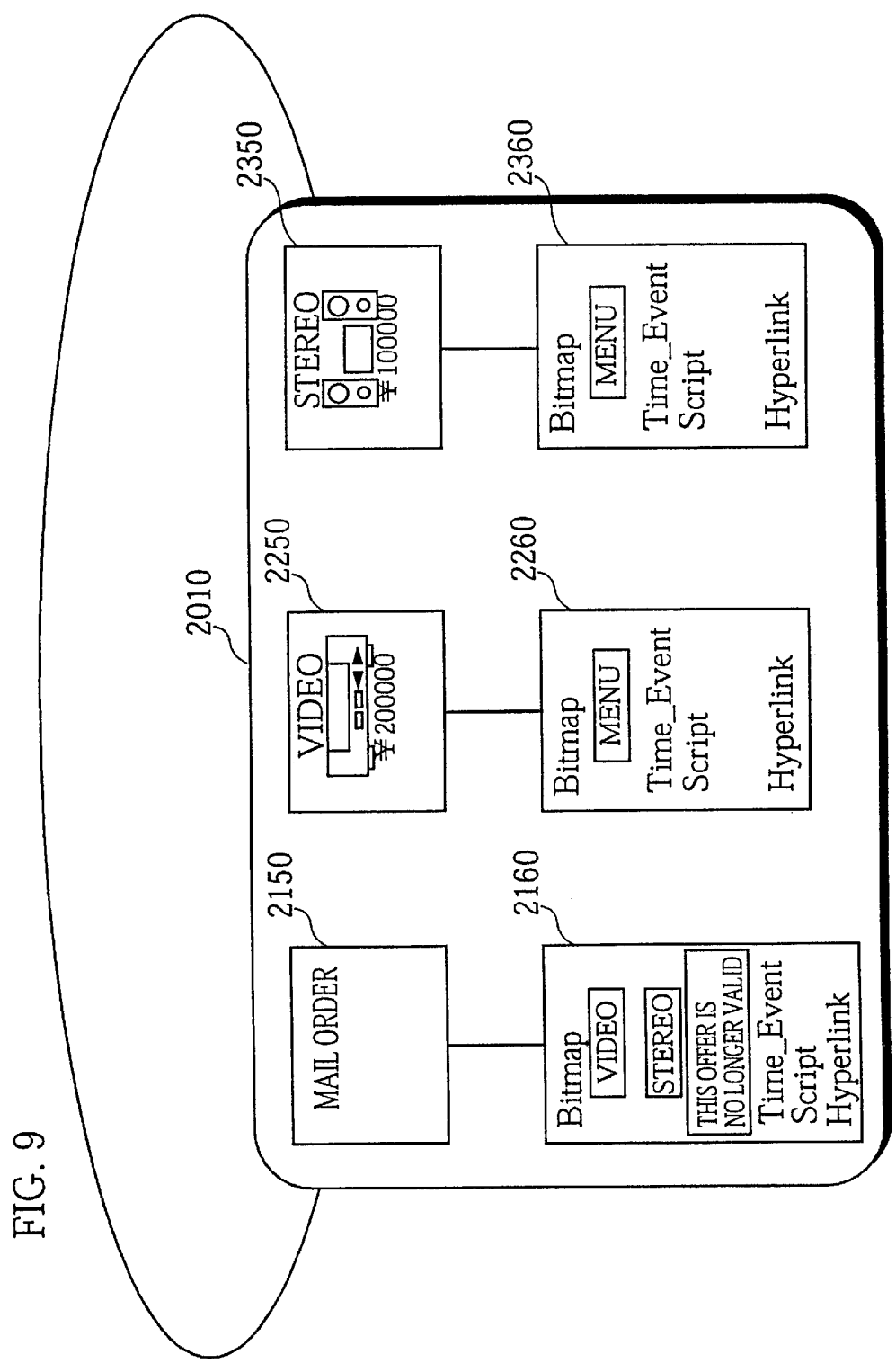
FIG. 9 is a simplified representation of the data transmitted by the data transmission apparatus.

FIG. 9 is a simplified representation of the data transmitted from the data transmission apparatus. This figure corresponds to FIG. 3 in the related art section, with the transmitted data 2010 corresponding to data 201 in FIG. 3, the image data 2150, 2250, and 2350 corresponding to image data 215, 225, and 235 in FIG. 3, and the navigation information 2160, 2260, and 2360 corresponding to data 216, 226, and 236 in FIG. 3.

Each set of image data 2150, 2250, and 2350 represents a background image for the contents 2100, 2200, and 2300 which are displayed on the display screen of the data display control apparatus 1000.

Figure 3:
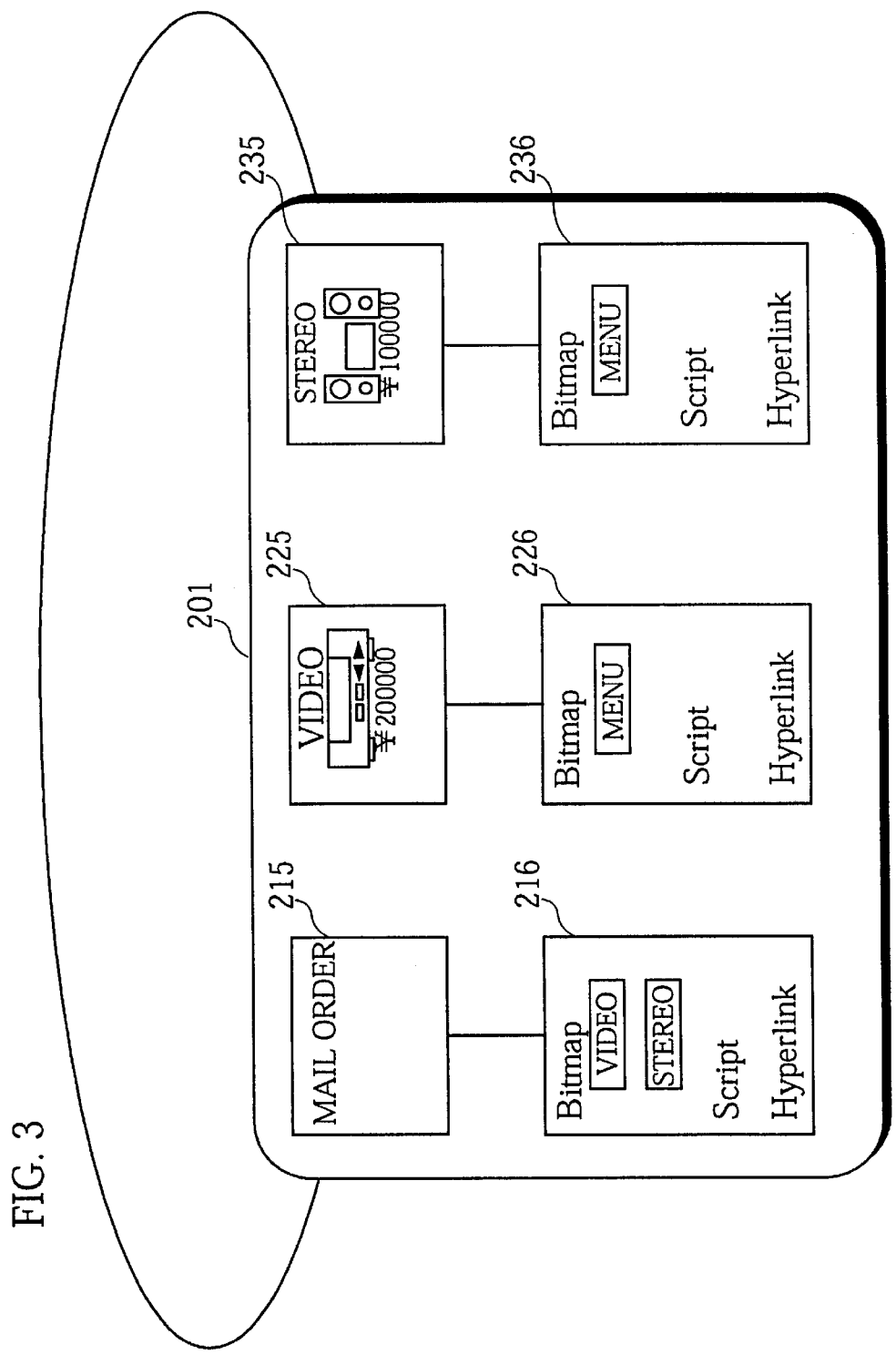
FIG. 3 is a simplified representation of the data transmitted by the data transmission apparatus of the related art.

The difference between FIG. 3 and FIG. 9 lies in the inclusion of control information called "Time _Event" in each set of navigation information in FIG. 9. It should also be noted here that unlike FIG. 3, the navigation information 2160 in FIG. 9 includes a bitmap for a button stating "This offer is no longer valid" which has an attribute showing that it is invisible in its initial state.

The content 2100 shown in FIG. 8 is expressed by the image data 2150 and the navigation information 2160. Likewise, the content 2200 is expressed by the image data 2250 and the navigation information 2260, and the content 2300 is expressed by the image data 2350 and the navigation information 2360.

The data transmission apparatus repeatedly transmits the data 2010 in a predetermined cycle. This transmission is the same as that described in the related art section with reference to FIG. 4, with the image data and navigation information of FIG. 4 being replaced by the image data and navigation information shown in FIG. 9.

The following is a detailed explanation of the data which is multiplexed and transmitted by the data transmission apparatus. A representation of the multiplexing of the data to be transmitted by the data transmission apparatus is shown in FIG. 10.

Figure 5:
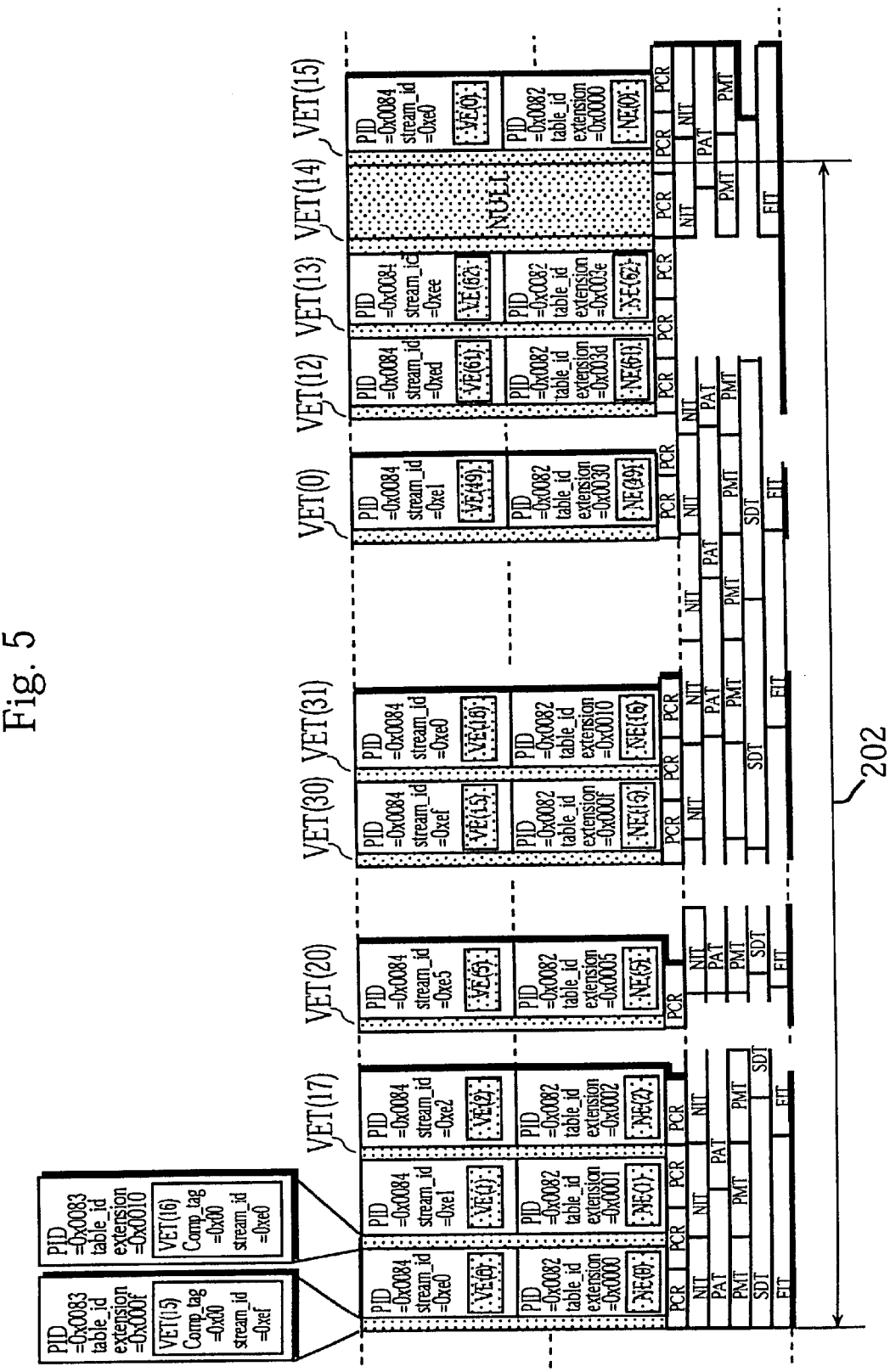
FIG. 5 shows the multiplexing of the data transmitted by the data transmission apparatus in the related art.
Figure 10:
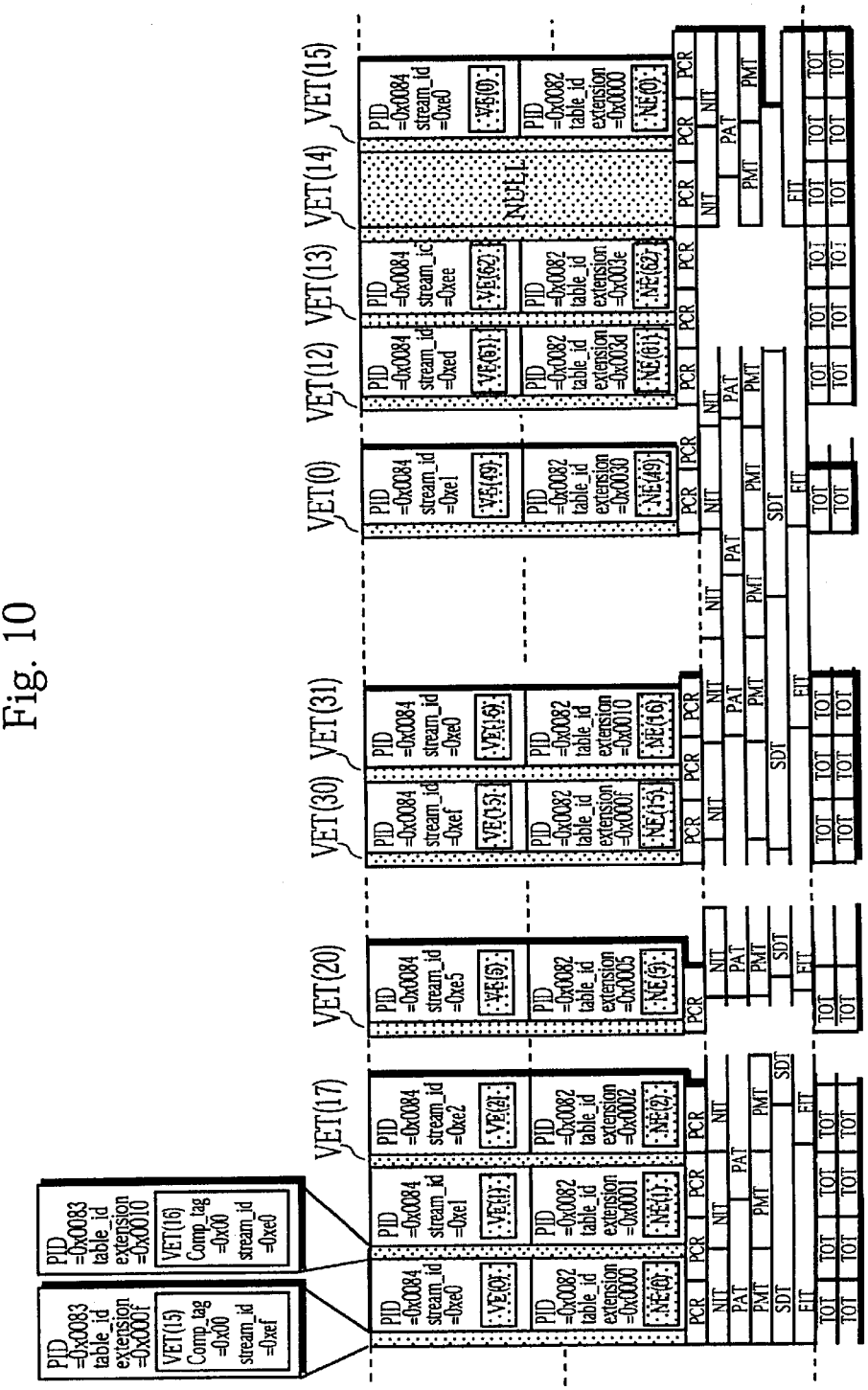
FIG. 10 is a more detailed representation of the data transmitted by the data transmission apparatus

FIG. 10 corresponds to FIG. 5 of the related art section, so that image data VE (N), navigation information NE(N), stream correspondence information VET(N), and system information such as a PCR, PAT, and PMTs are multiplexed into the transmission data. This system information further includes a TDT and TOT which are given predetermined PIDs.

Since the data transmission apparatus of the first embodiment transmits the data as described above, the data display control apparatus 1000 can have the TS decoder unit 1020 separate the TDT and TOT from the transmitted transport stream by setting the PIDs which are predetermined for the TDT and TOT into the filter condition storage unit 1021.

Detailed Description of the Navigation Information

Figure 12:
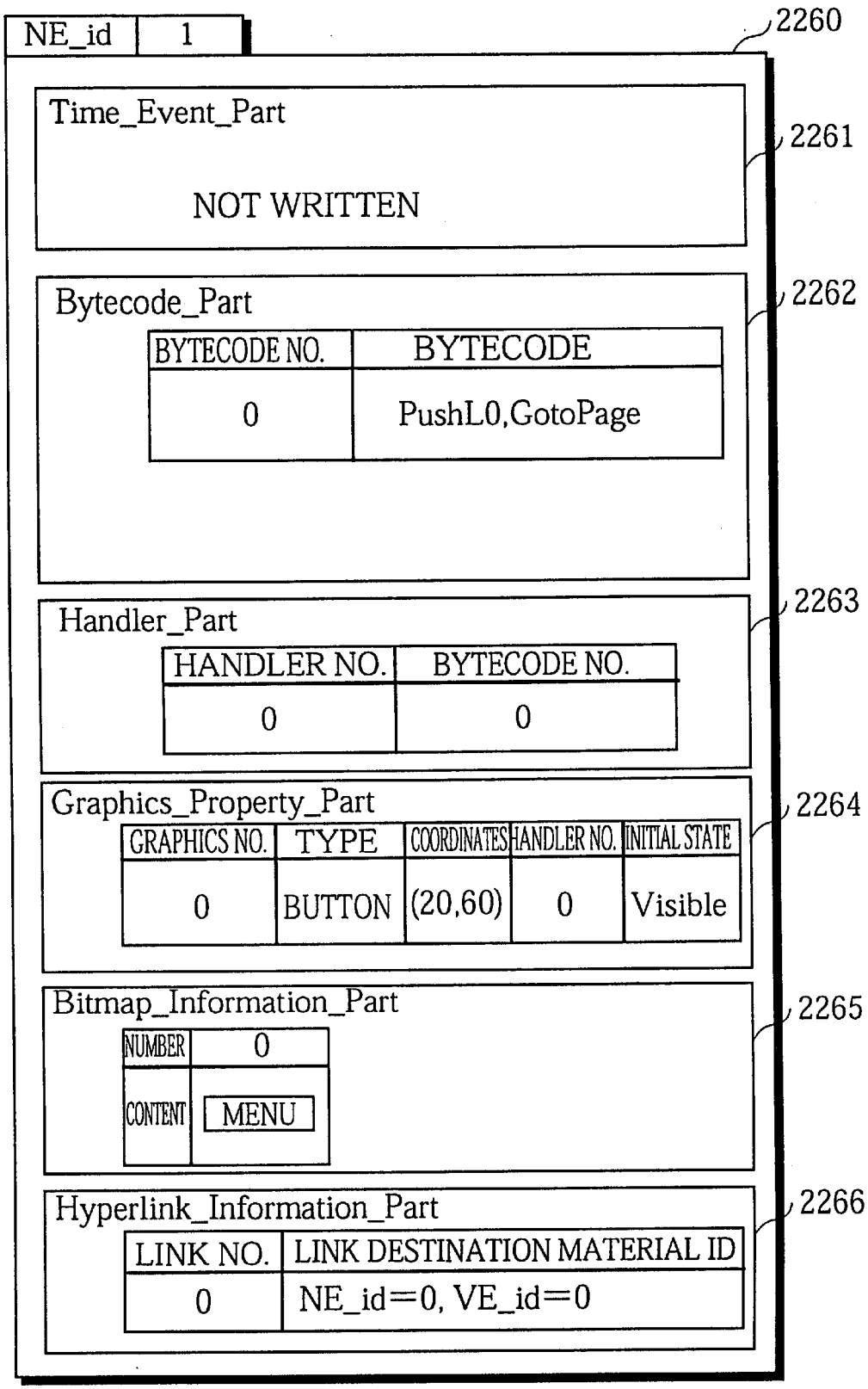
FIG. 12 shows the data construction of the navigation information 2260.
Figure 13:
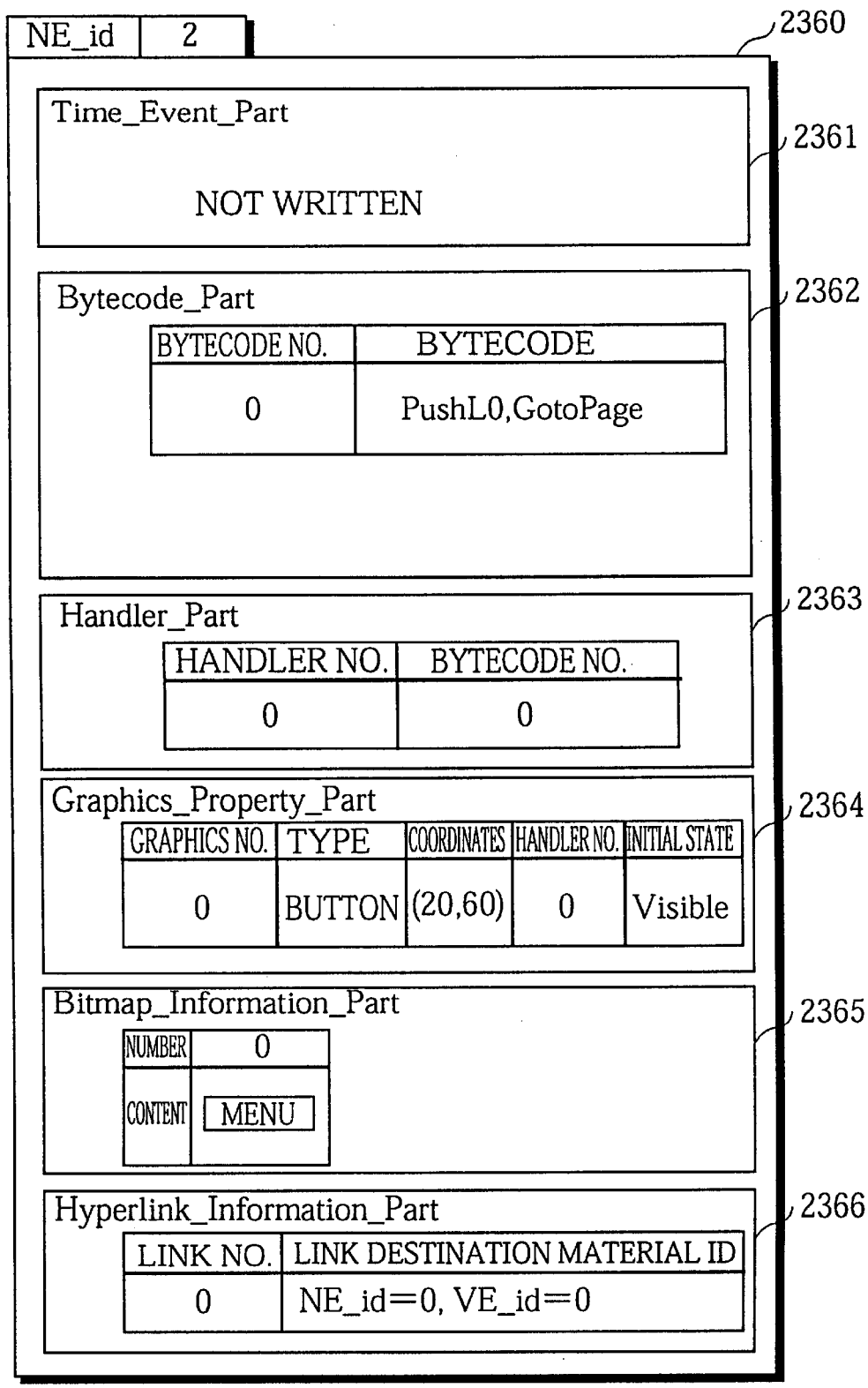
FIG. 13 shows the data construction of the navigation information 2360.

The following is an explanation of the navigation information which was shown in outline in FIG. 9, with reference to FIGS. 11 to 13.

FIG. 11 shows the data construction of the navigation information 2160. This navigation information 2160 includes a Time_Event_Part 2161, a Bytecode_Part 2162, a Handler_Part 2163, a Graphics_Property_Part 2164, a Bitmap_Information_Part 2165, and a Hyperlink_Information_Part 2166.

FIG. 11 corresponds to FIG. 5 in the related art section and differs from the related art by including a Time_Event_Part 2161 which is characteristic to the present invention.

The Time_Event_Part 2161 corresponds to the part in FIG. 9 shown as "Time_Event", and is information which shows that a specified handler is to be activated at an indicated time. In the example in FIG. 11, the handler with the handler number "2" is activated at 15:00:00 on Sep. 9, 1996. It should be noted here that several activation times may be given for a same handler. In the present example, this activation time is given in year, month, day, hour, minute, second order.

The Bytecode_Part 2162 corresponds to the part in FIG. 9 shown as "Script", and is the information used for recording bytecodes which are a kind of script. These bytecodes include an instruction set, such as conditional branches, integer calculations, and access to constants/variables, which allows basic programming, and a variety of instruction sets that are related to the control of image and audio data.

In the example in FIG. 11, the bytecode with bytecode number "0" is "Push L0, GotoPage". Here, "Push L0" is an instruction which represents the storing of the value "0" in the stack, while "GotoPage" is an instruction indicating a switch of display to the content shown by the link number whose value is stored in the stack. Here, the link number is given in the Hyperlink_Information_Part, and is an identifier for identifying a content to be switched to.

The bytecode with bytecode number "2" is "SetGraphicVisibility", with this being an instruction that switches between "visible" and "invisible" states depending on whether "0" or "1" is stored in the stack, these states being for a button indicated by a value in the stack that precedes the value indicating "visible" or "invisible".

Accordingly, the bytecode with the bytecode number "0" indicates a switching of the display to the content which is the link destination for link number "0", while the bytecode with the bytecode number "1" indicates a switching of the display to the content which is the link destination for link number "1". The bytecode with the bytecode number "2", meanwhile, makes the button with the graphics number "2" visible, while making the button with the graphics numbers "0" and "1" invisible. Graphics numbers are dealt with in more detail in the description of the Graphics_Property_Part given later in this specification.

The Handler Part 2163 is the information which records the correspondence between handler numbers and bytecode numbers. In the example in FIG. 11, handler numbers 0, 1, and 2 respectively correspond to bytecode numbers 0, 1, and 2. It should be noted here that not only bytecodes, but also information defining the processing environment of handlers, such as variable areas, is given corresponding to the handlers, although such information is not especially related to the present invention and has therefore not been illustrated.

The Bitmap_Information_Part 2165 is the part used to record the content of the bitmaps which display buttons corresponding to the graphics numbers. In the example in FIG. 11, the graphics with the number "0" represent the bitmap "Video", while the graphics with the number "1"

represent the bitmap "Stereo", and the graphics with the number "2" represent the bitmap "This offer is no longer valid".

The Graphics_Property_Part 2164 is information for composing the on-screen display graphics to be displayed superimposed onto the video data on the display screen, and so includes graphics numbers for identifying sets of graphics, graphics types, display coordinates for sets of graphics, a handler number associated with the graphics, and an entry showing the initial state for when the content is displayed. For the example in FIG. 11, the type for each set of graphics is "button", with graphics numbers 0, 1, and 2 corresponding to the graphics in the Bitmap_Information_Part 2165 with the same values "0", "1", and "2". In the present example, button 0, button 1, and button 2 are displayed with the x and y coordinates respectively given as (20,20), (20,60), and (0,20). The handler numbers of the handlers which are activated on selection and activation of the buttons 0 and 1 are given as "0" and "1", while no handler is given corresponding to button 2. Also, the initial states of button 0 and button 1 when the content is displayed are given as "visible", while the initial state of button 2 is given as "invisible".

The Hyperlink_Information_Part 2166 is information that records the IDs of the materials which compose contents for link destinations. Here, IDs for materials are given as the information showing all of the contents that are link destinations for the content to which the present navigation information belongs. Here also, link numbers are given to identify the sets of identifiers which identify each of the link destination contents. For the example shown in FIG. 11, "NE$_{13}$ id–1, VE_id=1" is recorded for the link destination with the link number "0", showing that the content which is composed of the information with the VE_id "1" and the NE_id "1" is a link destination. Here, information is also recorded showing that the content which is composed of the information with the VE_id "2" and the NE_id "2" is the link destination for the link number "1".

It should be noted here that NE_id given as "0" at the top of FIG. 11 shows that the navigation information being explained here is the navigation element which has the TD "0".

FIG. 12 shows the data construction of the navigation information 2260. The NE_id of this navigation information is "1", and the data construction is the same as navigation information 2160 described above. The content of this navigation information 2260 in FIG. 12 is described in detail below.

The time_Event_Part 2261 contains no information.

The Bytecode_Part 2262 records that the bytecode with the bytecode number "0" is "PushL0, GotoPage", which is an example instruction that displays the content which is the link destination with the link number "0".

The Handler_Part 2263 shows that the handler number "0" corresponds to the bytecode number "0".

The Bitmap_Information_Part 2265 shows that the bitmap for "Menu" has been assigned the bitmap number "0".

The Graphics_Property_Part 2264 shows that the graphics type is "button", and that the graphics number is "0". The x and y coordinates for displaying button 0 are given as (20,60). The handler which is activated on the activation of button 0 is given as handler number 0, with the button 0 being visible in the initial state when the present content is displayed.

The Hyperlink_Information_Part 2266 records "NE_id=0, VE_id=0" as the link destination with the link number "0", and so shows that the content which is composed of the information with the NE_id "0" and the VE_id "0" is a link destination.

FIG. 13 shows the data construction of the navigation information 2360. The NE_id of this navigation information is "2", and the data construction is the same as navigation information 2160 described below. The content of this navigation information 2360 in FIG. 13 is described in detail below.

The Time_event_Part 2361 contains no information.

The Bytecode_Part 2362 records that the bytecode with the bytecode number "0" is "PushL0, GotoPage", which is an example instruction that displays the content which is the link destination with the link number "0".

The Handler Part 2363 shows that the handler number "0" corresponds to the bytecode number "0".

The Bitmap_Information_Part 2365 shows that the bitmap for "Menu" has been assigned the bitmap number "0".

The Graphics_Property_Part 2361 shows that the graphics type is "button", and that the graphics number is "0". The x and y coordinates for displaying button 0 are given as (20,60). The handler which is activated on the activation of button 0 is given as handler number 0, with the button 0 being visible in the initial state when the present content is displayed.

The Hyperlink_Information_Part 2366 records NE_id=0, VE_id–0 as the link destination with the link number "0", and so shows that the content which is composed of the information with the NE_id "0" and the VE_id "0" is a link destination.

Each content is composed of navigation information, with the data composition described above, and image data, and is displayed on a display screen of a data reception apparatus.

It should be noted here that the image data which corresponds to the VE_id=0 is image data 2150, while the image data which corresponds to the VE_id=1 is image data 2250, and the image data which corresponds to the VE_id=2 is image data 2350 (see FIG. 9).

Using the data described above, when the user selects and confirms a button for a content displayed by the data display control apparatus 1000, the display switches to another content. When the time given in the Time_Event_Part is reached, control is also performed to execute the specified operation.

Operation of the Data Display Control Apparatus

The following is an explanation of the operation of the reception control unit 1050 of the data display control apparatus 1000 based on the data construction described above. This explanation refers to FIGS. 14 and 15.

Figure 14:
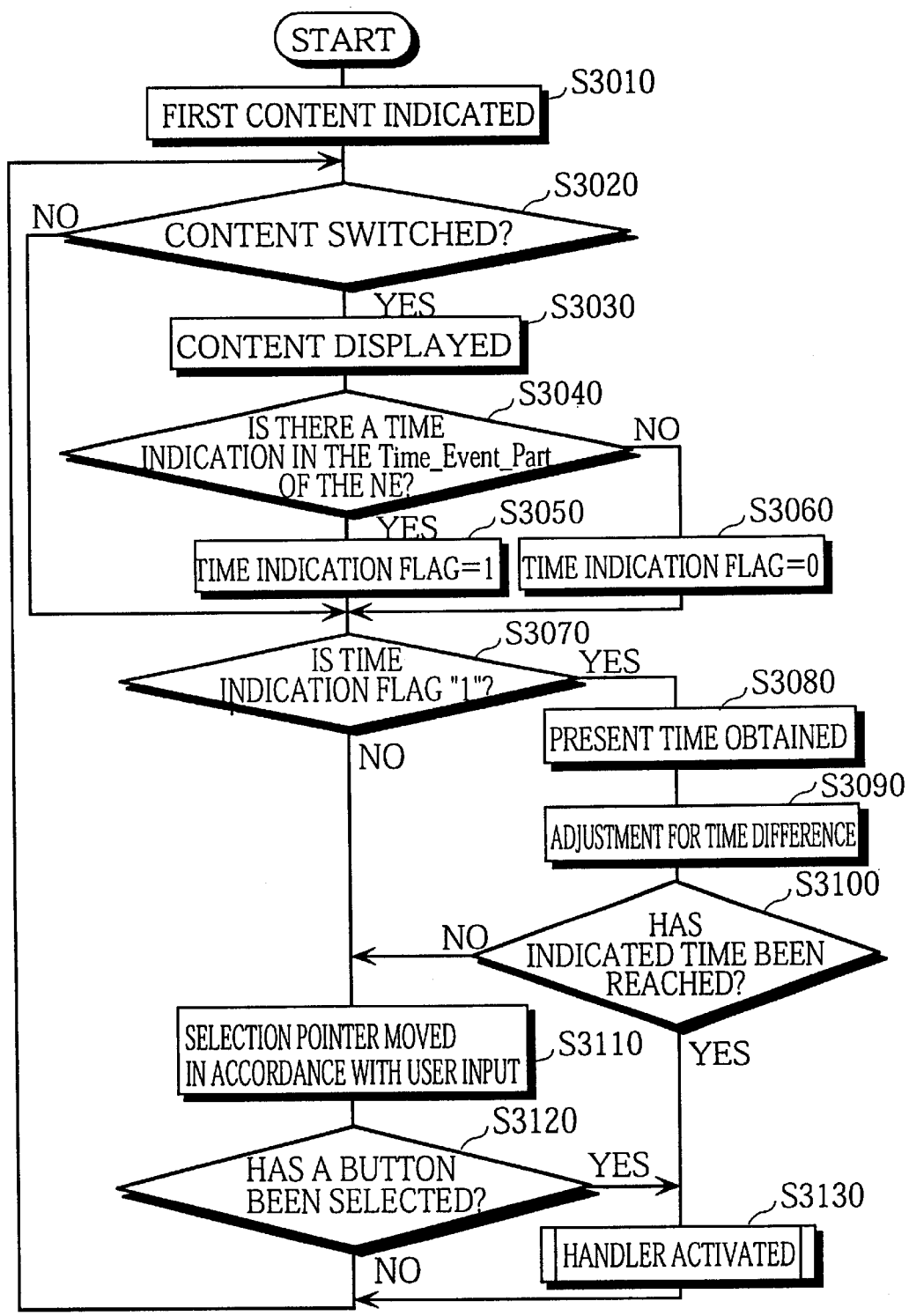
FIG. 14 is a flowchart for a content switching operation and the activation of a handler.

FIG. 14 is a flowchart showing a content switching operation and the activation of a handler, and FIG. 15 shows the transformation in the display screen.

The reception control unit 1050 is composed of a CPU and a program, and performs the processing for content switching and the activation of handlers. This processing is achieved according to the flow in FIG. 14. In the initial process in S3010, the content to be displayed at the start of the reception of a program is indicated. When it is judged in S3020 that a content switching operation is to be made, the processes in S3030, S3040, and S3050 or S3060 are performed. After this, it is judged in S3070 whether there is a handler to be activated at an indicated time, with the processes S3080 to S3100 being performed in such case. Processes S3110 and S3120 are then performed corresponding to user inputs, and in S3130 is performed to activate a handler.

The information for the first content to be displayed is set as pair of a VE_id and an NE_id in the PMT stored in the system information storage unit 1043. The following example focuses on the case where the information VE_id=0 and NE_id=0 is given in the PMT. The explanation also supposes that the present operation starts at 14:57:00 on Sep. 9, 1996.

First, the information VE_id+0 and NE_id=0 is read from the PMT as the information for the first content to be displayed for the present mail order program (step S3010). Since this is the first content, the system considers that content switching has been performed (S3020:Yes) and so displays the present content (S3030).

The display of this first content is achieved by displaying the image data 2150 with the VE_id=0 as the background image and on-screen display graphic in accordance with the content of the navigation information with the NE_id=0. Here, the button "Video" is visibly displayed at a position given by the coordinates (20,20) and the button "Stereo" is visibly displayed at a position given by the coordinates (20,60), in accordance with the content of the Graphics_Property_part 2164 and the Bitmap_Information_Part 2165 of the navigation information shown in FIG. 11. This results in the display shown as 3210 in FIG. 15.

Once the present content has been displayed, the reception control unit 1050 judges whether there is a time indication for activating a handler in the Time_Event_Part of the NE (S3040), in which case the time indication flag for handler activation processing in response to time is set at "1" (S3050). When there is no time indication, the time indication flag is set at "0" (S3060). Here, since the handler with the handler number "2" in the Time_Event _Part of the navigation information shown in FIG. 11 is set as being activated at 15:00:00 on Sep. 9, 1996, the time indication flag is set at "1" (S3050).

When the time indication flag has been set at "1" (S3070:Yes), the reception control unit 1050 obtains the present time (S3080) and adjusts the present time using the time difference set for the country in which the data display control apparatus 1000 is located (S3090). The acquisition of the time difference and adjustment of the present tome are described in more detail later in this specification. In the present example, however, there is no time difference.

The reception control unit 1050 judges whether the present time has reached the time indicated in the Time_Event_Part 2161 of the present navigation information NE (S3100), and if not, advances to the processing for the movement of the selection pointer in accordance with user inputs (S3110). When one of the buttons has been selected and activated by the user (S3120:Yes), the corresponding handler is activated (S3130). The selection pointer referred to here is a mark which is displayed on the display screen that can be moved in accordance with user operations. As a result, the user can move the selection pointer to indicate a desired button using cursor keys provided, for example, on a remote controller, with the indicated button being selected and activated when the user presses the "Enter" key.

In the present example, the user selects the "Video" button, so that the reception control unit 1050 refers to the Graphics_Property_Part 2164 and activates the handler with the handler number "0". This handler is composed of the bytecode with the bytecode number "0" whose content is "PushL0, gotoPage". As a result, the display switches to the content which is the link destination of the link number "0", with this content being expressed by "VE_id-1, NE_id-1" in the Hyperlink_Information_Part 2166. Here, bytecodes are executed by the reception control unit 1050 using the bytecode interpreter 1051.

The bytecode interpreter 1051 has a stack area for storing variables, an in the present case interprets "PushL0" and stores the value "0" in the stack area. After this, the bytecode interpreter 1051 interprets "GotoPage" and performs content switching for the link number corresponding to the value stored in the stack area.

After the activation of a handler (S3130), the processing returns to the judgment of whether content switching has been performed (S3020), and since this is the case, the new content is displayed (S3030).

The display of this next content is achieved by displaying the image data 2250 with the VE_id-1 as the background image and on-screen display graphics in accordance with the content of the navigation information with the NE_id=1. Here, the button "Menu" is visibly displayed at a position given by the coordinates (20,60), in accordance with the content of the Graphics_Property_Part 2264 and the Bitmap_Information_Part 2265 in the navigation information NE shown in FIG. 12.

The time when this next content is displayed is 14:58:00 on Sep. 9, 1996, so that the display screen becomes as shown by 3220 in FIG. 15.

After the content display process has been performed (S3030), the reception control unit 1050 judges whether there is a time indication in the Time_Event _Part of the present NE (S3040). Since the Time_Event_Part of the navigation information NE in FIG. 12 does not include any time indications, the reception control unit 1050 sets the time indication flag at "0" (s3060).

Since the time indication flag is "0" (S3070), the reception control unit 1050 skips the time judgment processes (S3080 to S3100), and performs the processing for user inputs (S3110, S3120), with a corresponding handler being activated in S3130 when a button has been selected and activated.

When the user selects and activates the "Menu" button, the reception control unit 150 refers to the Graphics_Property_Part 2264 and activates the handler with the handler number "0". This handler is composed of the bytecode with the bytecode number "0" whose content is "PushL0, GotoPage". As a result, the display switches to the content which is the link destination of the link number "0", with this content being expressed by "VE_id=0, NE_id=0" in the Hyperlink_Information_Part 2266.

After the activation of a handler (S3130), the processing returns to the judgment of whether content switching has been performed (S3020), and since this is the case, the new content is displayed (S3030).

This new content is the same as the content which was displayed initially, and so is achieved by displaying the image data 2150 with the VE_id=0 as the background image and on-screen display graphics in accordance with the content of the navigation information with the NE id=0.

The time when this next content is displayed is 14:59:00 on Sep. 9, 1996, so that the display screen becomes as shown by 3230 in FIG. 15.

After the content display process has been performed the reception control unit 100 judges that there is the time indication 15:00:00 on Sep. 9, 1996 for the handler with the handler number "2" in the Time_Event_Part 2161 of the navigation information shown in FIG. 11, and so sets the time indication flag at "1" (S3050).

Since the time indication flag is "1" (S3070), the reception control unit 1050 obtains the present time (S3080) and adjusts the present time using the time difference set for the country in which the data display control apparatus 1000 is located (S3090).

The reception control unit 1050 next judges whether the present time has reached the time indicated by the Time_Event _Part 2161 of the navigation information NE (S3100).

If the present time reaches 15:00:00 on Sep. 9, 1996, the reception control unit 1050 activates handler 2. In more detail, the reception control unit 1050 refers to the Handler_Part 2163 and the Bytecode_Part 2162 of the navigation information NE shown in FIG. 11, and has the set of bytecodes "PushL2, PushL1, SetGraphicVisibility, PushL0, PushL0, SetGraphicVisibility, PushL1, PushL0, SetGraphicVisibility" executed by the bytecode interpreter 1051.

The bytecode interpreter 1051 first interprets "PushL2" and stores the value "2" in the stack before interpreting "PushL1" and storing the value "1" in the stack. The bytecode interpreter 1051 next interprets "SetGraphicVisibility" and, since this is an instruction which sets the state of visibility or invisibility for graphics indicated by the second operand in accordance with the value of the first operand, extracts the first variable "1" from the stack indicating visibility and the second variable "2" from the stack indicating the graphics with the graphics number "2", before setting the graphics with the graphics number "2" as visible.

Following this, the bytecode interpreter 1051 interprets the bytecode "PushL0, PushL0, SetGraphicVisibility" and makes the graphics with the graphics number "0" invisible, and then interprets the bytecode "PushL1, PushL0, SetGraphicVisibility" and makes the graphics with the graphics number "1" invisible.

As a result of the above processing, the bytecode interpreter 1051 of the reception control unit 1050 makes the "this Offer in no longer valid" button visible, while making the "Video" and "Stereo" buttons invisible so that the display screen changes to the display shown as 3240 in FIG. 15.

By operating as described above, the data display control apparatus 1000 is able to process the specified handler at the indicated time.

Acquisition of the Present Time and Adjustment for Time Difference

The following is a detailed description of the acquisition of the present time and the adjustment of time difference by the data display control apparatus 1000.

Figure 16:
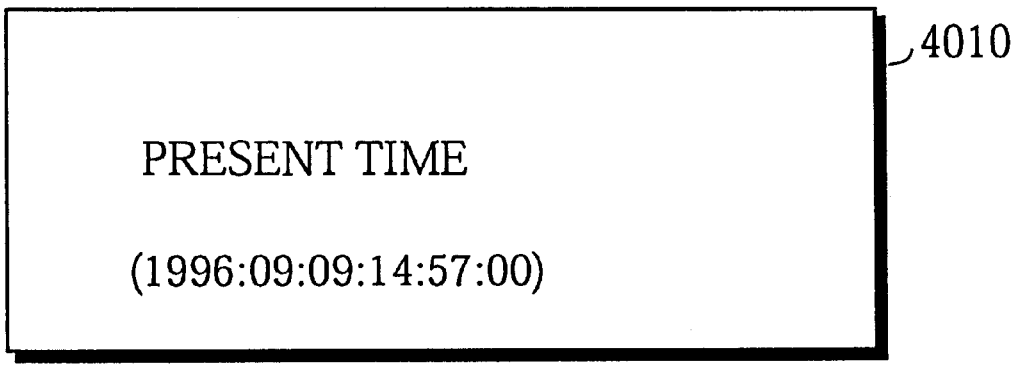
FIG. 16A shows the data construction of the TDT.
FIG. 16B shows the data construction of the TOT.

FIGS. 16A and 16B show the data constructions of the TDT and the TOT. The information given in brackets shows examples of the content of these tables.

The TDT is the table which stores the present time which, as shown in FIG. 16A, is given in year, month, day, hour, minute, second format. In the present example, the time Sep. 9, 1996 15:00:00 is given in the TDT with this date being transmitted at the time corresponding to its content. Here, the actual data is stored using a BCD (Binary Coded Decimal) code.

The TOT, meanwhile, stores the present time and a plurality of time difference entries for different country codes. Here, country codes are predetermined codes for identifying countries. A country code is also permanently stored within the data display control apparatus 1000. The time differences are expressed as plus or minus a time given as hours, minutes, seconds. In the present example, the time difference for the U.K. is given as "0" and the time difference for Japan is given as "+9 hours". As a result, the data display control apparatus 1000 is able to find the time difference for the country code which matches its own country code, and so can perform adjustment for the time difference.

The TDT and TOT are assigned predetermined PIDs and are successively transmitted form the data transmission apparatus as time progress.

Here, when the data display control apparatus 1000 needs to know the present time, the reception control unit 1050 sets the predetermined PID into the filter condition storage unit 1021, and the received time information is stored in the time information storage unit 1044 in the received data storage unit 1040 via the reception unit 1010 and the TS decoder unit 1020. This time information is then used by the reception control unit 1050.

The reception control unit 1050 obtains the TDT and the TOT in S3080 as described above. In S3090, the reception control unit 1050 refers to the country code permanently stored in the data display control apparatus 1000 and converts the time into the time for the country in which the data display control apparatus 1000 is located.

In S3100, the reception control unit 1050 compares the present time with the time indicated in the Time _Event_ Part of the present navigation information NE. In this first embodiment, the time given in the Time_Event_Part is set as the time for the country in which the data display control apparatus 1000 is located. It should be noted here that regardless of how the standard time is set, the handler can be activated at the proper time by performing compensation for time when comparing the standard time to the present time.

Here, the time difference referred to by the compensation for time difference is a difference between a the respective standard times of the current time and the time given in the Time_Event_Part.

With the data display control apparatus of this first embodiment of the present invention, handlers can be activated at their indicated time. Here, handlers are executed according to bytecodes that are in turn made up of instructions for performing a variety of operations, so that a variety of operations, such as content switching, and changes in the display of buttons, and other operations, are possible.

SECOND EMBODIMENT

The following is an explanation of the second embodiment of the present invention, which is a data display control apparatus that includes a construction for changing the operations performed in response to user operations according to the time such user operations are made.

It should be noted here that the only difference with the data transmission apparatus of the first embodiment lies in the content of the transmitted navigation information, so that other elements will not be described. Instead, the following explanation will describe the present data display control apparatus in terms of the content of the navigation information.

The data display control apparatus of this second embodiment has a feature whereby it sets a valid period for each handler and, when activating a handler in response to a user operation, activates an optimal handler for the time at which the user operation is made. This is an extension of the characteristic feature of the first embodiment of the present invention.

Construction

The construction of the data display control apparatus of the second embodiment is the same as that of the first embodiment (see FIG. 7), so that the data display control apparatus 1000 is composed of a reception unit 1010, a TS decoder unit 1020, an AV decoder unit 1030, a received data storage unit 1040, a reception control unit 1050, a reproduction unit 1060, a display unit 1070, an audio output unit 1080, and a signal reception unit 1100. The operation of the reception control unit 1050, however, is different in the second embodiment, so that this will be described in more detail below.

Data Construction

Of the data handled by the data display control apparatus of the second embodiment, only the navigation information differs from the data described in the first embodiment, with the other kinds of data being the same as before.

Figure 17:
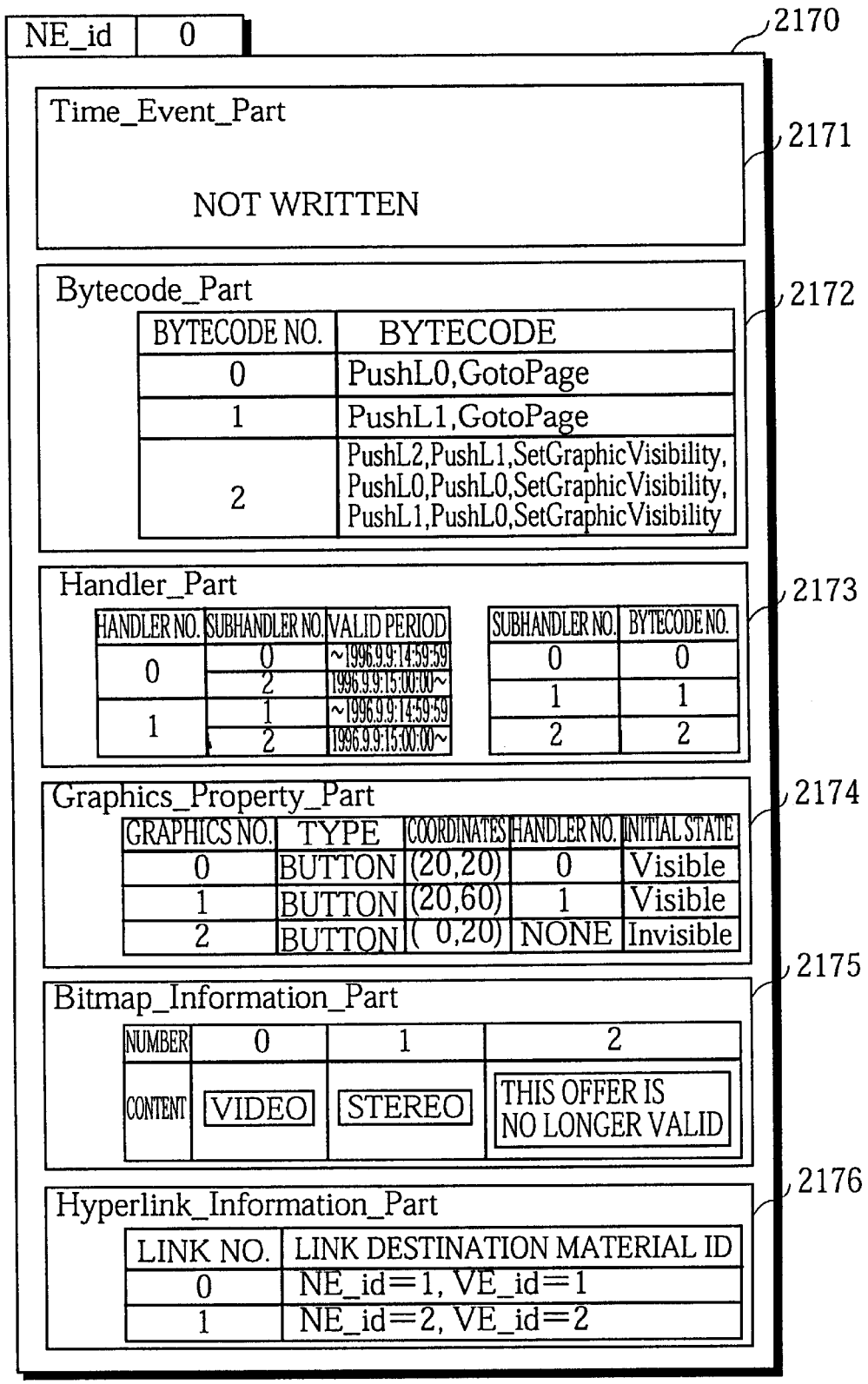
FIG. 17 shows the data construction of the navigation information 2170.

The data construction of the navigation information 2170 is shown in FIG. 17. This navigation information 2170 is an extension of the navigation information 2160 described in the first embodiment, and includes a Time_Event_Part 2171, a Bytecode_Part 2172, a Handler_Part 2173, a Graphics_Property_Part 2174, a Bitmap_Information_Part 2175, and a Hyperlink_Information Part 2176.

Here, the Time_Event_Part 2171 is the same as the Time_Event_Part 2161 in the first embodiment, the Bytecode_Part 2172 is the same as the Bytecode_Part 2162, the Graphics_property_Part 2174 is the same as the Graphics_Property_Part 2164, the Bitmap Information_Part 2175 is the same as the Bitmap_Information_Part 2165, and the Hyperlink_Information_Part 2176 is the same as the Hyperlink_Information_Part 2166, with the only the set values being different for explanatory purposes (see FIG. 11).

The only difference with the first embodiment lies in the Handler_Part 2173 that includes valid periods which have been set for each of the handler numbers.

For the example shown in FIG. 17, the valid sub-handler for the handler number 0 until the time 14:59:59 on Sep. 9, 1996 is sub-handler number 0, while the valid sub handler for the handler number 0 from the time 15:00:00 on Sep. 9, 1996 onwards is sub-handler number 2. In the same way, the valid sub-handler for the handler number 1 until the time 14:59:59 on Sep. 9, 1996 is sub-handler number 1, while the valid sub-handler for the handler number 1 from the time 15:00:00 on Sep. 9, 1996 onwards is sub-handler number 2. Here, sub-handler number 0 corresponds to bytecode number 0, while sub-handler number 1 corresponds to bytecode number 1 and sub-handler number 2 corresponds to bytecode number 2.

It should be noted that while this setting of a valid period has been given as a starting time and ending time, a setting of only one of these may alternatively be used, while no setting of starting time or ending time corresponds to a case when a handler is always valid.

Figure 18:
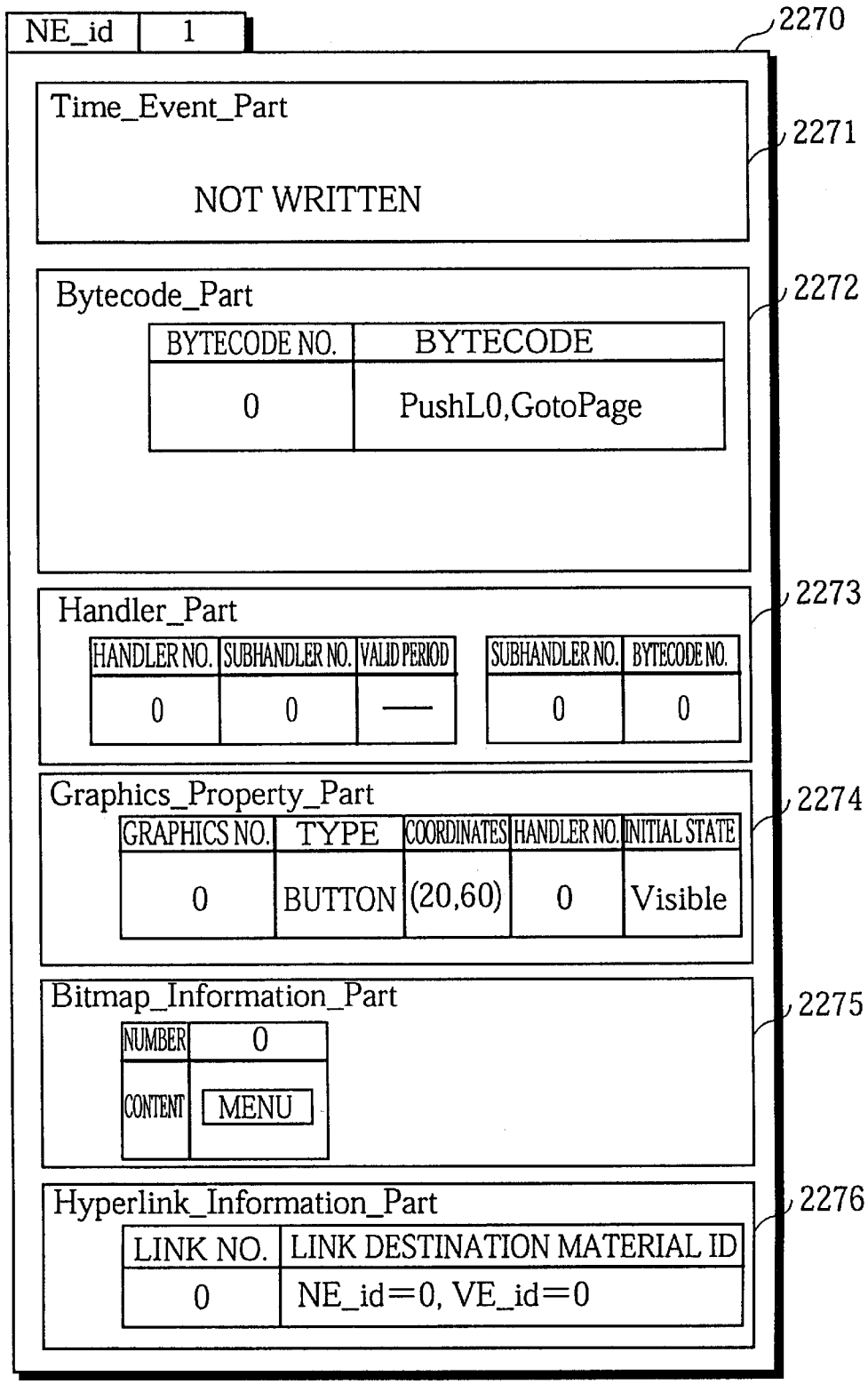
FIG. 18 shows the data construction of the navigation information 2270.
Figure 19:
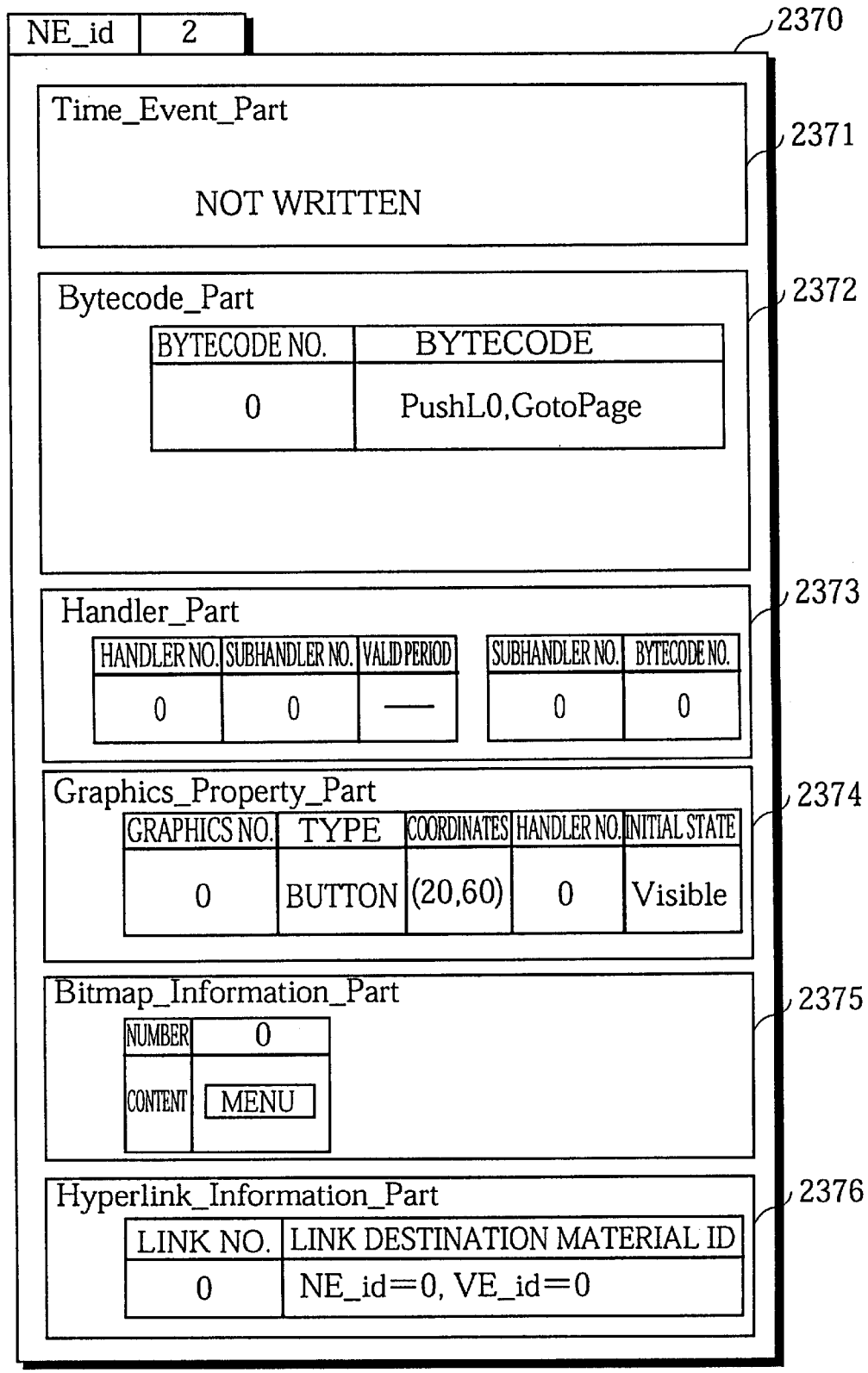
FIG. 19 shows the data construction of the navigation information 2370.

FIG. 18 shows the data construction of navigation information 2270 and FIG. 19 shows the data construction of navigation information 2370. These sets of navigation information 2270 and 2370 have the same data construction as navigation information 2170 described above.

Operation of the Reception Control Unit 1050

The following is an explanation of the operation of the reception control unit 1050 in the data display control apparatus 1000 described above, with reference to the drawings. This operation will be described using contents 2100, 2200, and 2300 of FIGS. 8 and 9 described in the first embodiment. The difference, however, lies in the replacement of the navigation information 2160, 2260, and 2360 with the navigation information 2170, 2270, and 2370, and a difference in the transformation between the contents shown in FIG. 8.

The reception control unit 1050 is composed of a CPU and a program, and performs the processing for content switching and handler activation. The fundamental operation is the same as in the first embodiment (see FIG. 14), with the only difference being in the processing in the handler activation process of S3130. This is described in more detail below.

Figure 20:
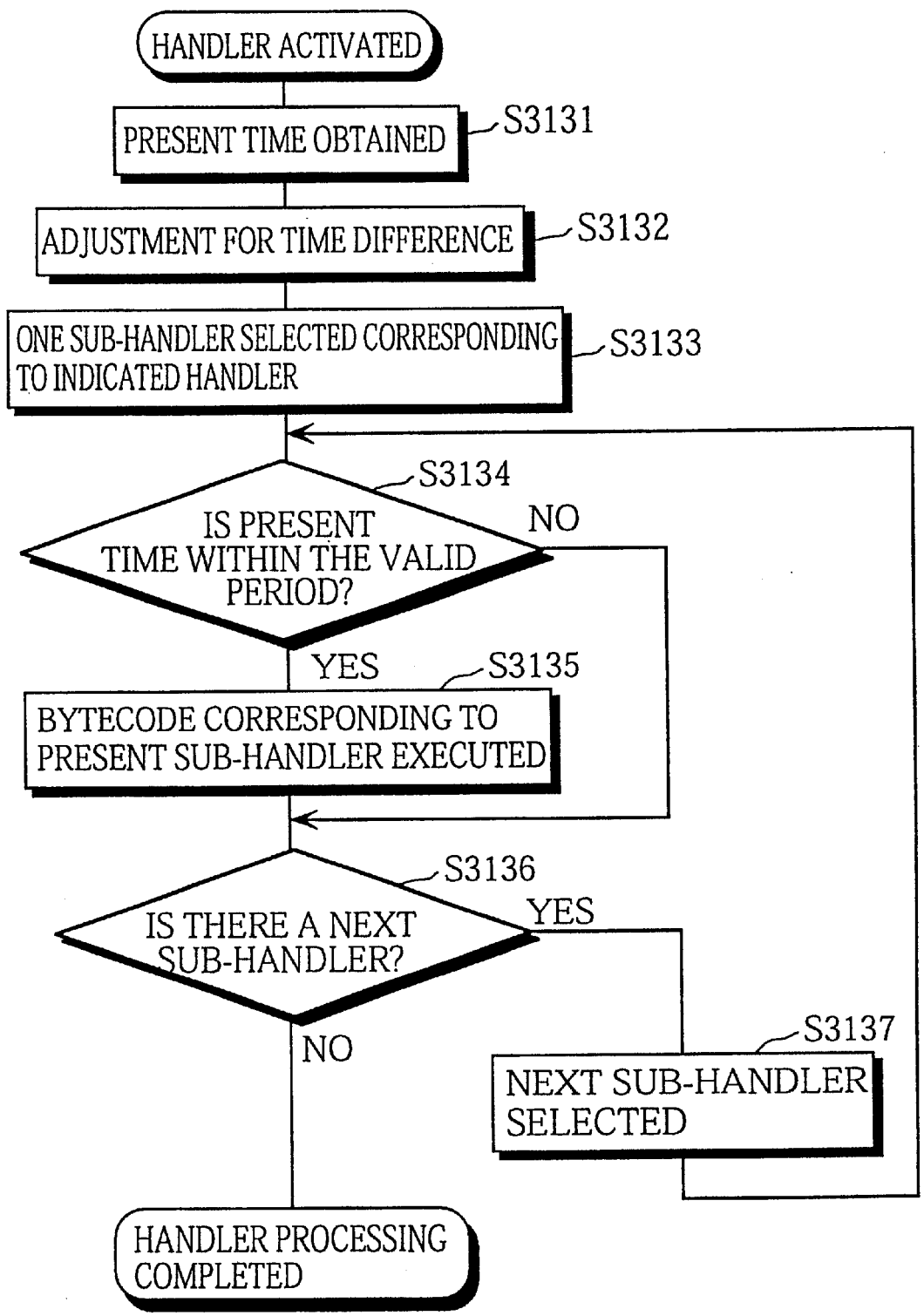
FIG. 20 is a flowchart for the operation for the activation of a handler in the second embodiment.

FIG. 20 is a flowchart for the operation during handler activation in the second embodiment.

The handler activation process is composed of a process in S3131 and S3132 for obtaining the present time, and a process in S3133 to S3137 for judging the validity of the sub-handlers, which are units of the handler to be activated, based on their valid periods, and for activating valid sub-handlers.

The present explanation supposes that the present time is 14:58:00 on Sep. 9, 1996 and that the user has selected and activated the "Video" button during a display of content 2100.

The activation process for a handler starts with the acquisition of the present time (S3131). The reception control unit 1050 obtains the TDT and TOT from the time information storage unit 1044 and obtains the standard time, before amending this time for the time difference of the country set for the data display control apparatus 1000 (S3132). The acquisition of the present time and amendment for a time difference are performed in the same way as in the first embodiment, and result in the time 14:58:00 on Sep. 9, 1996 being obtained.

The reception control unit 1050 next focuses on one of the sub-handlers of the indicated handler (S3133) and judges whether the present time falls within the valid period of the focused sub-handler (S3134). The handler indicated here is a handler that has been selected by a user selection operation for a button or, as in the first embodiment, a handler that has been activated due to its indicated time having been reached.

In the example in FIG. 17, the button "Video" is selected so that the handler with the handler number "0" is activated. The reception control unit 1050 focuses on the sub-handler with the sub-handler number "0" for the handler "0" given in the Handler_Part 2173 (S3133), and, since this sub-handler is valid until 14:59:59 on Sep. 9, 1996 (S3134), executes the bytecode corresponding to the present sub-handler (S3135). As a result, the bytecode with the bytecode number "0" corresponding to the sub handler "0" is executed. Since the bytecode with the bytecode number "0" shown in the Bytecode_Part 2172 is "PushL0, GotoPage", the content with "VE_id=1, NE_id-1" given in the Hyperlink_Information Part 2176 is displayed.

After the processing for the sub-handler "0" has been completed, the reception control unite 1050 judges whether there is a next sub-handler (step 3136), and since there is another sub-handler with the sub-handler number "2", focuses on the sub-handler with the sub-handler number "2" (S3137). The reception control unit 1050 then judges whether the present time is within the valid period of the sub-handler (S3134), and since this is not the case, skips the execution of the sub-handler. The reception control unit 105 then rinds that there are no more sub-handlers, and so completes the handler activation process.

The following is a description of the transformation of the display screen in the second embodiment, with reference to FIG. 21.

Display screen transformation 3310 shows the transformation in the screen that is displayed at 14:58:00 on Sep. 9, 1996 in the present example. As shown in the drawing, the displayed content switched from content 2100 to content 2200 in response to a selection of the "Video" button by the user.

Next, the user selects the "Menu" button in content 2200. Since the handler with the handler number "0" in the Handler Part of the navigation information 2270 corresponding to content 2200 is set to correspond to sub-handler 0 without a limited valid period, and the sub-handler 0 corresponds to bytecode 0, the reception control unit 1050 has the bytecode interpreter 1051 execute the bytecode 0, so that content 2100 is displayed.

After this, time passes and the present time reaches 15:01:00 on Sep. 9, 1996.

Here, if the user selects the "Video" button, the handler activation process will be as described below.

First, the reception control unit 1050 obtains the present time (S3131) and amends the time using the time difference (S3132). By doing so, the time, 15:01:00 on Sep. 9, 1996 is obtained.

Next, the reception control unit 1050 focuses on the first sub-handler for the indicated handler (S3133), and judges whether the present time is within the valid period (S3134). For the example shown in FIG. 17, the selection of the "Video" button results in the activation of the handler with the handler number "0", so that the reception control unit 1050 first focuses on the sub-handler "0" (S3133). Since this sub-handler is only valid until 14:59:00 on Sep. 9, 1996, this sub-handler is judged as invalid (S3133) and so is not executed. The reception control unit 1050 then focuses on the sub-handler with the sub-handler number "2 " (S3136, S3137) which is valid form 15:00:00 on Sep. 9, 1996 onwards. Accordingly, the reception control unit 1050 judges that this sub-handler "2" is valid (S3134) and so executes the bytecode corresponding to the sub-handler "2" (S3135).

The bytecode with the bytecode number "2" given in the Bytecode_Part 2172 is "PushL2, PushL1, SetGraphicVisibility, PushL0, PushL0, SetGraphicVisibility, PushL1, PushL0, SetGraphicVisibility", so that in the same way as in the first embodiment, the button "This offer is no longer valid" is made visible, and the "Video" and "Stereo" buttons are made invisible.

After executing this bytecode, there are no more sub-handlers (S3136), so that the reception control unit 1050 terminates the handler activation process.

As a result, the display screen is transformed as shown in 3320 in FIG. 21, so that the display switches from content 2100 to content 2400 in response to a user selection of the "Video" button.

As described above, the data display control apparatus 1000 of the second embodiment of the present invention is able to handle navigation information which has a data construction that includes valid periods for handlers, meaning that a greater variety of processes are available in response to time.

Third Embodiment

The following is an explanation of the data display control apparatus of the third embodiment of the present invention. This data display control apparatus receives a digital broadcast and is characterized by including a construction for performing certain operations only when specified graphics are displayed at a specific time.

The data transmission apparatus of this third embodiment differs from the first embodiment in only the content of the transmitted navigation information, so that the construction of the data display control apparatus has been omitted. Instead, the data display control apparatus of this third embodiment will be described in terms of the content of the navigation information.

The data display control apparatus of this third embodiment has a function for only performing certain operations when specified graphics are displayed, in addition to the function of the first embodiment whereby an specified operation is performed at an indicated time.

Construction

The construction of the data display control apparatus of the third embodiment is the same as that of the first embodiment (see FIG. 7), so that the data display control apparatus 1000 is composed of reception unit 1010, a TS decoder unit 1020, and AV decoder unit 1030, a received data storage unit 1040, a reception control unit 1050, a reproduction unit 1060, a display unit 1070, an audio output unit 1080, and a signal reception unit 1100. The operation of the reception control unit 1050, however, is different in the third embodiment, so that this will be described in more detail below.

Data Construction

Of the data handled by the data display control apparatus of the third embodiment, only the navigation information differs from the data described in the first embodiment, with the other kinds of data being the same as before.

The data construction of the navigation information 2180 is shown in FIG. 22. This navigation information 2180 is an extension or the navigation information 2160 described in the first embodiment, and includes a Time_Event_Part 2181, a Bytecode Part 2182, a Handler_Part 2183, a Graphics_Property_Part 2184, a Bitmap_Information_Part 2185, and a Hyperlink_Information_Part 2186.

Here, the Bytecode_Part 2182 is the same as the Bytecode_Part 2162 in the first embodiment, the Handler_Part 2183 is the same as the Handler_Part 2163, the Graphics_Property_Part 2184 is the same as the Graphics_Property_Part 2164, the Bitmap Information_Part 2185 is the same as the Bitmap_Information_Part 2165, and the Hyperlink_Information_Part 2166 (see FIG. 11).

The only difference with the first embodiment lies in the Time_Event_Part 2181 which, in addition to the activate times and handler numbers of the Time Event_Part 2161 of the first embodiment, contains graphic numbers.

For the example shown in FIG. 22, the Time_Event Part 2181 shows that if the present time reaches 15:00:00 on Sep. 9, 1996 and the graphics with the graphics numbers "0" and "1" are being visibly displayed, the processing with the handler number "2" will be performed.

Operation Control Construction

Figure 23:
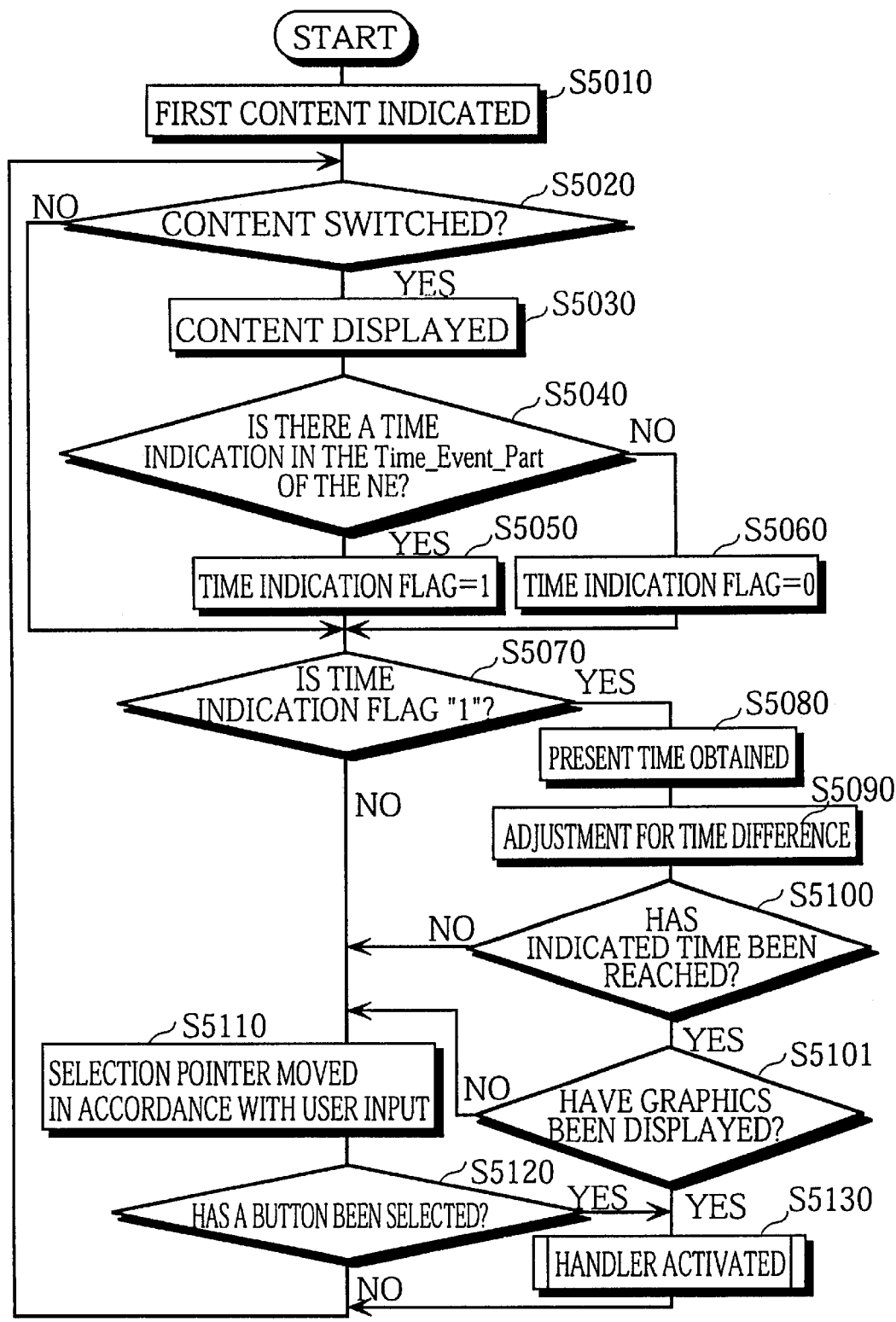
FIG. 23 is a flowchart showing a content switching operation and the activation of a handler in the third embodiment.

The following is an explanation of the operation of the reception control unit 1050. Here, the flowchart in FIG. 23 shows the content switching process and activation of a handler. With the exception of the provision of step S5101 corresponding to the Time_Event_Part 2181 in the navigation information, this flowchart is the same as FIG. 14 which showed the operation of the reception control unit 1050 in the first embodiment. Accordingly, only S5101 will be described.

Step S5101 is a process performed as a branch from step S5100 when the activate of 15:00:00 on Sep. 9, 1996 in the Time_Event_Part 2181 has been reached. Here, the reception control unit 1050 judges whether the graphics with the graphics numbers "0" and "1" given in the Time_Event_Part 2181 are being displayed and, if so, executes the handler activation process (S5130). When these graphics are not being displayed, the reception control unit 1050 performs the processing for the movement of the selection pointer in accordance with user inputs (S5110).

As a result, when graphics "0" and "1" are being displayed and the present time reaches 15:00:00 on Sep. 9, 1996, the reception control unit 1050 activates the handler with the handler number "2".

Here, by providing navigation information and an reception control unit which controls the display of data by referring to the navigation information, it becomes possible to achieve control of time-based operations in accordance with the graphics that are being displayed. Developers of programs are thereby able to produce programs where the state of the displayed graphics changes according to user operations, allowing the display to be controlled more precisely.

Fourth Embodiment

The following is an explanation of the data display control apparatus of the fourth embodiment of the present invention. This data display control apparatus receives a digital broadcast and is characterized by including a construction for performing control to display or not display graphics at a specific time.

The data transmission apparatus of this fourth embodiment differs from the first embodiment in only the content of the transmitted navigation information, so that the construction of the data display control apparatus has been omitted. Instead, the data display control apparatus of this fourth embodiment will be described in terms of the content of the navigation information.

Construction

The construction of the data display control apparatus of the fourth embodiment is the same as that of the first embodiment (see FIG. 7), so that the data display control apparatus 1000 is composed of a reception unit 1010, a TS decoder unit 1020, and AV decoder unit 1030, a received data storage unit 1040, a reception control unit 1050, a reproduction unit 1060, a display unit 1070, an audio output unit 1080, and a signal reception unit 1100. The operation of the reception control unit 1050, however, is different in this fourth embodiment, so that this will be described in more detail below.

Data Construction

Of the data handled by the data display control apparatus of the fourth embodiment, only the navigation information differs from the data described in the first embodiment, with the other kinds of data being the same as before.

Figure 24:
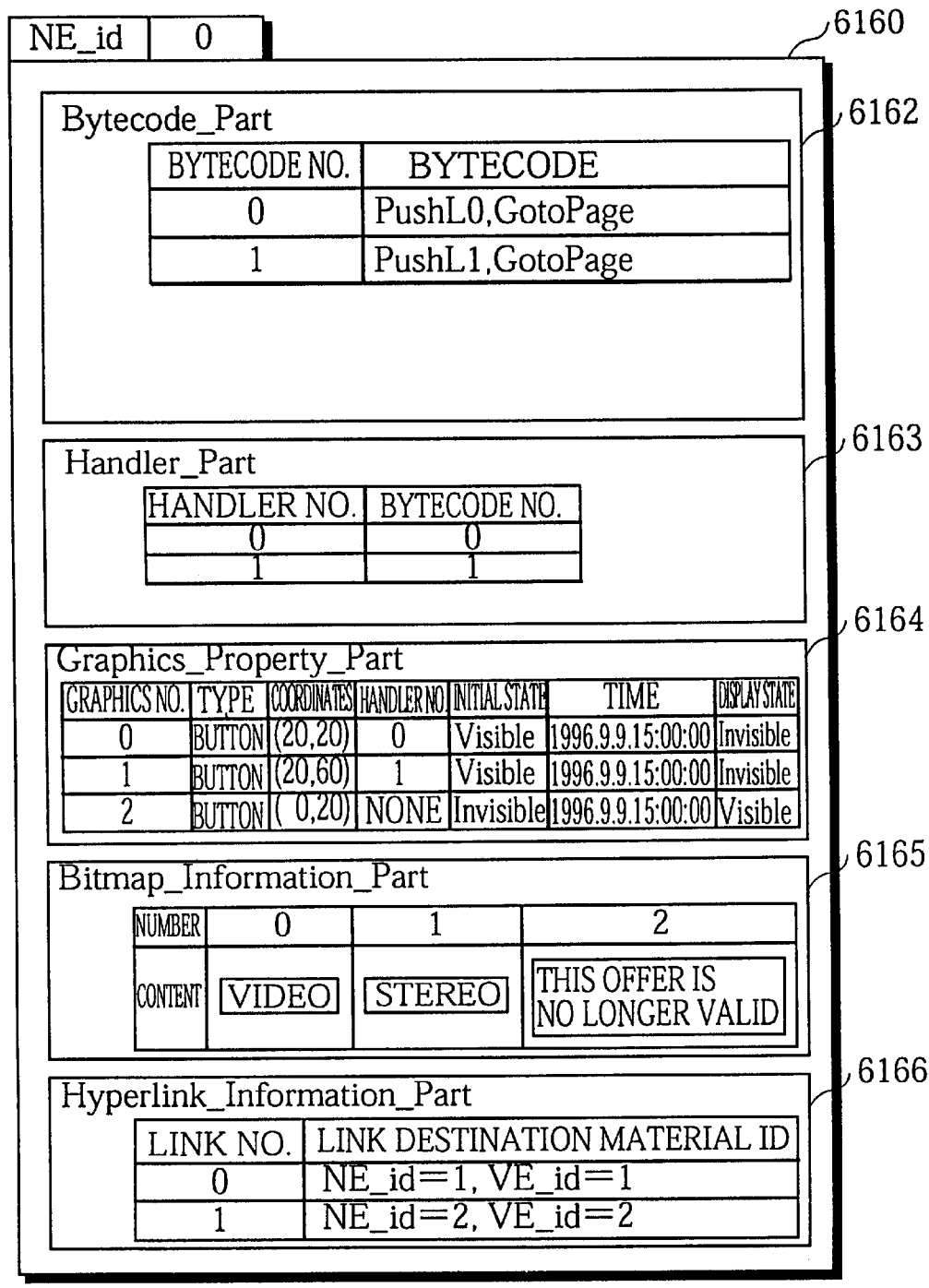
FIG. 24 shows the data construction of the navigation information 6160.

The data construction of the navigation information 6160 is shown in FIG. 24. This navigation information 6160 corresponds to the navigation information 2160 described in the first embodiment, and includes a Bytecode_Part 6162, a Handler_Part 6163, a Graphics_Property_Part 6164, a Bitmap_Information_Part 6165, and a Hyperlink_Information_Part 6166.

Here, The Bytecode_Part 6162 is the same as the Bytecode_Part 2162 in the first embodiment, the Handler Part 6163 is the same as the Handler Part 2163, the Bitmap_Information_Part 6165 is the same as the Bitmap_Information_Part 2165, and the Hyperlink_Information Part 6166 is the same as the Hyperlink_Information_Part 2166 (see FIG. 11).

The differences with the first embodiment lie in the lack of a Time_Event Part in the present embodiment, and in the construction of the Graphics_Property_Part.

In addition to the graphics numbers, graphics types, coordinates, handler numbers, and initial states of the Graphics_Property_Part 2164 of the first embodiment, the Graphics_Property_Part 6164 additionally includes information for a pairing of a time and display state. Note here that it is also possible for a plurality of pairings of a time and display state to be given in this Graphics_Property_Part.

For the example shown in FIG. 24, the Graphics_Property_Part 6164 includes a time and a display state for each of graphics numbers 0, 1, and 2, so that the button with the graphics number 0 and the button with the graphics number 1 are made invisible at 15:00:00 on Sep. 9, 1996, while the button with the graphics number 2 is made visible at 15:00:00 on Sep. 9, 1996.

Operation Control Construction

The following is an explanation of the operation of the reception control unit 1050 based on the example data shown in FIG. 24. Here, operations which are the same as those described in the first embodiment have been omitted.

Figure 25:
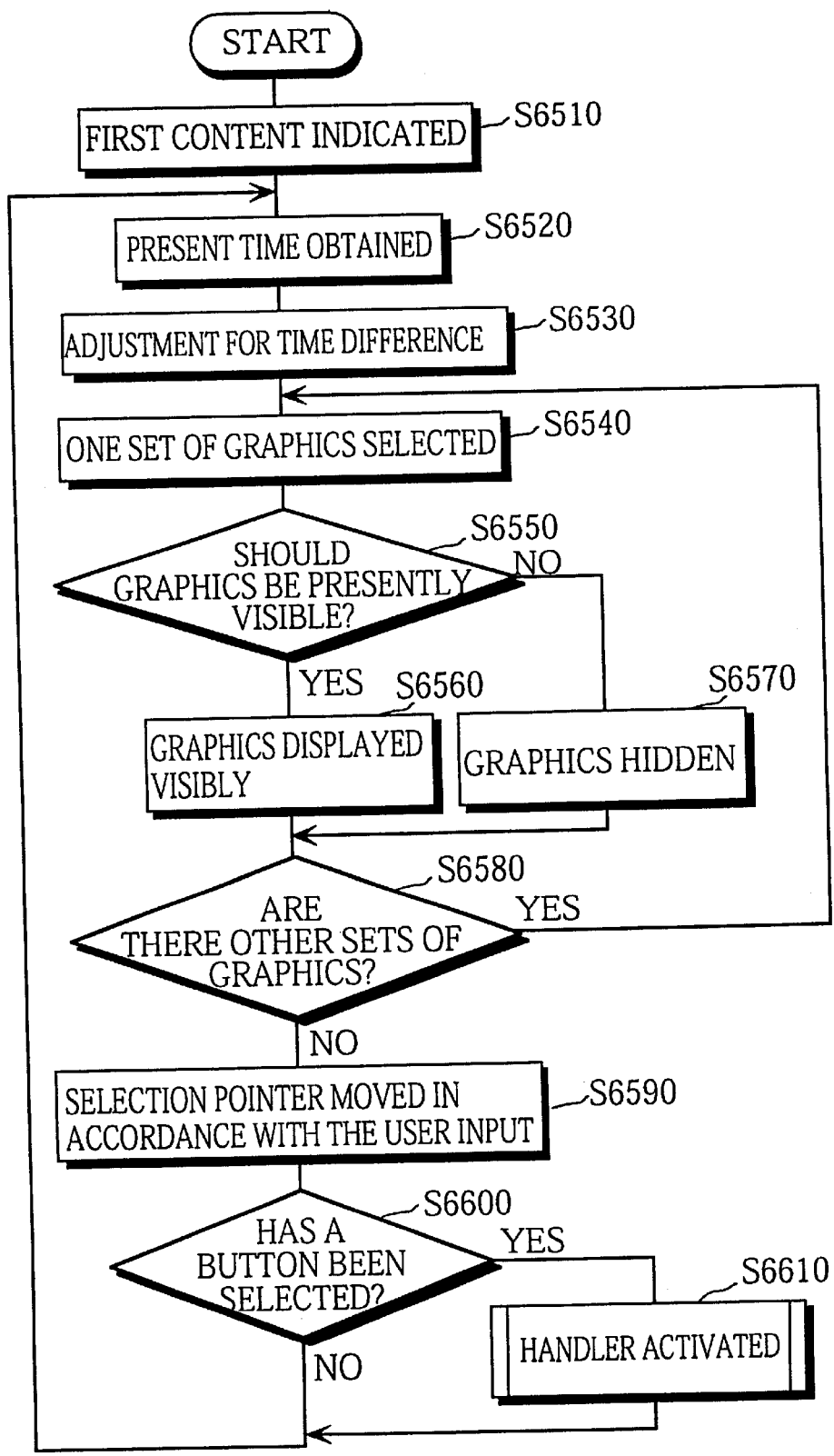
FIG. 25 is a flowchart showing a content switching operation and the activation of a handler in the fourth embodiment.

FIG. 25 is a flowchart showing the content switching process and the process for activation of a handler in the present fourth embodiment. FIG. 26 shows the transformation in the display screen in this fourth embodiment.

The reception control unit 1050 first displays the first content given as the information designated by the VE_id and the NE_id given in the PMT in the system information storage unit 1043 (S6510). The following explanation will deal with the case when "VE_id=0" and "NE_id=0" is given in the PMT. The explanation also supposes that the present time is 14:59:00 on Sep. 9, 1996.

The reception control unit 1050 obtains the present time and adjusts it using the time difference (S6520, S6530). Here, since the Graphics_Property_Part 6164 states that the graphics for "Video" with the graphics number "0" have an initial state of "visible" but should be invisible after 15:00:00 on Sep. 9, 1996, the reception control unit 1050 judges that these graphics should be visible at the present time of 14:59:00 on Sep. 9, 1996 (S6540, S6550), and so makes these graphics visible (S6560). Next, the reception control unit 1050 focuses on the graphics "Stereo" with the graphics number "1" (S6580, S6540), judges that these graphics should also be made visible (S6550), and so makes these graphics visible (S6560). Next, the reception control unit 1050 focuses on the graphics "This offer is no longer valid" with the graphics number "2" (S6580, S6540), but since these graphics should only be made visible after 15:00:00 on Sep. 9, 1996, judges that these graphics should be invisible at the present time of 14:59:00 on Sep. 9, 1996 (S6550), and so makes these graphics invisible (S6570). This display state is shown as 6810 in FIG. 26.

On completing the graphics display processing, the reception control unit 1050 moves the selection pointer in accordance with the user inputs (S6590), and, when there has been a button selection and activation operation by the user (S6600), activates the handler corresponding to the selected button (S6610).

Hereafter, time passes and the present time becomes 15:00:00 on Sep. 9, 1996.

The reception control unit 1050 obtains the present time and adjusts it using the time difference (S6520, S6530).

Here, since the Graphics_Property_Part 6164 states that the graphics for "Video" with the graphics number "0" have an initial state of "visible" but should be invisible after 15:00:00 on Sep. 9, 1996, the reception control unit 1050 judges that these graphics should be made invisible at the present time of 15:00:00 on Sep. 9, 1996 (S6540, S6550), and so makes these graphics invisible (S6570). Next, the reception control unit 1050 focuses on the graphics "Stereo" with the graphics number "1" (S6580, S6540), judges that these graphics should also be made invisible (S6550), and so makes these graphics invisible (S6570). After this, the reception control unit 1050 focuses on the graphics "This offer is no longer valid" with the graphics number "2" (S6580, S6540). Since the Graphics_Property_Part 6164 states that these graphics have an initial state of "invisible" but should be visible after 15:00:00 on Sep. 9, 1996, the reception control unit 1050 judges that these graphics should be made visible at the present time of 15:00:00 on Sep. 9, 1996 (S6550), and so makes these graphics visible (S6560).

As a result of the operation described above, the display screen becomes as shown as 6820 in FIG. 26.

With the data display control apparatus of the present embodiment, control can be performed to display or not display graphics at a time which is indicated separately for each set of graphics.

Fifth Embodiment

The following is an explanation of the data display control apparatus of the fifth embodiment of the present invention. This data display control apparatus receives a digital broadcast and is characterized by including a construction for adjusting the starting times of programs and starting programs once a specified time has been reached.

The data transmission apparatus of this fifth embodiment differs from the first embodiment in only the content of the transmitted navigation information, so that the construction of the data display control apparatus has been omitted. Instead, the data display control apparatus of this fifth embodiment will be described in terms of the content of the navigation information.

Construction

The construction of the data display control apparatus of the fifth embodiment is the same as that of the first embodiment (see FIG. 7), so that the data display control apparatus 1000 is composed of a reception unit 1010, a TS decoder unit 1020, an AV decoder unit 1030, a received data storage unit 1040, a reception control unit 1050, a reproduction unit 1060, a display unit 1070, an audio output unit 1080, and a signal reception unit 1100. The operation of the reception control unit 1050, however, is different in this fifth embodiment, so that this will be described in more detail below.

Data Construction

Of the data handled by the data display control apparatus of the fifth embodiment, only the navigation information differs from the data described in the first embodiment, with the other kinds of data being the same as before.

The data construction of the navigation information 7160 is shown in FIG. 27. This navigation information 7160 corresponds to the navigation information 2160 described in the first embodiment, and includes a Time_Event_Part 7161, a Bytecode_Part 7162, a Handler_Part 7163, a Graphics_Property_Part 7164, a Bitmap_Information_Part 7165, and a Hyperlink_Information_Part 7166.

Here, the Time_Event Part 7161 is the same as the Time_Event_Part 2161 in the first embodiment, the Bytecode_Part 7162 is the same as the Bytecode Part 2162, the Handler_Part 7163 is the same as the Handler_Part 2163, the Graphics_Property_Part 7164 is the same as the Graphics_Property_Part 2164, the Bitmap_Information_Part 7165 is the same as the Bitmap_Information_Part 2165, and the Hyperlink_Information_Part 7166 is the same as the Hyperlink_Information_Part 2166 (see FIG. 11).

The difference with the data construction of the first embodiment lies in the inclusion of an NE start time in addition to the NE_id in each navigation element.

For the example in FIG. 27, the NE start time shows that execution can only be performed from 14:00:00 on Sep. 9, 1996 onwards, so that even if there is a user operation which selects the content corresponding to the navigation element with the NE_id "0" before 14:00:00 on Sep. 9, 1996, the data display control apparatus will wait until the present time reaches 14:00:00 on Sep. 9, 1996 before referring to the navigation element with this $NE_{13}$ id "0" and performing the control of the display.

Operation Control Construction

The following is an explanation of the operation of the reception control unit 1050 based on the example data shown in FIG. 27. Here, operations which are the same as those described in the first embodiment have been omitted.

Figure 28:
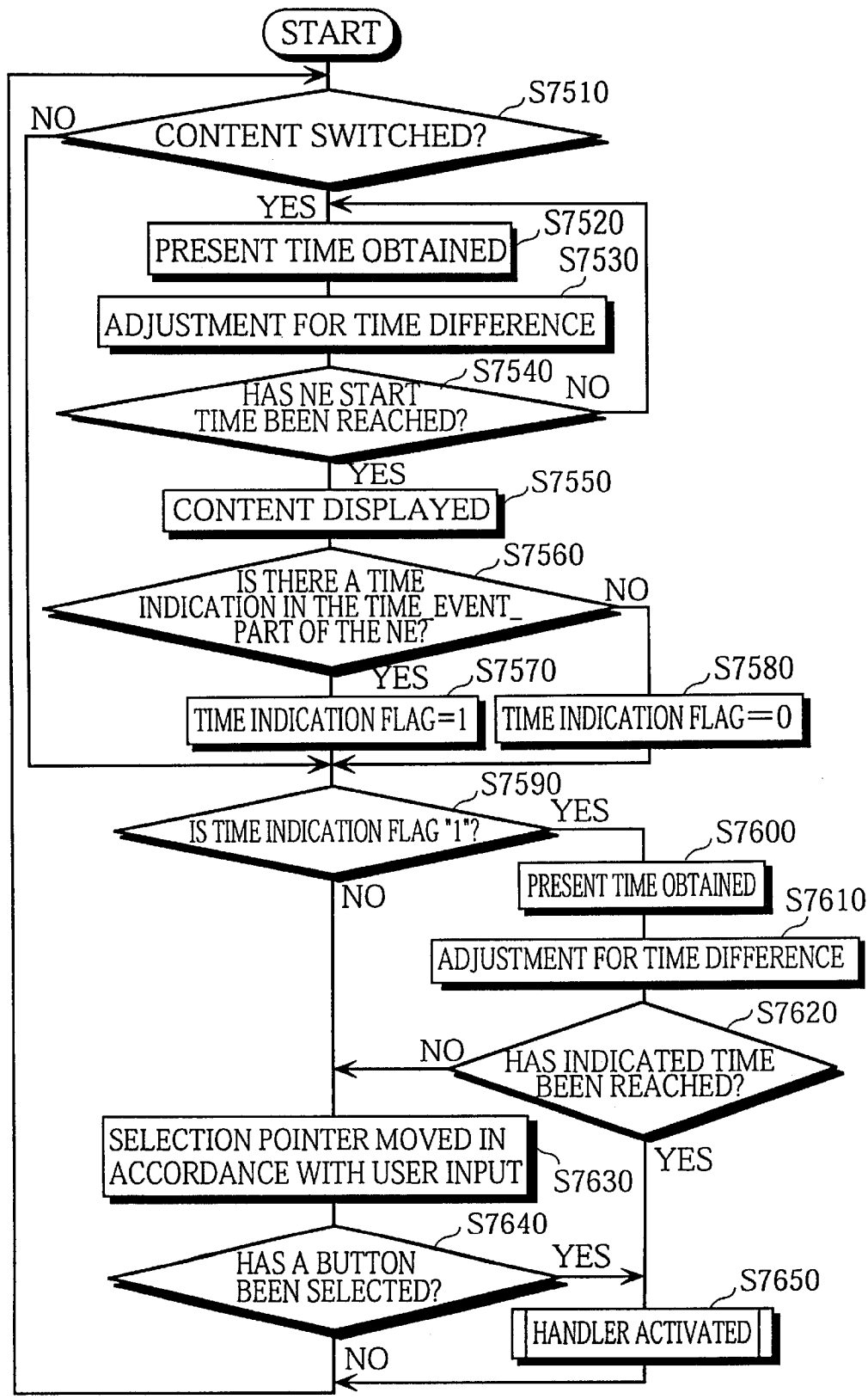
FIG. 28 is a flowchart showing a content switching operation and the activation of a handler in the fifth embodiment.

FIG. 28 is a flowchart showing the content switching process and the process for activation of a handler in the present fifth embodiment.

This explanation supposes that the present time is 13:59:00 on Sep. 9, 1996, and that the user has made a selection and activation operation for a button which switches from a given content to a content identified by NE_id=0 and VE_id=0.

The reception control unit 1050 judges that there has been a content switching (S7510), obtains the present time, and adjusts the present time using the time difference (S7520, S7530).

After this, the reception control unit 1050 refers to the navigation element with the NE_id=0, finds that the NE start time is given as 14:00:00 on Sep. 9, 1996, obtains the present time once again, and performs adjustment for the time difference (S7540, S7520, and S7530).

Here, time passes and the processing in steps S7540, 7520, and S7530 are repeated until the present time is judged to have reached 14:00:00 on Sep. 9, 1996 (S7540), at which point the content is displayed (S7550).

The following processes (S7560–S7650) are the same as S3040–S3130 in the first embodiment, and so will not be described.

By operating in this way, the reception control unit 1050 can display contents only after an indicated time has been reached, so that a digital broadcasting system can perform control in accordance with the progression of programs while maintaining their interactive aspects.

Sixth Embodiment

The following is an explanation of the data display control apparatus of the sixth embodiment of the present invention. This data display control apparatus receives a digital broadcast and is characterized by including a construction for performing control to execute a specified operation once a predetermined time period has elapsed from the start of display of a content.

The data transmission apparatus of this sixth embodiment differs from the first embodiment in only the content of the transmitted navigation information, so that the construction of the data display control apparatus has been omitted. Instead, the data display control apparatus of this sixth embodiment will be described in terms of the content of the navigation information.

Construction

The construction of the data display control apparatus of the sixth embodiment is the same as that of the first embodiment (see FIG. 7), so that the data display control apparatus 1000 is composed of a reception unit 1010, a TS decoder unit 1020, an AV decoder unit 1030, a received data storage unit 1040, a reception control unit 1050, a reproduction unit 1060, a display unit 1070, an audio output unit 1080, and a signal reception unit 1100.

The time information storage unit 1044 in the received data storage unit 1040 differs to the first embodiment in that the present time is stored by a counting unit (not illustrated) provided in the data display control apparatus. The present time calculated by this counting unit is expressed as hours, minutes, seconds, and frames, such as 11 hours, twenty minutes, 30 seconds and 15 frames, where one frame is one thirtieth of one second. Here, however, one frame may be set as one twenty-fifth of one second, so that the term "frame" simply represents a predetermined unit of time.

The operation of the reception control unit 1050 differs to that in the first embodiment, with this being described in more detail below.

Display Screens and Data Composing Contents

Figure 29:
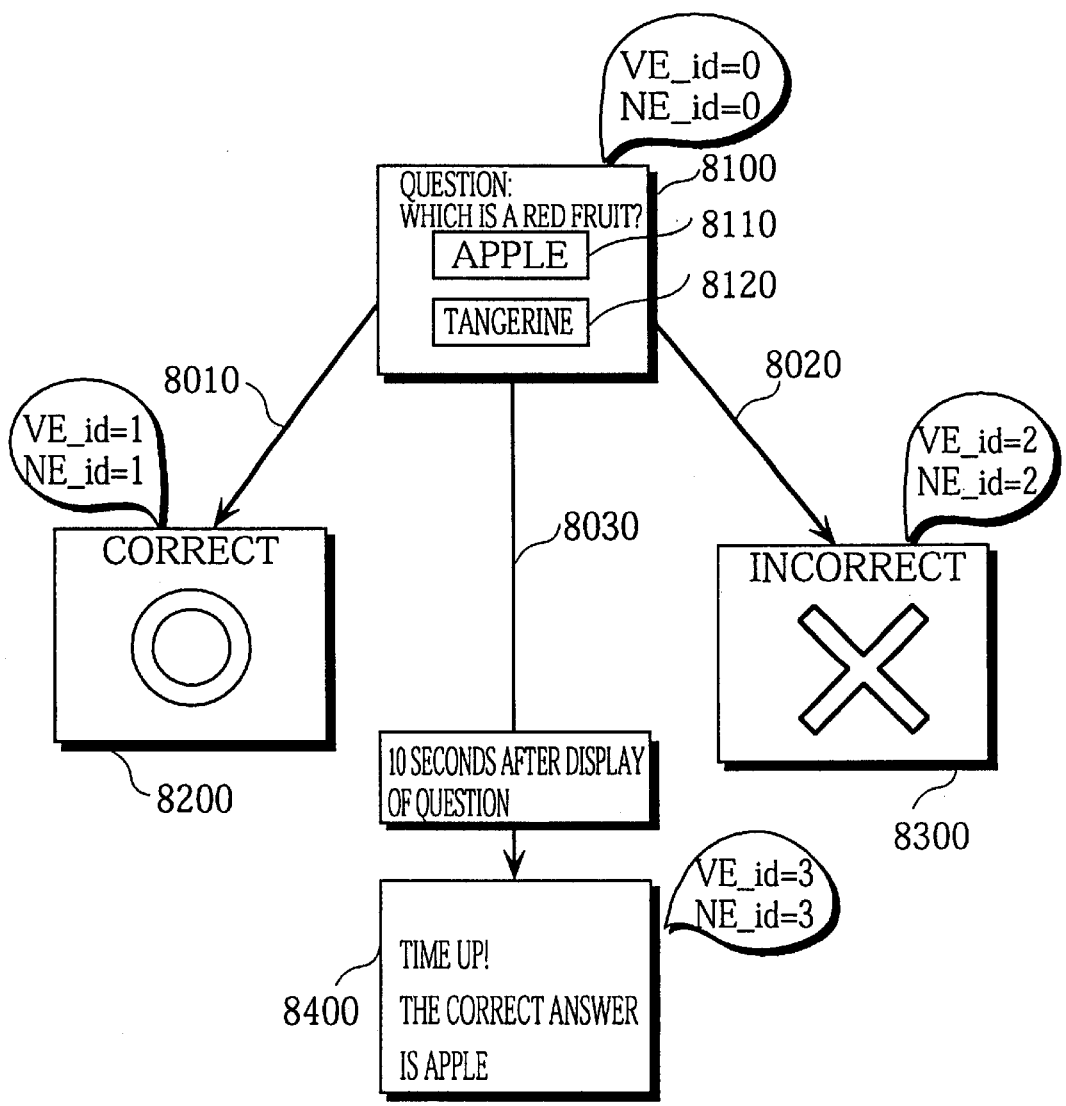
FIG. 29 shows examples of images displayed by the data display control apparatus 1000 in the sixth embodiment of the present invention.
Figure 30:
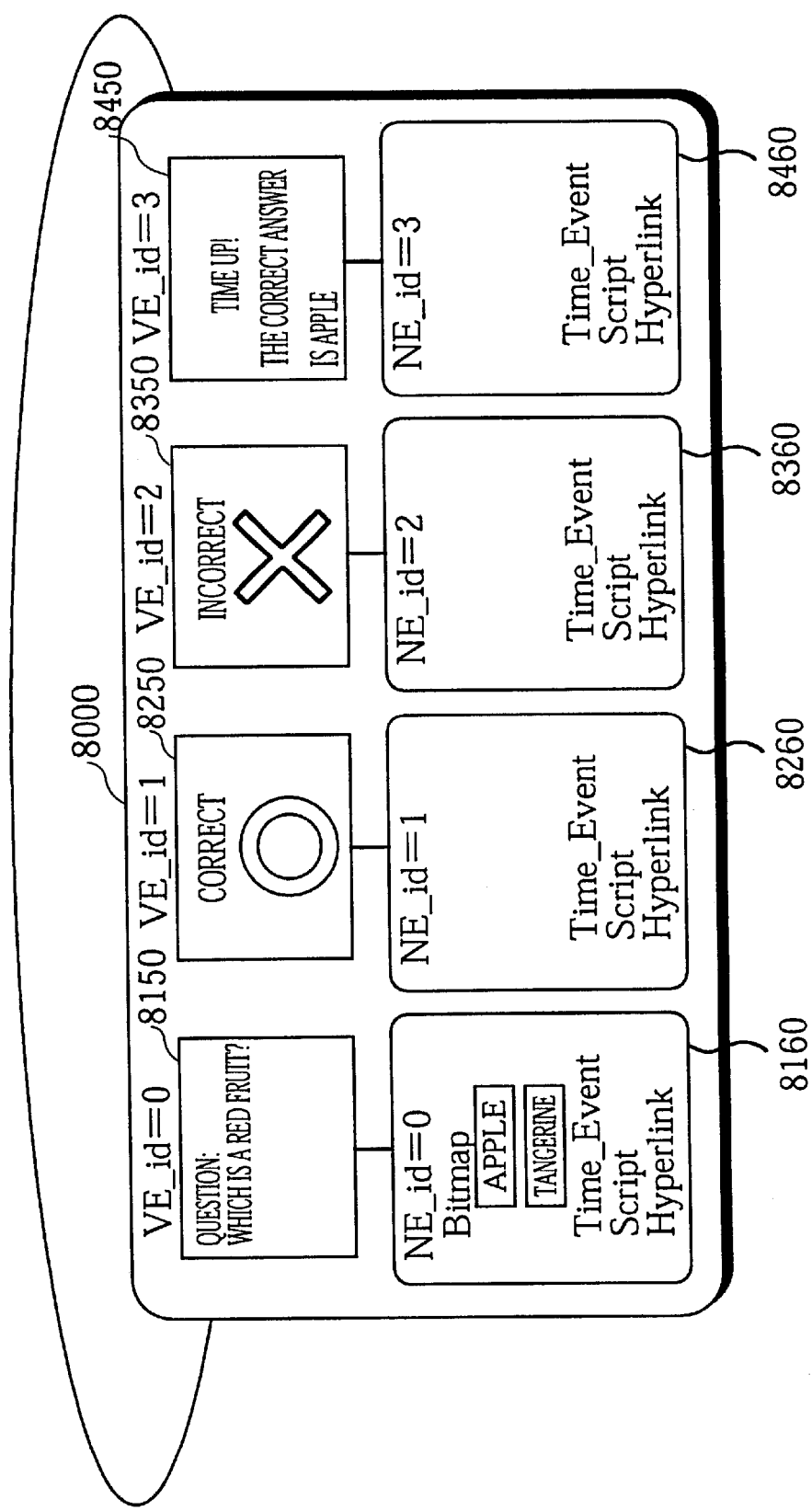
FIG. 30 is a simplified representation of the data transmitted by the data transmission apparatus.

The following is an explanation of the display of contents by the data display control apparatus 1000 and of the data composing contents, with reference to FIGS. 29, 30, and 31.

FIG. 29 shows example display screens for the data display control apparatus 1000 of the sixth embodiment of the present invention. These display screens relate to a quiz program, and include a content 8100 displaying a question, a content 8200 displaying indicating that a correct answer has been given, a content 8300 displaying indicating that an incorrect answer has been given, and a content 8400 displaying that time is up.

In this example, when the content 8100 for the question "Which is a red fruit?" is displayed on the display screen and the user selects and confirms the "Apple" button 8110, the display screen switches, as shown by the arrow 8010, to a display of the content 8200 showing that the correct answer has been given. In the same way, when the user selects and confirms the "Tangerine" button 8120, the display screen switches, as shown by the arrow 8020, to a display of the content 8300 showing that an incorrect answer has been given.

When ten seconds have passed from the start of the display of content 8100, the display switches to content 8400 showing that time is up.

Data Transmission Apparatus

To allow the data display control apparatus of the sixth embodiment of the present invention to perform the switching of display in response to interactive operations, data composing the contents is transmitted as described below.

It should be noted that the data transmission apparatus of the sixth embodiment has the same construction as the data transmission apparatus 101 described in the related art section. As described below, however, unlike the navigation information of the related art, the navigation information of the present embodiment includes information to allow control with a time element.

FIG. 30 gives a simplified representation of the data transmitted by the data transmission apparatus. FIG. 30 shows the data that composes the contents shown in FIG. 29, with the data 8000 being transmitted with a predetermined period by the data transmission apparatus. This transmitted data 8000 is composed of the sets of image data 8150, 8250, 8350, and 8450, and the sets of navigation information 8160, 8260, 8360, and 8460.

These sets of image data 8150, 8250, 8350, and 8450 are the background images for the contents 8100, 8200, 8300, and 8400 which are displayed on the display screen of the data display control apparatus 1000.

Figure 4:
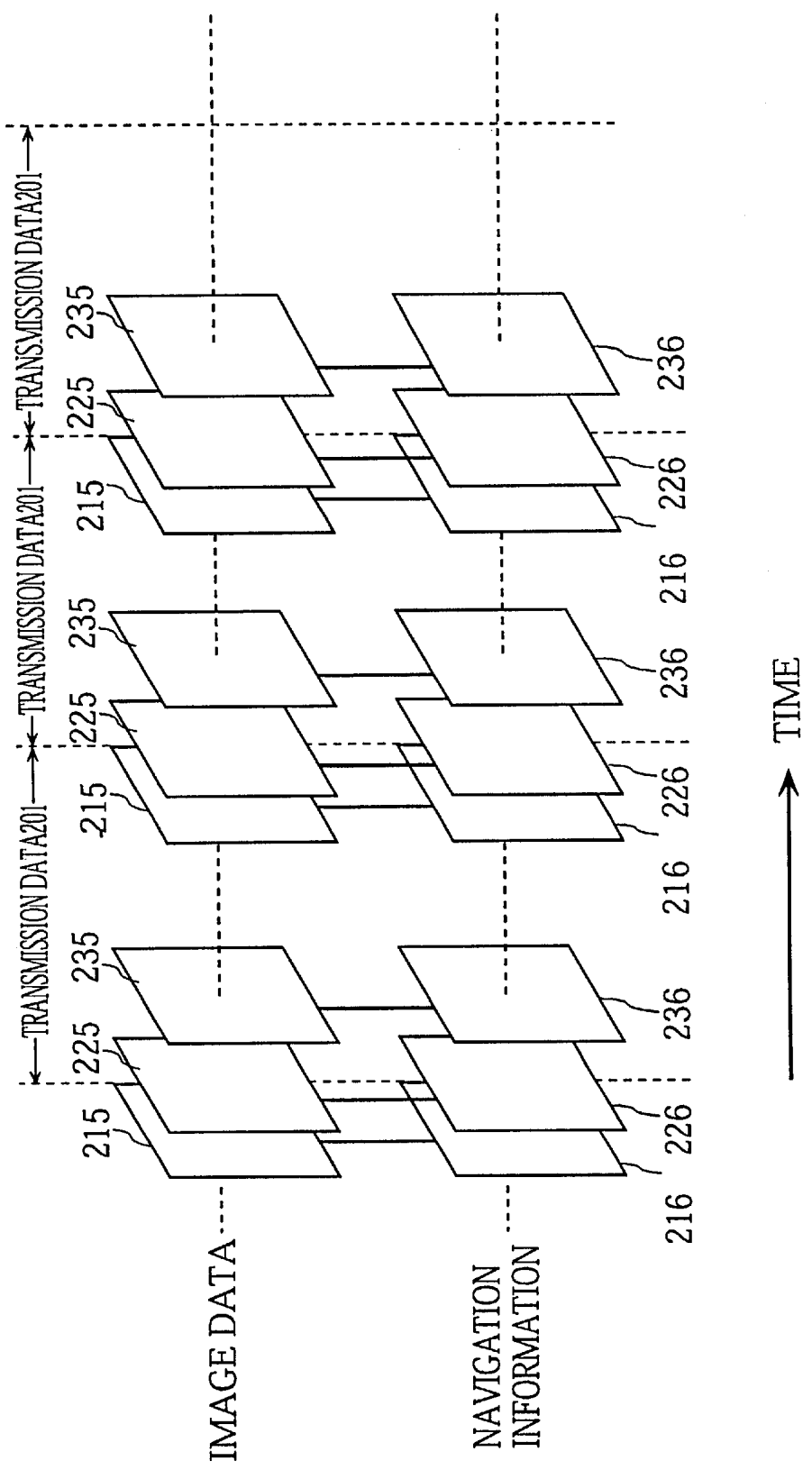
FIG. 4 is a more detailed representation of the data transmitted by the data transmission apparatus of the related art.

The data transmission apparatus repeatedly multiplexes and transmits the data 8000 with a predetermined interval, with this transmission being the same as shown in FIG. 4 of the related art section, except that the image data and navigation information in FIG. 4 are replaced with those shown in FIG. 30. The multiplexing is also performed in the same manner as shown in FIG. 5 of the related art section.

Detailed Description of the Navigation Information

The following is a description of the navigation information shown in outline in FIG. 30, with reference to FIG. 31.

FIG. 31 shows the data construction of the navigation information 8160. This navigation information is composed of a Time_Event_Part 8161, a Bytecode_Part 8162, a Handler_Part 8163, a Graphics_Property Part 8164, a Bitmap_Information_Part 8165, and a Hyperlink_Information_Part 8166.

The data construction of the navigation information 8160 is largely the same as the data construction of the navigation information 2160 in the first embodiment, although there are differences in the Time_Event_Part 8161.

The Time_Event Part 8161 corresponds to the information shown as "Time_Event" in FIG. 30, and is used to record information for activating a specified handler when an indicated time has elapsed from the start of display of the content. In the example of FIG. 31, the handler with the handler number "2" is activated ten seconds from the start of display of the content. Here, it is possible for a plurality of elapsed times before activation to be recorded in the Time_Event_Part. These elapsed times are given in hour, minute, second, and frame format.

The Bytecode_Part 8162 is used to record the bytecodes. In the example of FIG. 31, the bytecode with the bytecode number "0" is "PushL0, GotoPage" expressing a switch of display to a content shown by link number "0", the bytecode with the bytecode number "1" is "PushL1, GotoPage" expressing a switch of display to a content shown by link number "1", and the bytecode with the bytecode number "2" is "PushL2, GotoPage" expressing a switch 01 display to a content shown by link number "2".

The Bitmap_Information_Part 8165 records the contents of the bitmaps used to display the buttons corresponding to different graphics numbers. In the example in FIG. 31, the graphics number "0" corresponds to the bitmap for "Apple" and the graphics number "1" corresponds to the bitmap for "Tangerine".

The Graphics_Property_Part 8164 is information for composing the on-screen display graphics. In the example in FIG. 31, the graphics type is "Button", the graphics numbers "0" and "1" correspond to the numbers of the graphics included in the Bitmap_Information_Part, and the coordinates of button "0" and button "1" are given as (20,20) and (20,60). The handlers which are activated when button "0" and button "1" are selected are given as handler numbers "0" and "1", and the initial states of the buttons for the display of the contents are both given as "visible".

The Hyperlink_Information_Part 8166 records the IDs of the materials that compose the link destination contents, and has a collection of identifiers corresponding to each content that is identified as a link number. For the example in FIG. 31, "VE_id=1" is given as the link destination for link "0", and so shows that the content composed of the image data with the VE_id "1" is a link destination. The link destination for the link number "1" is shown as the content composed of the image data with the VE_id=2, and the link destination for the link number "2" is shown as the content composed of the image data with the VE_id-3.

It should be noted here that NE_id given as "0" at the top of FIG. 31 shows that the navigation information being explained here is the navigation element which has the ID "0".

The invention information with this "NE id-0" forms a content together with the image data for displaying the question that has the VE_id "0".

Using the data described above, a new content will be displayed when a user makes a button operation in response to a content displayed by the data display control apparatus 1000. Also, when the time period given in the Time Event_Part has elapsed from the start of display of a content, control is performed to execute the specified operation.

Operation of the Data Display Control Apparatus

The following is a description of the operation of the reception control unit 1050 of the data display control apparatus 1000 based on the data construction described above, with reference to the drawings.

Figure 32:
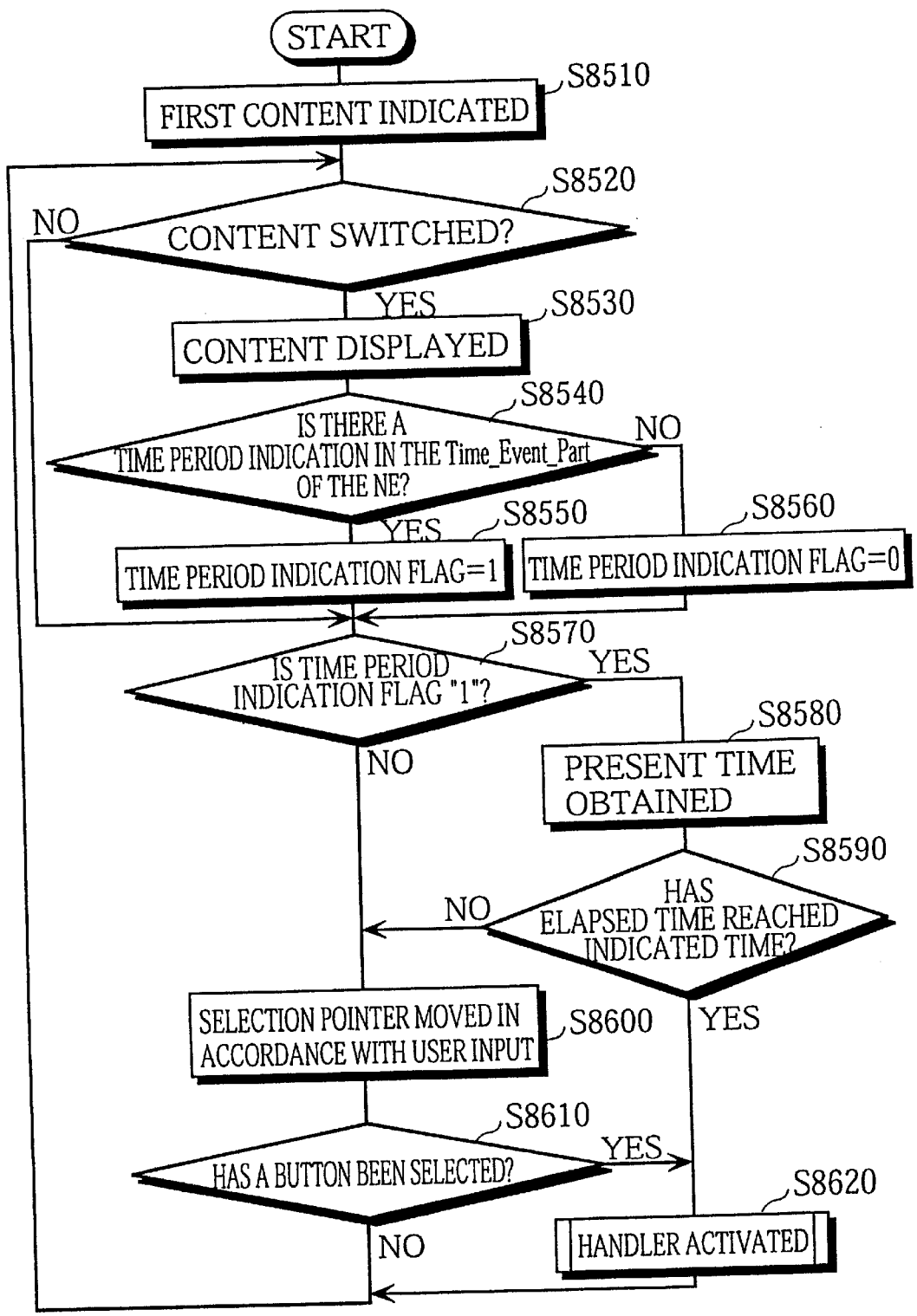
FIG. 32 is a flowchart showing a content switching operation and the activation of a handler.

FIG. 32 is a flowchart showing the content switching process and activation of a handler, while FIGS. 33A and 33B show the transformation in the display screen when the user gives an answer within the set response time, and when the user does not give an answer within the set response time.

The processing of the reception control unit 1050 is composed of steps S8510 to S8620 in FIG. 32. Step S8510 is an initial process for indicating the content to be displayed first when the reception of a program is commenced. When S8520 judges that content switching has been performed, steps S8530 to S8560 are performed. When S8570 judges that there is a handler to be executed at an indicated time, the processes in S8580 and S8590 are performed. Steps S8600 and S8610 are performed in response to user inputs and step S8620 is performed to activate a handler.

The information specifying the first content is given as a pair of a VE id and an NE_id in the PMT stored in the system information storage unit 1043. In the following explanation, an example where the information "VE_id=0" and "NE id-0" is given in the PMT is used.

First, the reception control unit 1050 obtains the information "VE_id=0", "NE id=0" from the PMT as the information for the content to be displayed first (S8510).

Since this is the first content, the system considers that content switching has been performed (S8520:Yes) and so displays the present content (S8530).

The display of this first content is achieved by displaying the image data 8150 with the VE_id=0 as the background image and on-screen display graphics in accordance with the content of the navigation information with the NE_id-0. Here, the button "apple" is visibly displayed at a position given by the coordinates (20,20) and the button "Tangerine" is visibly displayed at a position given by the coordinates (20,60), in accordance with the content of the Graphics_Property_Part 8164 and the Bitmap_Information_Part 8165 of the navigation information shown in FIG. 31. This results in the display shown as 8910 in FIG. 33A.

Once the present content has been displayed, the reception control unit 1050 judges whether there is a time period indication for the activation of a handler at a specified period after the start of display in the Time_Event_Part of the NE (S8540), in which case the time period indication flag for handler activation processing in response to time is set at "1" (S8550). When there is no time period indication, the time period indication flag is set at "0" (S8560). Here, since the handler with the handler number "2" in the Time Event_Part of the navigation information shown in FIG. 31 is set as being activated at a point where ten seconds have elapsed from the start of display, the time period indication flag is set at "1" (S8550).

When the time period indication flag has been set at "1" (S8570:Yes), the reception control unit 1050 measures the elapsed time from the start of display of the content (S8580) and judges whether the elapsed time has reached the time period indicated for the activation of the handler in the Time_Event_Part 8161 of the NE (S8590). When the indicated period has not elapsed, the reception control unit 1050 switches to the processing for the movement of the selection pointer in accordance with user operations (S8600). When one of the buttons has been selected and activated (S8610), the reception control unit 1050 advances to the handler activation step (S8620).

The case where the user gives his/her response five seconds from the start of display of the question is described below.

Since ten seconds have not elapsed (S8580, S8590), the reception control unit 1050 proceeds to the processing for the movement of the selection pointer in accordance with user operations (S8600). When the user selects and activates the button "Apple" five seconds from the start of the display of the content (S8610), the reception control unit 1050 refers to the Graphics_Property_Part 8164 and activates the handler with the handler number "0" (S8620). The handler with the handler number "0" is composed of the bytecode "0" whose content is "PushL0, GotoPage", so that content switching is performed to the content with the VE=id "1" for the link number "0" given in the Hyperlink_Information_Part 8166. This execution of bytecodes is performed by the bytecode interpreter 1051 of the reception control unit 1050.

After activation of a handler (S8620), the reception control unit 1050 returns to S8520 to judge that content switching has been performed and so display the new content (S8530). This results in the display screen for a correct answer being displayed, as shown by display 8920 in FIG. 33A.

The case where the user does not gives his/her response within ten seconds from the start of display of the question is described below. Note that the display at the start of this procedure is display 8930 of FIG. 33B.

Once ten seconds have elapsed from the start of display (S8580, S8590), the handler with the handler number "2" is activated (S8620). The handler with the handler number "2" is composed of the bytecode "2" whose content is "PushL2, GotoPage", so that content switching is performed to the content with the Ve=id "3" for the link number "2" given in the Hyperlink_Information_Part 8166.

After activation of a handler (S8620), the reception control unit 1050 returns to S9520 to judge that content switching has been performed (S8520) and so display the new content (S8530). This results in the display screen for "time up" being displayed, so shown by display 8940 in FIG. 33B.

By operating in this way, the data display control apparatus 1000 can execute the processing of a specified handler after a predetermined time period has elapsed starting from the display of a content by the data display control apparatus 1000.

SEVENTH EMBODIMENT

The following is an explanation of the seventh embodiment of the present invention, with reference to the drawings. The present embodiment relates to a data display control information editing apparatus which displays the interrelations of contents at a time indicated by the user.

Construction

Figure 34:
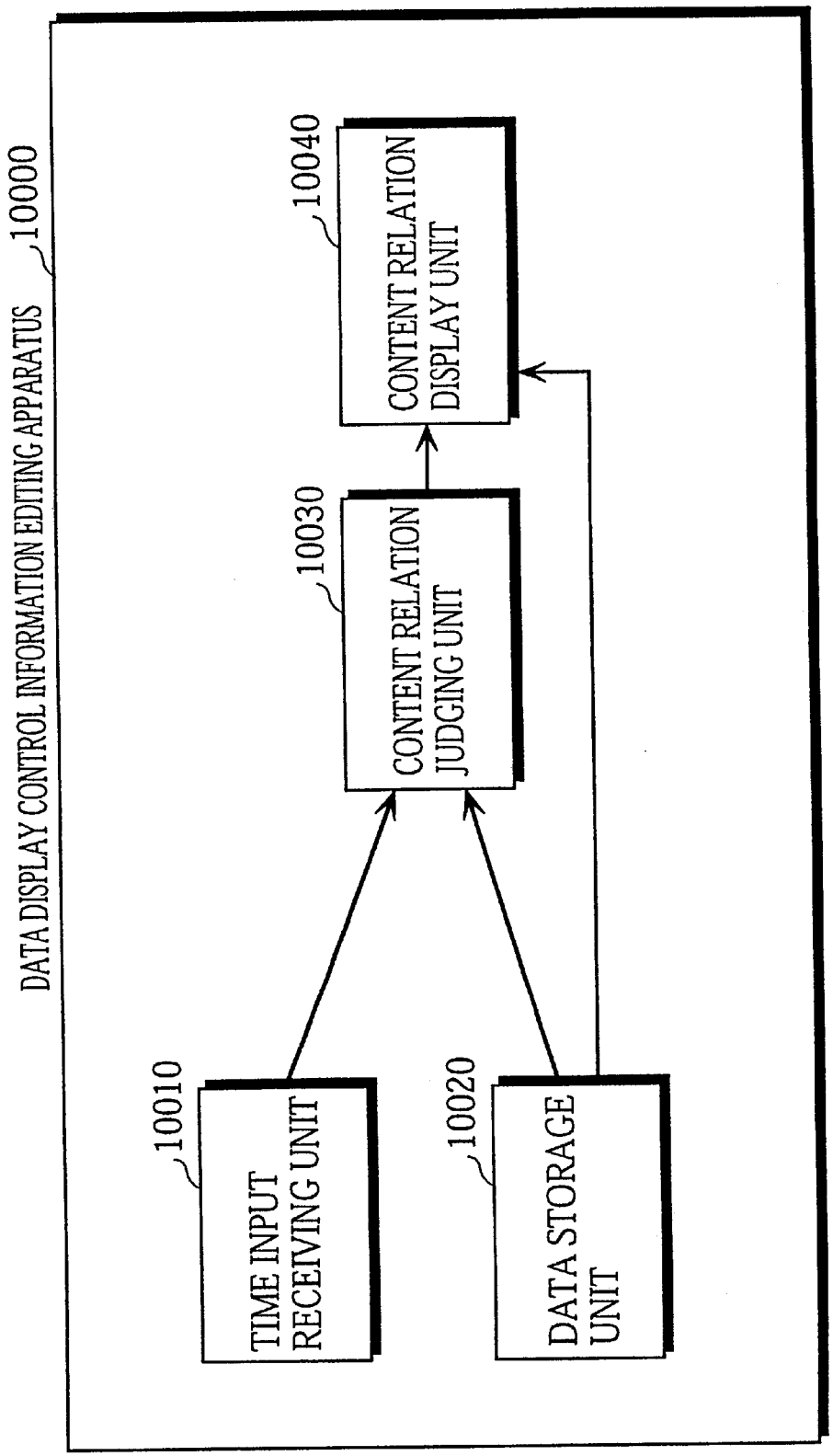
FIG. 34 is a block diagram showing the construction of the data display control information editing apparatus of the seventh embodiment of the present invention.

The construction of the data display control information editing apparatus of the seventh embodiment is shown by the block diagram in FIG. 34.

The data display control information editing apparatus 10000 is composed of a time input receiving unit 10010, a data storage unit 10020, a content relation judging unit 10030, and a content relation display unit 10040.

The time input receiving unit 10010 receives a user input of a standard time for displaying the interrelations of contents. Here, a direct numerical input of time made by the user is stored in an internal register (not illustrated).

The data storage unit 10020 stores the navigation information. The data construction of this navigation information is the same as that described in the second embodiment (see FIG. 17).

The content relation judging unit 10030 refers to the Handler_Part, the Bytecode_Part, and the Hyperlink_Information_Part of the navigation information stored in the data storage unit 10020, and, by investigating the contents of the bytecodes corresponding to the valid sub-handlers at the indicated time obtained by the time input receiving unit 10010, outputs the NE_id and VE_id of the contents that are link destinations for the sub-handlers that are valid at the indicated time to registers (not illustrated) provided in the data display control information editing apparatus.

The content relation display unit 10040 displays images representing the contents and lines representing the links between contents on a display screen.

Operation

Figure 35:
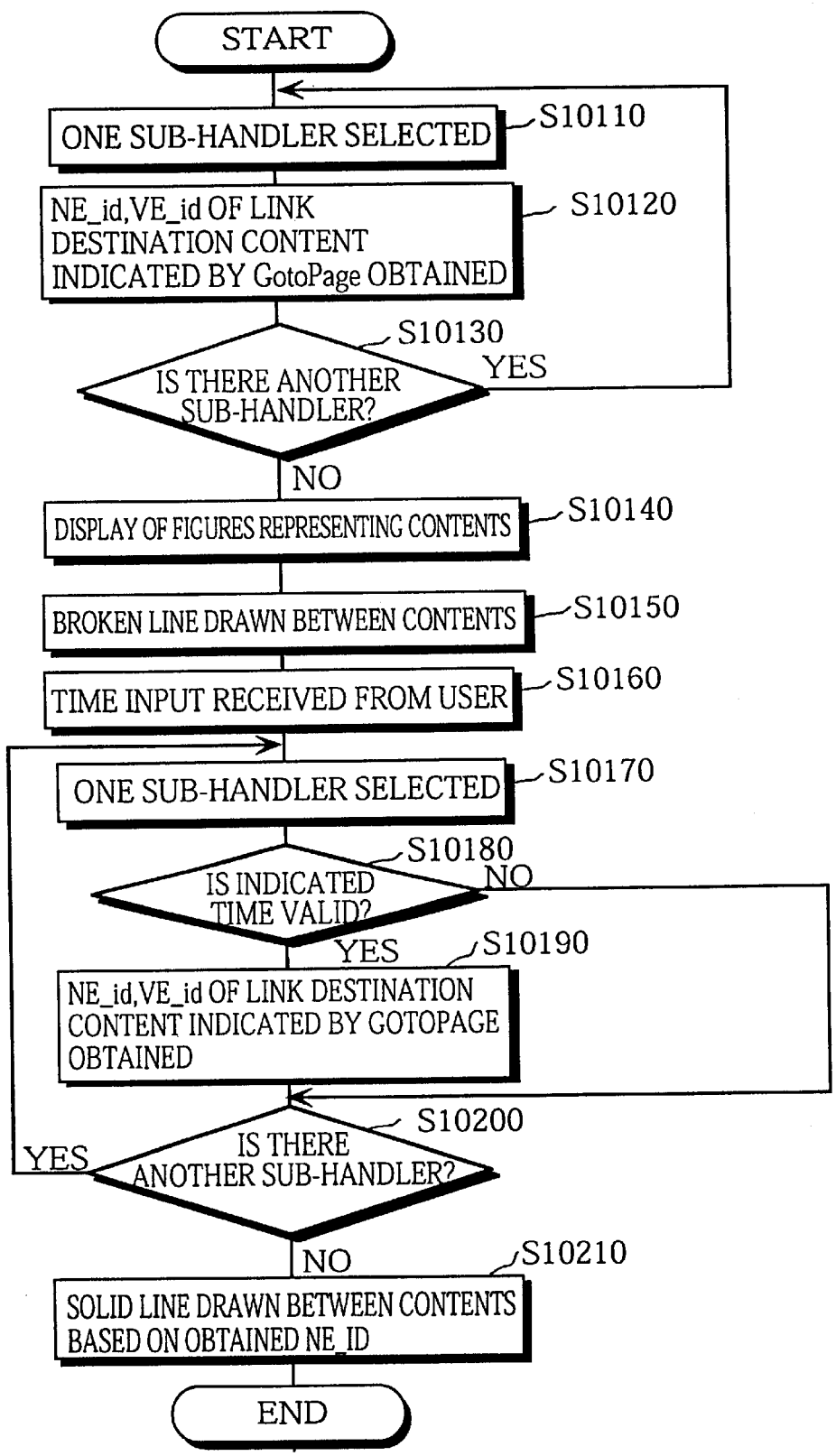
FIG. 35 is a flowchart showing the operation of the data display control information editing apparatus 10000.

The following is a description of a specific example of the operation of the data display control information editing apparatus 10000 based on the example sets of navigation information shown in FIGS. 17 to 19. A flowchart for the operation of the data display control information editing apparatus 10000 is shown in FIG. 35.

The content relation display unit 10040 first refers to the Handler_Part, the Bytecode_Part, and the Hyperlink_Information_Part of the navigation information stored in the data storage unit 10020 and investigates the contents of the bytecodes corresponding to all of the sub-handlers. As a result, "GotoPage" is detected, and the NE_id and VE_id of all of the link destination contents are obtained (S10110, S10120, S10130). The content relation display unit 10040 then displays the link relations of contents by displaying images for the contents and lines representing the links between the contents (S10140, S10150). Here, however, the lines between contents are drawn as broken lines showing that the links are invalid. Icons are used in the display as the images for representing contents and each record the VE_id and NE_id of the elements which compose the content represented by the icon.

FIG. 36 shows an example of a display screen displayed by the data display control information editing apparatus 10000.

After step S10150 has been completed, the display screen is as shown by display 10300 in FIG. 36.

The time input receiving unit 10010 next receives an user input of an indicated time (S10160), which in the present example is 14:59:00 on Sep. 9, 1996.

The content relation judging unit 10030 first refers to the Handler_Part 2173 or the navigation information 2170 with the NE_id=0, and judges that the sub-handler "0" is valid at 14:59:00 on Sep. 9, 1996 (S10170, S10180). The content relation judging unit 10030 then detects the bytecode "PushL0, GotoPage" corresponding to the sub-handler "0" that executes a link to the content with the link number "0", and so sets the link to the content given by the NE_id=1, VE_id=1 for the link number "0" as valid, storing the values NE_id=1, VE_id=1 in an internal register (S10190).

Following this, the content relation judging unit 10030 focuses on the sub-handlers "1" and "2" of the navigation information 2170, before focusing on the sub-handler "0" of the navigation information 2270 and the sub-handler "0" of the navigation information 2370, and executing the same processing as described above (S10170, S10180, S10190, and S10200).

As a result, the content relation display unit 10040 draws solid lines showing the valid links between contents based on the information for links which are valid at the indicated time 14:59:00 on Sep. 9, 1996 (S10210). this results in the display shown as display 10400 in FIG. 36.

As described above, the data display control information editing apparatus of the seventh embodiment is able to display the links between contents at a time indicated by the user in a way which allows the user to distinguish valid links from invalid links.

EIGHTH EMBODIMENT

The following is a description of the eighth embodiment of the present invention, with reference to the drawings.

In addition to the functions of the seventh embodiment, the data display control information editing apparatus of the eighth embodiment is able to update the information for controlling the display of data.

Construction

Figure 37:
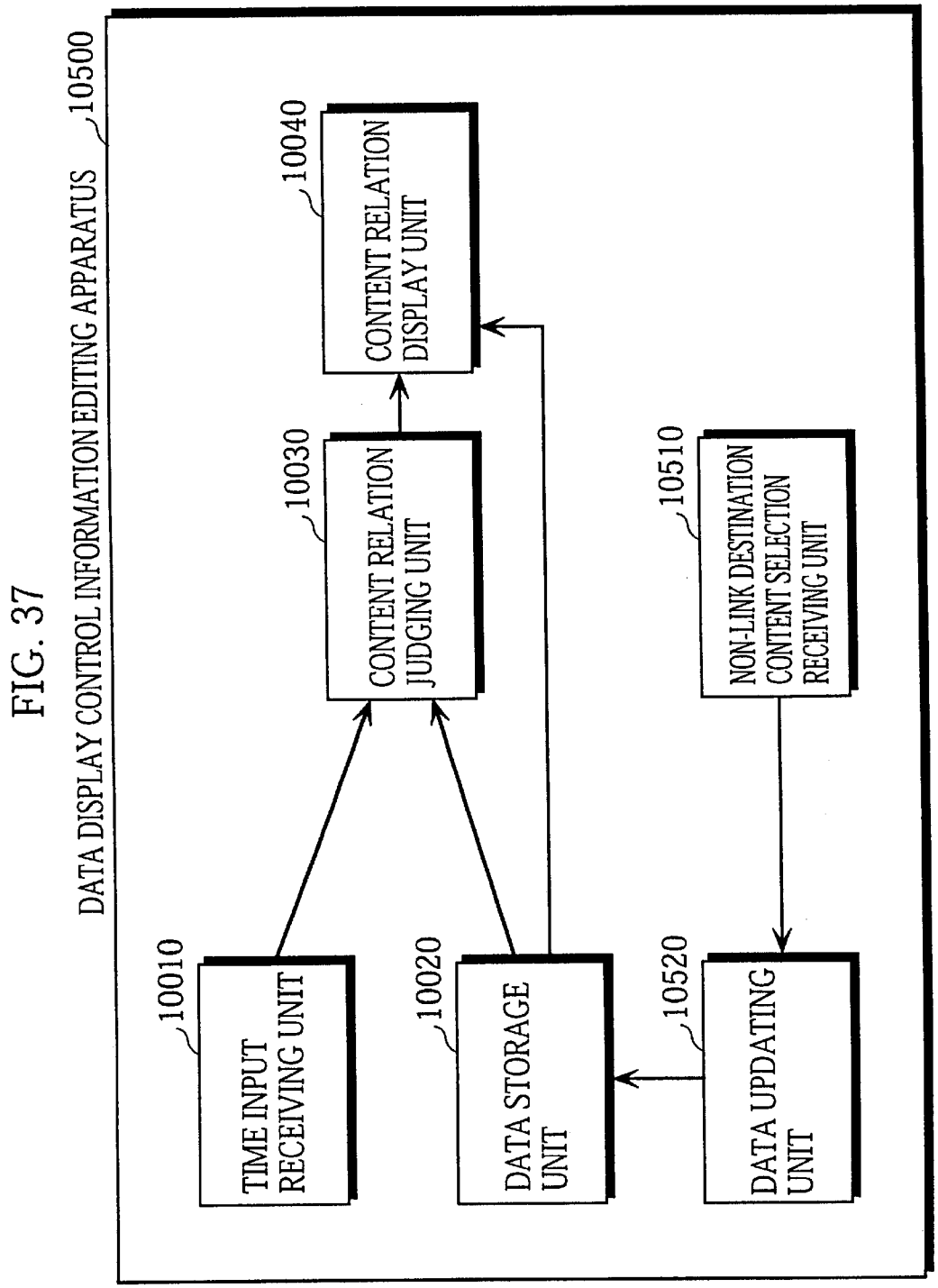
FIG. 37 is a block diagram showing the construction of the data display control information editing apparatus in the eighth embodiment of the present invention.

FIG. 37 is a block diagram showing the construction of the data display control information editing apparatus of the eighth embodiment of the present invention.

The data display control information editing apparatus 10500 is composed of a time input receiving unit 10010, a data storage unit 10020, a content relation judging unit 10030, a content relation display unit 10040, a non-link destination content selection receiving unit 10510 and a data updating unit 10520.

The time input receiving unit 10010, the data storage unit 10020, the content relation judging unit 10030, and the content relation display unit 10040 are the same as in the seventh embodiment, and so will not be explained further.

The non-link destination content selection receiving unit 10510 has the user select a content to which a link is to be prohibited, and outputs the VE_id and NE id of the selected content to a register provided in the data display control information editing apparatus. This user selection of a content can be made, for example, by indicating one of the icons representing contents on the content relation display unit 10040 using a selection pointer.

The data updating unit 10520 updates the content of the data storage unit 10020 by resetting the valid period information for the sub-handler corresponding to the bytecode which represents the link to the content selected by the non-link destination content selection receiving unit 10510, based on the indicated time received by the time input receiving unit 10010.

As a result, the data updating unit 10520 resets the navigation information so that a sub-handler representing a link to the selected content will be made invalid from the indicated time onwards.

Operation

Figure 38:
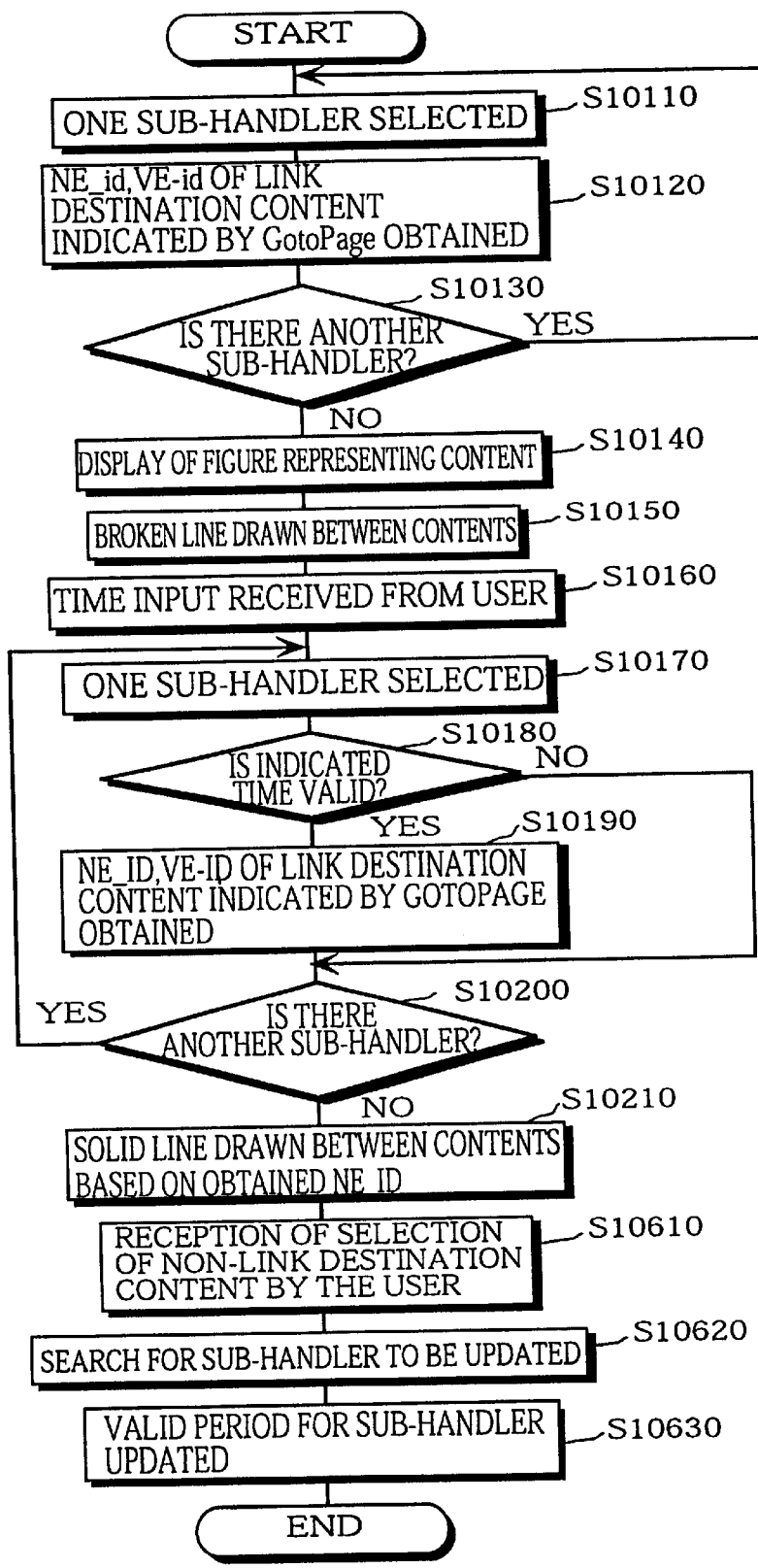
FIG. 38 is a flowchart showing the operation of the data display control information editing apparatus 10500 in the eighth embodiment.

The following is an explanation of the operation of the data display control information editing apparatus 10500 for the same specific data example as the seventh embodiment, with reference to FIGS. 36, 38, and 39.

FIG. 38 is a flowchart showing the operation of the data display control information editing apparatus 10500 of the eighth embodiment.

The steps in the flowchart in FIG. 38 which are the same as steps in the flowchart for the data display control information editing apparatus 1000 of the seventh embodiment have been given the same reference numerals and will not be explained. The following explanation will instead focus on the processes in S10610 onwards, and supposes that the display screen is as shown by display 10400 in FIG. 36.

When the user selects icon 10420 representing a content, the non-link destination content selection receiving unit 10510 receives this selection and stores the NE_id and VE_id of the selected content in a register in the data display control information editing apparatus (S10610). After a selection has been received by the non-link destination content selection receiving unit 10510, the data updating unit 10520 refers to the Handler_Part, the Bytecode_Part, and Hyperlink_Information_Part of the navigation information in the data storage unit 10020 based on the NE_id and VE_id in the register, and detects the sub-handler corresponding to the switching to the content selected by the user (S10620). The data updating unit 10520 then updates the ending time of the valid period of the detected sub-handler to the indicated time which was received by the time input receiving unit 10010 (S10630).

When the user has selected the content with the NE_id=1 and the VE_id=1, the data updating unit 10520 refers to the Hyperlink_Information_Part 2176 of the navigation information 2170, and judges that the link with the link number "0" needs to be invalidated. The data updating unit 10520 then refers to the Bytecode_Part 2172 and the Handler_Part 2173, detects the sub-handler "0" which corresponds to the bytecode "0" which describes the link to the link number "0", and resets the valid period of sub-handler "0" so that it ends at 14:59:00 on Sep. 9, 1996.

It should be noted that while the flowchart in FIG. 38 only shows the processing as far as the updating of the valid period of a sub-handler (S10630), it is also possible for the processing to return to S10170 or to S10160 after the completion of S10630, so as to repeat the processing. By doing so, the user is then able to select another content so that the navigation information can be updated to invalidate the link to this content from the indicated time onwards.

As described above, the data display control information editing apparatus of the eighth embodiment updates the navigation information based on the selection of a content by the user and an indication of time made by the user, so that the link to the selected content becomes invalid at the indicated time.

The above first to eighth embodiments have been used to describe the data display control apparatus and data display control information editing apparatus of the present invention, although it should be clear that the present invention is not limited to these embodiments. Possible modifications are described below.

(1) In the first to sixth embodiments, sets of instructions are given as bytecodes, although a variety of instructions for a variety of processes may be used as the bytecodes. As one example, instructions related to hardware operations, such as powering down the system, may be used.

(2) In the first to sixth embodiments, information relating to time is set in units of one set of information for each handler, sub-handler, or set of graphics, although the same time information may be collectively set for a plurality of handlers, sub-handlers, and sets of graphics.

(3) In the first to sixth embodiments, the contents were described as being composed of combinations of still images and on-screen display graphics, although contents may include video data and audio data. This video data and audio data may be multiplexed and transmitted by the data transmission apparatus according to MPEG2 system standard.

(4) In the first to sixth embodiments, the navigation information was described as including a Graphics_Property_Part for indicating graphics, although the navigation information may also include an Audio_Property_Part that describes audio used as background music. Based on the Audio_Property_Part, the data display control apparatus may add audio to the display or contents. In such a case, information for the time at which audio reproduction is valid can be given as an element of the Audio_Property_Part, so that the control of audio reproduction can be achieved based on an indicated time.

(5) The first and third embodiments describe an example where a handler is activated once an indicated time is reached, although a handler written in a Time_Event_Part of the navigation information of a new content may also be executed when content switching is performed if the display time written in the Time_Event_Part has already passed. Here, a plurality of pairings of times and handler numbers may be given in the Time_Event_Part. This may also be the same for the display of graphics in the fourth embodiment, so that when the indicated time has passed, the graphics may be changed in the display state corresponding to the indicated time.

(6) The acquisition of the present time by the data display control apparatuses of the first to fifth embodiments was described as the reception of transmitted data that expresses the present time, although each data display control apparatus may be provided with a timer mechanism from which the data display control apparatus can obtain the present time. It should be noted here that the correction for a time difference in such case will be a correction of the difference between the standard time given in the transmitted navigation information and the standard time of the present time obtained by the data display control apparatus from the timer mechanism.

(7) The control based on time in the second to fifth embodiments may be control according to an elapsed time based on a certain standard timing, in the same way as the sixth embodiment where control is performed according to elapsed time measured from the start of display of a content.

(8) The first to fifth, seventh, and eighth embodiments were described as handling expressions of time given in year, month, day, hour, minute, and second format, although they may instead handle expressions of time in year format, year and month format, year, month and day format, year, month day, and hour format, year, month, day, hour and minute format, or in a format that uses units that are smaller than one second.

(9) The first to sixth embodiments describe the case where a VE_id is given as an element in the Hyperlink_Information_Part, although a combination of a PID and a stream_id may be used instead of the VE id. When doing so, when content switching is indicated by a user operation, the data display control apparatus 1000 may set the appropriate PID and other information in the filter condition storage unit 1021 and so have the image data separated from the transmitted transport stream.

(10) In the sixth embodiment, the measuring of the elapsed time was achieved by a timer provided in the data display control apparatus, although it is also possible for the data display control apparatus to keep time by receiving present time information in the same way as in the first to fifth embodiments. When doing so, the data transmission apparatus will transmit present time information in the same way as in the first to fifth embodiments.

(11) In the first to eighth embodiments, the input method for receiving user operations may be achieved using a remote controller, a mouse, or any other kind of input device.

(12) In the seventh and eighth embodiments, the user input of the time indication is described as a direct input of time made using a keyboard, although an indirect input may be made by having the user select one of a plurality of potential values displayed on the display screen.

(13) In the seventh and eighth embodiments, the links between contents were described as being represented by broken lines and solid lines drawn between contents, although other forms of representation may be used. As one example, links that are not valid at the indicated time may be drawn using transparent lines, which is to say the contents may be displayed as not being linked. Any kind of image may also be used as the icons for displaying the contents. The icons used for displaying link destination contents may also be displayed in a manner that distinguishes between link destinations which are valid at the indicated time and link destinations which are not valid.

(14) In the seventh and eighth embodiments, the interrelations between contents were displayed based on a detection of links performed by bytecodes that are "GotoPage", although it is also possible to display the interrelations of the display states of contents by detecting instructions that change display states, such as "SetGraphicVisibility" instructions.

(15) In the eighth embodiment, the valid period of a sub handler that corresponds to a bytecode which achieves a link to the content indicated by the user is updated, although it is also possible for the time of the control for a change in the display state of graphics corresponding to the sub-handler to be changed, so that the display state becomes "invisible" at a certain time. Here, however, a data storage unit 10020 for storing the navigation information with the data construction shown in the fourth embodiment becomes necessary.

(16) In the seventh and eighth embodiments, the data display control information editing apparatus displays the interrelations between contents at a time indicated by the user, with the navigation information showing the states of contents at the indicated time being the same as the navigation information described in the first embodiment. However, this display of the interrelations between contents may be performed using the same navigation information as in any of the second to fifth embodiments.

(17) The processing of the reception control unit 1050 of the data display control apparatus in the first to sixth embodiments (shown in the flowcharts in FIGS. 14, 20, 23, 25, 28, and 32) and the processing of the data display control information editing apparatuses 10000 and 10500 in the seventh and eighth embodiments (shown in the flowcharts in FIGS. 35 and 38) may be achieved by computer programs written in machine language, with recording media storing these programs being distributed and sold. These recording media can be IC cards, optical discs, floppy discs, ROMs, or other media, with the machine language program recorded on the media being installed into standard hardware. This standard hardware can be a conventional personal computer which executes the installed machine language program, thereby realizing the data display control apparatus of any of the first to sixth embodiments or the data display control information editing apparatus of the seventh or eighth embodiments.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A data presentation control apparatus for receiving a plurality of sets of multimedia data and sets of presentation control information, and for controlling the presentation of the sets of multimedia data, the plurality of sets of multimedia data composing a plurality of contents which make up a broadcast program, and the sets of presentation control information each corresponding to a content and including (1) information for specifying an initial state and a changed state for presentation of sets of multimedia data that compose a corresponding content and (2) control time information that indicates a switch time for a switch to the changed state, the data presentation control apparatus comprising:
 data storage means;
 receiving means for extracting at least one set of multimedia data and the control time information from data transmitted from a broadcast program transmission apparatus and storing the received sets of multimedia data and control time information into the data storage means;
 current time information obtaining means for obtaining a set of current time information including an expression of a current time; and
 content presentation control means (1) for selecting one content and having the selected content initially presented in the initial state in accordance with the presentation control information corresponding to the selected content, the presentation control information having been received by the receiving means, (2) for comparing the current time information with the switch time given in the control time information corresponding to the selected content, and (3) for having the selected content presented in the changed state once the switch time given in the control time information has been reached.

2. The data presentation control apparatus of claim 1, wherein the sets of presentation control information are repeatedly transmitted by the broad cast program transmission apparatus.

3. The data presentation control apparatus of claim 1, wherein the content presentation control means includes:
 link instruction receiving means for receiving an instruction input by a user which specifies a new content to be presented; and link instruction executing means for performing control so that the new content is presented in place of a present content according to the instruction received by the link instruction receiving means.

4. The data presentation control apparatus of claim 1, wherein
the receiving means also extracts the set of current time information from the data transmitted from the broadcast program transmission apparatus, and
the current time information obtaining means obtains the current time information from the receiving means.

5. The data presentation control apparatus of claim 1, wherein
the data storage means stores a time difference value which indicates a time difference between the expression of the current time in the set of current time information and a standard control time in the set of time control information, and
the content presentation control means refers to the time difference value and corrects a content of the current time information using the time difference when comparing the set of current time information with the set of time control information.

6. The data presentation control apparatus of claim 5, wherein
the receiving means extracts the time difference value and the set of current time information from the data transmitted from the broadcast program transmission apparatus and storing the extracted time difference value in the data storage means, and
the current time information obtaining means obtains the set of the current time information from the receiving means.

7. A data presentation control apparatus for receiving a plurality of sets of multimedia data, and a plurality of sets of presentation control information, the sets of multimedia data composing a plurality of contents that make up a broadcast program, each set of presentation control information corresponding to a content and including (1) information for specifying an initial state and a changed state for presentation of sets of multimedia data that compose a corresponding content, (2) control time information that indicates a switch time for a switch to the changed state, and (3) an instruction indicating a predetermined operation for having a presentation switch to the changed state,
the data presentation control apparatus comprising:
data storage means;
receiving means for receiving multimedia data and presentation control information from a broadcasting apparatus, extracting data as required, and storing the extracted data into the data storage means;
current time information obtaining means for obtaining a set of current time information including an expression of a current time;
content presentation control means for
(1) for selecting one content and having the selected content initially presented in the initial state in accordance with the presentation control information corresponding to the selected content, the presentation control information having been received by the receiving means,
(2) for comparing the current time information with the switch time given in the control time information corresponding to the selected content, and
(3) for executing an instruction to have the selected content presented in the changed state once the switch time given in the control time information has been reached,
wherein the content presentation control means includes:
link instruction receiving means for receiving an instruction input by a user which specifies a content to be presented; and
link instruction executing means for presenting the content in place of a present content according to the instruction received by the link instruction receiving means.

8. A data presentation control apparatus according to claim 7,
wherein the switch time shown by control time information indicates a date and time and the expression of the current time given in the current time information is the current date and time, and
the content presentation control means regards the switch time as having been reached if the current time is equal to or earlier than the date and time indicated by the control time information.

9. A data presentation control apparatus according to claim 7,
wherein the switch time shown by control time information indicates a date and time period relative to a start of presentation of a corresponding content and the expression of the current time given in the current time information is the time that has elapsed since a start of presentation of a present content, and
the content presentation control means regards the switch time as having been reached if the current time is equal to or longer than the time period indicated by the control time information.

10. A data transmission apparatus for transmitting a plurality of sets of multimedia data, wherein the plurality of sets of multimedia data compose a plurality of contents which make up a broadcast program, the data transmission apparatus comprising:
transmission data storage means for storing the plurality of sets of multimedia data and a plurality of sets of presentation control information, each set of presentation control information corresponding to a content and including (1) information for specifying an initial state and a changed state for presentation of sets of multimedia data that compose a corresponding content and (2) control time information that indicates a switch time for a switch to the changed state; and
transmission means for transmitting the plurality of sets of multimedia data and the sets of presentation control information.

11. The data transmission apparatus of claim 10, wherein the transmission means repeatedly transmits the sets of presentation control information.

12. The data transmission apparatus of claim 10, wherein
the transmission data storage means further stores a set of link information which shows interrelations between contents in the plurality of contents, and
the transmission means also transmits the set of link information.

13. The data transmission apparatus of claim 10 further comprising:
time measuring means for measuring a current time, wherein
the transmission means further transmits a set of current time information showing the current time.

14. The data transmission apparatus of claim 10, wherein
the transmission data storage means stores a time difference value which indicates a time difference between the current time and a standard control time in the set of time control information, and
the transmission means further transmits the time difference value.

15. A data transmission apparatus for transmitting a plurality of sets of multimedia data, wherein the plurality of sets of multimedia data compose a plurality of contents which make up a broadcast program, the data transmission apparatus comprising:
transmission data storage means the plurality of sets of multimedia data and a plurality of sets of presentation control information, each set of presentation control information corresponding to a content and including (1) information for specifying an initial state and a changed state for presentation of sets of multimedia data that compose a corresponding content, (2) control time information that indicates a switch time for a switch to the changed state, and (3) an instruction indicating a predetermined operation for having a presentation switch to the changed state; and
transmission means for transmitting the plurality of sets of multimedia data and the sets of presentation control information.

16. A recording medium on which a data presentation control program is recorded, the data presentation control program controlling a data presentation control apparatus which receives a plurality of sets of multimedia data and a plurality of sets of presentation control information, the sets of multimedia data making up a plurality of contents that compose a broadcast program, each set of presentation control information corresponding to a content and including (1) information for specifying an initial state and a changed state for presentation of sets of multimedia data that compose a corresponding content and (2) control time information that indicates a switch time for switch to the changed state,
the data presentation control program comprising the steps of:
obtaining a set of current time information for a current time;
selecting one content and having the selected content initially presented in the initial state in accordance with the presentation control information corresponding to the selected content;
comparing the current time information with the switch time given in the control time information corresponding to the selected content, and
having the selected content presented by the data display control apparatus in the changed state once the switch time given in the control time information has been reached.

17. A recording medium on which a data presentation control program is recorded, the data presentation control program controlling a data presentation control apparatus which receives a plurality of sets of multimedia data and a plurality of sets of presentation control information, the sets of multimedia data making up a plurality of contents that compose a broadcast program, each set of presentation control information corresponding to a content and including (1)information for specifying an initial state and a changed state for presentation of sets of multimedia data that compose a corresponding content (2) control time information that indicates a switch time for a switch to the changed state, and (3) an instruction indicating a predetermined operation for having a presentation switch to the changed state,
the data presentation control program comprising the steps of:
obtaining a set of current time information for a current time;
selecting one content and having the selected content initially presented in the initial state in accordance with the presentation control information corresponding to the selected content;
comparing the current time information with the switch time given in the control time information corresponding to the selected content, and
having the data presentation control apparatus execute the instruction to have the selected content presented in the changed state once the switch time given in the control time information has been reached.

18. A data presentation control apparatus for receiving a plurality of sets of multimedia data and a plurality of sets of presentation control information, the sets of multimedia data composing a plurality of contents which make up a broadcast program, each set of presentation control information corresponding to a content and including (1) information for specifying an initial state and a changed state for presentation of sets of multimedia data that compose a corresponding content, (2) control time information that indicates a switch time for a switch to the changed state and (3) content presentation time information indicating a time used as a presentation start condition for the corresponding content,
the data presentation control apparatus comprising:
data storage means;
receiving means for receiving multimedia data and presentation control information from a broadcasting apparatus, extracting data as required, and storing the extracted data into the data storage means;
current time information obtaining means for obtaining a set of current time information including an expression of a current time; and
content presentation control means for
(1) for selecting one content and having the selected content initially presented in the initial state in accordance with the presentation control information corresponding to the selected content, the presentation control information having been received by the receiving means,
(2) for comparing the current time information with the switch time given in the control time information corresponding to the selected content, and
(3) for having the selected content presented in the changed state once the switch time given in the control time information has been reached,
wherein the content presentation control means includes:
link instruction receiving means for receiving an instruction input by a user which specifies a content to be newly presented; and
link instruction executing means for comparing the content presentation time information corresponding to the content specified by the instruction received by the link instruction receiving means with the current time information and performing control to have the specified content presented the content in place of a present content once the time indicated by the in the content presentation time information has been reached.

19. A data transmission apparatus for transmitting a plurality of sets of multimedia data, wherein the plurality of sets of multimedia data compose a plurality of contents which make up a broadcast program, the data transmission apparatus comprising:

transmission data storage means for storing the plurality of sets of multimedia data and a plurality of sets of presentation control information, each set of presentation control information corresponding to a content and including (1) information for specifying an initial state and a changed state for presentation of sets of multimedia data that compose a corresponding content, (2) control time information that indicates a switch time for a switch to the changed state and (3) content presentation time information indicating a time used as a presentation start condition for the corresponding content; and transmission means for transmitting the plurality of sets of multimedia data and the sets of presentation control information.

20. A data transmission apparatus according to claim 19, wherein the switch time indicated by the control time information is a date and time.

21. A data transmission apparatus according to claim 19, wherein the switch time indicated by the control time information is a time period expressed relative to a start of presentation of the corresponding content.

* * * * *